US010301426B2

(12) United States Patent
Allen et al.

(10) Patent No.: US 10,301,426 B2
(45) Date of Patent: May 28, 2019

(54) POLYCARBONATE POLYOL COMPOSITIONS AND METHODS

(71) Applicant: Saudi Aramco Technologies Company, Dhahran (SA)

(72) Inventors: Scott D. Allen, Ithaca, NY (US); Geoffrey W. Coates, Lansing, NY (US); Anna E. Cherian, Ithaca, NY (US); Chris A. Simoneau, Oxford, CT (US); Alexei A. Gridnev, Ithaca, NY (US); Jay J Farmer, Ithaca, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 28 days.

(21) Appl. No.: 15/719,855

(22) Filed: Sep. 29, 2017

(65) Prior Publication Data

US 2018/0022869 A1   Jan. 25, 2018

Related U.S. Application Data

(63) Continuation of application No. 15/161,684, filed on May 23, 2016, now Pat. No. 9,809,678, which is a continuation of application No. 14/573,534, filed on Dec. 17, 2014, now Pat. No. 9,376,531, which is a continuation of application No. 14/040,001, filed on Sep. 27, 2013, now Pat. No. 8,921,508, which is a continuation of application No. 13/584,989, filed on Aug. 14, 2012, now Pat. No. 8,604,155, which is a continuation of application No. 12/994,544, filed as application No. PCT/US2009/056220 on Sep. 8, 2009, now Pat. No. 8,247,520.

(60) Provisional application No. 61/095,178, filed on Sep. 8, 2008.

(51) Int. Cl.
  *C08G 64/34*   (2006.01)
  *C08G 64/02*   (2006.01)
  *C08G 18/44*   (2006.01)

(52) U.S. Cl.
  CPC ........... *C08G 64/34* (2013.01); *C08G 18/44* (2013.01); *C08G 64/0208* (2013.01)

(58) Field of Classification Search
  USPC .................................................. 528/196, 198
  See application file for complete search history.

(56) References Cited

U.S. PATENT DOCUMENTS

| | | |
|---|---|---|
| 3,248,415 A | 4/1966 | Stevens et al. |
| 3,585,168 A | 6/1971 | Inoue et al. |
| 3,900,424 A | 8/1975 | Inoue et al. |
| 3,953,383 A | 4/1976 | Inoue et al. |
| 4,500,704 A | 2/1985 | Kruper, Jr. et al. |
| 4,686,276 A | 8/1987 | Myers |
| 4,826,953 A | 5/1989 | Kuyper et al. |
| 4,910,256 A | 3/1990 | Prier |
| 5,637,739 A | 6/1997 | Jacobsen et al. |
| 5,663,393 A | 9/1997 | Jacobsen et al. |
| 5,665,890 A | 9/1997 | Jacobsen et al. |
| 5,880,293 A | 3/1999 | Godvigovna et al. |
| 5,929,232 A | 7/1999 | Jacobsen et al. |
| 6,130,340 A | 10/2000 | Jacobsen et al. |
| 6,133,402 A | 10/2000 | Coates et al. |
| 6,262,127 B1 | 7/2001 | Acemoglu et al. |
| 6,309,997 B1 | 10/2001 | Fujita et al. |
| 6,515,145 B2 | 2/2003 | Machac, Jr. et al. |
| 6,617,467 B1 | 9/2003 | Muller et al. |
| 6,639,087 B2 | 10/2003 | Larrow et al. |
| 6,677,268 B2 | 1/2004 | Hillebrand et al. |
| 6,713,599 B1 | 3/2004 | Hinz et al. |
| 6,781,006 B2 | 8/2004 | Larrow et al. |
| 6,844,448 B2 | 1/2005 | Jacobsen et al. |
| 6,852,865 B2 | 2/2005 | Coates et al. |
| 6,870,004 B1 | 3/2005 | Nguyen et al. |
| 6,875,718 B2 | 4/2005 | Fujita et al. |
| 6,884,750 B2 | 4/2005 | Kim et al. |
| 6,903,043 B2 | 6/2005 | Kim et al. |
| 7,145,022 B2 | 12/2006 | Luinstra et al. |

(Continued)

FOREIGN PATENT DOCUMENTS

| | | |
|---|---|---|
| CA | 1312398 C | 1/1993 |
| CN | 101020747 A | 8/2007 |

(Continued)

OTHER PUBLICATIONS

U.S. Appl. No. 15/833,155, filed Dec. 6, 2017, Allen et al.
U.S. Appl. No. 15/923,076, filed Mar. 16, 2018, Allen et al.
Ahn Tae-wan, Munundang, Polymer Chemistry, First Edition, 5.4: 175-176 (issued Jun. 30, 2010). No English Translation Available.
Chen, L., Activation and copolymerization of CO2 by macromolecule-metal complexes, Die Makromolekulare Chemie, Macromolecular Symposia, 59: 75-82 (1992).

(Continued)

*Primary Examiner* — Terressa Boykin
(74) *Attorney, Agent, or Firm* — Choate, Hall & Stewart LLP; John P. Rearick; Nicholas J. Pace

(57) ABSTRACT

In one aspect, the present disclosure encompasses polymerization systems for the copolymerization of $CO_2$ and epoxides comprising 1) a catalyst including a metal coordination compound having a permanent ligand set and at least one ligand that is a polymerization initiator, and 2) a chain transfer agent having two or more sites that can initiate polymerization. In a second aspect, the present disclosure encompasses methods for the synthesis of polycarbonate polyols using the inventive polymerization systems. In a third aspect, the present disclosure encompasses polycarbonate polyol compositions characterized in that the polymer chains have a high percentage of —OH end groups and a high percentage of carbonate linkages. The compositions are further characterized in that they contain polymer chains having an embedded polyfunctional moiety linked to a plurality of individual polycarbonate chains.

20 Claims, No Drawings

(56) References Cited

U.S. PATENT DOCUMENTS

| | | |
|---|---|---|
| 7,148,174 B2 | 12/2006 | Schulte et al. |
| 7,244,805 B2 | 7/2007 | Park et al. |
| 7,268,204 B2 | 9/2007 | Hinz et al. |
| 7,300,903 B2 | 11/2007 | Fujita et al. |
| 7,304,172 B2 | 12/2007 | Coates et al. |
| 7,399,822 B2 | 7/2008 | Coates et al. |
| 7,674,873 B2 | 3/2010 | Coates et al. |
| 7,723,256 B2 | 5/2010 | Coates et al. |
| 7,858,729 B2 | 12/2010 | Allen |
| 7,977,501 B2 | 7/2011 | Haider et al. |
| 8,163,867 B2 | 4/2012 | Lee et al. |
| 8,207,365 B2 | 6/2012 | Zheng et al. |
| 8,232,267 B2 | 7/2012 | Groves |
| 8,247,520 B2 | 8/2012 | Allen et al. |
| 8,252,955 B2 | 8/2012 | Gao et al. |
| 8,461,290 B2 | 6/2013 | Carpentier et al. |
| 8,470,956 B2 | 6/2013 | Allen et al. |
| 8,507,733 B2 | 8/2013 | Ok et al. |
| 8,580,911 B2 | 11/2013 | Allen et al. |
| 8,598,309 B2 | 12/2013 | Jeong et al. |
| 8,604,155 B2 | 12/2013 | Allen et al. |
| 8,633,123 B2 | 1/2014 | Allen et al. |
| 8,642,721 B2 | 2/2014 | Ok et al. |
| 8,785,591 B2 | 7/2014 | Allen et al. |
| 8,791,274 B2 | 7/2014 | Ok et al. |
| 8,921,508 B2 | 12/2014 | Allen et al. |
| 8,952,104 B2 | 2/2015 | Allen |
| 9,029,498 B2 | 5/2015 | Allen et al. |
| 9,102,800 B2 | 8/2015 | Allen et al. |
| 9,284,406 B2 | 3/2016 | Farmer |
| 9,327,280 B2 | 5/2016 | Lee et al. |
| 9,359,473 B2 | 6/2016 | Nagao et al. |
| 9,376,531 B2 | 6/2016 | Allen et al. |
| 9,388,277 B2 | 7/2016 | Farmer |
| 9,399,701 B2 | 7/2016 | Allen et al. |
| 9,422,397 B2 | 8/2016 | Allen et al. |
| 9,453,100 B2 | 9/2016 | Allen et al. |
| 9,512,259 B2 | 12/2016 | Allen et al. |
| 9,809,678 B2 | 11/2017 | Allen et al. |
| 9,834,710 B2 | 12/2017 | Allen et al. |
| 9,850,345 B2 | 12/2017 | Farmer |
| 9,884,937 B2 | 2/2018 | Allen et al. |
| 2006/0089252 A1 | 4/2006 | Coates et al. |
| 2006/0293501 A1 | 12/2006 | Coates et al. |
| 2008/0021154 A1 | 1/2008 | Haider et al. |
| 2008/0051554 A1 | 2/2008 | Coates et al. |
| 2010/0048935 A1 | 2/2010 | Mijolovic et al. |
| 2010/0121026 A1 | 5/2010 | Lee et al. |
| 2010/0204437 A1 | 8/2010 | Coates et al. |
| 2010/0256329 A1 | 10/2010 | Nozaki et al. |
| 2010/0323201 A1 | 12/2010 | Son et al. |
| 2011/0087001 A1 | 4/2011 | Coates et al. |
| 2011/0152497 A1 | 6/2011 | Allen et al. |
| 2011/0207909 A1 | 8/2011 | Jeong et al. |
| 2011/0218127 A1 | 9/2011 | Allen et al. |
| 2011/0230580 A1 | 9/2011 | Allen et al. |
| 2011/0245424 A1 | 10/2011 | Jeong et al. |
| 2011/0251355 A1 | 10/2011 | Jeong et al. |
| 2012/0156410 A1 | 6/2012 | Allen |
| 2013/0066044 A1 | 3/2013 | Allen et al. |
| 2013/0244864 A1 | 9/2013 | Allen et al. |
| 2013/0337204 A1 | 12/2013 | Michel et al. |
| 2014/0046008 A1 | 2/2014 | Allen et al. |
| 2014/0066591 A1 | 3/2014 | Coates et al. |
| 2014/0072806 A1 | 3/2014 | Allen et al. |
| 2014/0249279 A1 | 9/2014 | Williams et al. |
| 2015/0083326 A1 | 3/2015 | Allen et al. |
| 2015/0299386 A1 | 10/2015 | Allen et al. |
| 2015/0353680 A1 | 12/2015 | Coates et al. |
| 2016/0115288 A1 | 4/2016 | Waddington |
| 2016/0264728 A1 | 9/2016 | Allen et al. |
| 2016/0319064 A1 | 11/2016 | Allen et al. |
| 2017/0051106 A1 | 2/2017 | Farmer |
| 2017/0145147 A1 | 5/2017 | Allen et al. |
| 2017/0198203 A1 | 7/2017 | Allen et al. |

FOREIGN PATENT DOCUMENTS

| | | |
|---|---|---|
| CN | 101412809 A | 4/2009 |
| EP | 0222453 A2 | 5/1987 |
| EP | 0403313 A2 | 12/1990 |
| EP | 2112187 A1 | 10/2009 |
| EP | 2258745 A1 | 12/2010 |
| EP | 2146977 B1 | 11/2012 |
| EP | 2257559 B1 | 10/2014 |
| JP | H02-258828 A | 10/1990 |
| JP | 2575199 B2 | 1/1997 |
| JP | 2691014 B2 | 12/1997 |
| JP | 2005-511753 A | 4/2005 |
| JP | 2006002063 A | 1/2006 |
| JP | 2008-081518 | 4/2008 |
| JP | 2008-280399 A | 11/2008 |
| JP | 2008-546785 A | 12/2008 |
| JP | 2009-215529 A | 9/2009 |
| JP | 2010-202711 A | 9/2010 |
| KR | 2005-0113651 A | 12/2005 |
| KR | 10-0853358 B1 | 8/2008 |
| WO | WO-91/14694 A1 | 10/1991 |
| WO | WO-98/04538 A1 | 2/1998 |
| WO | WO-99/00444 A1 | 1/1999 |
| WO | WO-03/050154 A2 | 6/2003 |
| WO | WO-2004/087788 A1 | 10/2004 |
| WO | WO-2008/136591 A1 | 11/2008 |
| WO | WO-2008/150033 A1 | 12/2008 |
| WO | WO-2009/130182 A1 | 10/2009 |
| WO | WO-2009/137540 A1 | 11/2009 |
| WO | WO-2009/148889 A2 | 12/2009 |
| WO | WO-2010/013948 A2 | 2/2010 |
| WO | WO-2010/022388 A2 | 2/2010 |
| WO | WO-2010/028362 A1 | 3/2010 |
| WO | WO-2010/060038 A1 | 5/2010 |
| WO | WO-2010/062703 A1 | 6/2010 |
| WO | WO-2010/134425 A1 | 11/2010 |
| WO | WO-2010/147237 A1 | 12/2010 |
| WO | WO-2011/004730 A1 | 1/2011 |
| WO | WO-2011/005664 A2 | 1/2011 |
| WO | WO-2011/163133 A1 | 12/2011 |
| WO | WO-2012/071505 A1 | 5/2012 |

OTHER PUBLICATIONS

Coates et al., Cobalt-Based Complexes for the Copolymerization of Propylene Oxide and CO2 : Active and Selective Catalysts for Polycarbonate Synthesis, Angew. Chem. Int. Ed., 42: 5484-5487 (2003).

Coates et al., Electronic and Steric Effects on Catalysts for CO2/ Epoxide Polymerization: Subtle Modifications Resulting in Superior Activities, Angew. Chem. Int. Ed., 41: 2599-2602 (2002).

Coates, G.W. and Moore, D.R., Discrete Metal-Based Catalysts for the Copolymerization of CO2 and Epoxides: Discovery, Reactivity, Optimization, and Mechanism, Angewandte Chemie International Edition, 43: 6618-6639 (2004).

Cohen et al. Alternating Copolymerization of Propylene Oxide and Carbon Dioxide with Highly Efficient and Selective (Salen)Co(III) Catalysts: Effect of Ligand and Cocatalyst Variation, J. Polymer Sci.: Part A, 44: 5182-5191 (2006).

Darensbourg, D.J. et al., Mechanistic aspects of the copolymerization reaction of carbon dioxide and epoxides, using a chiral salen chromium chloride catalyst, Journal of the American Chemical Society, 124: 6335-6342 (2002).

Darensbourg, D.J., Making plastics from carbon dioxide: salen metal complexes as catalysts for the production of polycarbonates from epoxides and CO2, Chemical Reviews,107(6):2388-410 (2007).

Decision of the Appeal against the Final Rejection (IPT Case No. 2012 Won 9333) of Korean Patent No. 10-1426410 (Trail decision rendered on Jan. 23, 2014). English Translation Copy.

Decision of the Appeal against the Final Rejection (IPT Case No. 2012 Won 9333) of Korean Patent No. 10-1426410 (Trail decision rendered on Jan. 23, 2014). Korean Copy.

Gao et al., Copolimerization of Carbon Dioxide and Propylene Oxide with Zinc Glutarate as Catalyst in the Presence of Compounds Containing Active Hydrogen, Journal of Applied Polymer Science, 104, 15-20 (2006).

(56) References Cited

OTHER PUBLICATIONS

Gorecki, P. and Kuran, W., Diethylzinc-trihydric phenol catalysts for copolymerization of carbon dioxide and propylene oxide: Activity in Copolymerization and Copolymer destruction processes, Journal of Polymer Science, Part C, 23: 299-304 (1985).
Inoue, S., Immortal Polymerization: The Outset, Development, and Application, Journal of Polymer Science: Part A: Polymer Chemistry, 38: 2861-2871 (2000).
International Search Report for PCT/US2009/056220 dated Nov. 20, 2009.
Ionescu, M., Chemistry and Technology of Polyols for Polyurethanes, Rapra Technology Limited, 605 pages (2005).
Jacobsen et al., Electronic Tuning of Asymmetric Catalysts J. Am. Chem. Soc., 113: 6703-6704 (1991).
Jacobsen et al., Enantioselective Epoxidation of Unfunctionalized Olefins Catalyzed by (Salen) manganese Complexes, J. Am. Chem. Soc., 112, 2801-2803 (1990).
Jacobsen et al., Highly Enantioselective Epoxidation Catalysts Derived from 1,2 Diaminocyclohexane, J. Am. Chem. Soc., 113:7063-7064 (1991).
Kim Sung-chul et al., Polymer Engineering I, Heejungdang, 18-20 (1994). Best Available Copy. No English Translation Available.
Kuran, W. et al., Alternating copolymerization of carbon dioxide and propylene oxide in the presence of organometallic catalysts, Die Makromolekulare Chemie, 177:11-20 (1976).
Lee et al., A Highly Active and Recyclable Catalytic System for CO2/Propylene Oxide Copolymerizations, Angew. Chem., 120: 7416-7419 (2008).
Lee et al., Connection of polymer chains using diepoxide in CO2/propylene oxide copolymerizations, Polym. Chem., 2:950-956 (2011).
Lee, Preparation of flame-retarding poly(propylene carbonate), Green Chem., 13: 3469-3475 (2011).
Lu et al., Asymmetric Catalysis with CO2: Direct Syntheis of Optically Active Propylene Carbonate from Racemic Epoxides, J. Am. Chem. Soc., 126: 3732-3733 (2004).
Lu et al., Cobalt catalysts for the coupling of CO2 and epoxides to provide polycarbonates and cyclic arbonates, Chem. Soc. Rev., 41: 1462-1484 (2012).
Lu et al., Design of Highly Active Binary Catalyst Systems for CO/Epoxide Copolymerization: Polymer Selectivity, Enantioselectivity, and Stereochemistry Control, J. Am. Chem. Soc., 128: 1664-1674 (2006).
Lu et al., Highly Active, Binary Catalyst Systems for the Alternating Copolymerization of CO2 and Epoxides under Mild Conditions, Angew. Chem. Int. Ed., 43: 3574-3577 (2004).
Lu et al., Mechanistic Aspects of the Copolymerization of CO2 with Epoxides Using a Thermally Stable Single-Site Cobalt(III) Catalyst, J. Am. Chem. Soc., 131: 11509-11518 (2009).
Nakajima et al., Asymmetric Oxidation of Sulfides to Sulfoxides by Organic Hydroperoxides with Optically Active Schiff Base-Oxovanadium (IV) Catalysts, Chemistry Letters, 1483-1486 (1996).
Nakano, K. et al., Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).
Nakano, K. et al., Supporting Information, 12 pages (2006). Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).
Noordover, B.A.J., Biobased step-growth polymers: chemistry, functionality and applicability, Eindhoven University of Technology, 219 pages (Published Jan. 1, 2008). [Download date Apr. 20, 2018].
Odian, G., Principles of Polymerization, Second Edition, Korean Student Edition, Yeonhap Publishing Company, 1-12 (issued Jul. 20, 1986).
Preliminary Rejection of Japanese Publication No. 2008-081518 (Apr. 3, 2012). English Translation Copy.
Preliminary Rejection of Japanese Publication No. 2008-081518 (Apr. 3, 2012). Japanese Copy.
Qin, Z. et al., Cobalt-based complexes for the copolymerization of propylene oxide and CO2: active and selective catalysts for; polycarbonate synthesis, Angewandte Chemie International Edition English, 42(44):5484-7 (2003).
Request for Invalidation Trial of Korean Patent No. 1426410, 50 pages. English Translation Copy.
Request for Invalidation Trial of Korean Patent No. 1426410, 76 pages. Korean Copy.
Rieger et al., Recent advances in CO2/epoxide copolymerization-New strategies and cooperative mechanisms, Cordination Chemistry Reviews 255: 1460-1479 (2011).
Smith, C. P. et al., Thermoplastic Polyurethane Elastomers Made from High Molecular Weight POLY-L® Polyols, Journal of Elastomers and Plastics, 24: 306-322 (1992).
Sugimoto et al, Manufacture of alkylene oxide-carbon dioxide copolymers, Database CA [Online] Chemical Abstracts Service, Database accession No. 2008:444531, Abstract (Dec. 31, 2008).
Sugimoto, H. et al., Alternating Copolymerization of Carbon Dioxide and Epoxide Catalysed by an Aluminum Schiff Base-Ammonium Salt System, Journal of Polymer Science: Part A: Polymer Chemistry, 43: 4172-4186 (2005).
Sujith et al., A Highly Active and Recyclable Catalytic System for CO2/Propylene Oxide Copolymerization, Angew. Chem. Int. Ed., 47: 7306-7309 (2008).
Sujith et al., A Highly Active and Recyclable Catalytic System for CO2/Propylene Oxide Copolymerization, Angew. Chem. Int. Ed., 47: 7306-7309 (2008). Supporting Information.
Van Meerendonk, W.J. et al, Unexpected Side Reactions and Chain Transfer for Zinc-Catalyzed Copolymerization of Cyclohexene Oxide and Carbon Dioxide, Macromolecules, 38: 7306-7313 (2005).
Williams et al., Catalysts for CO2/epoxide Polymerisation, Chem Commun., 47:141-163 (2011).
Yang et al., Rate of Regulated Copolymerization Involving CO2, Journal of Natural Gas Chemistry, 7(2): 149-156 (1998).
Zhang, X.H. et al., Highly active double metal cyanide complexes: Effect of central metal and ligand on reaction of epoxide/CO2, Chinese Chemical Letters, 18: 887-890 (2007).
European Patent Office Communication of Notices of Opposition, EP Application No. 09792317.1, 23 pages (dated May 15, 2018).
Patent Court Decision in 2017 Heo 4044 Invalidation Trial of Korean Patent No. 1426410. (English Translation).

POLYCARBONATE POLYOL COMPOSITIONS AND METHODS

PRIORITY CLAIM

This application is a continuation of U.S. patent application Ser. No. 15/161,684, filed May 23, 2016 (now U.S. Pat. No. 9,809,678), which is a continuation of U.S. patent application Ser. No. 14/573,534, filed Dec. 17, 2014 (now U.S. Pat. No. 9,376,531), which is a continuation of U.S. patent application Ser. No. 14/040,001, filed Sep. 27, 2013 (now U.S. Pat. No. 8,921,508), which is a continuation of U.S. patent application Ser. No. 13/584,989, filed Aug. 14, 2012 (now U.S. Pat. No. 8,604,155), which is a continuation of U.S. patent application Ser. No. 12/994,544, filed Nov. 24, 2010 (now U.S. Pat. No. 8,247,520), which is a national phase application under 35 U.S.C. § 371 of PCT International Application No. PCT/US2009/056220, filed Sep. 8, 2009, which claims priority to U.S. Provisional Patent Application Ser. No. 61/095,178, filed Sep. 8, 2008, the entire contents each of which are incorporated herein by reference.

BACKGROUND

Aliphatic polycarbonates (APCs) have utility as polyol building blocks for the construction of co-polymers such as flexible urethane foams, urethane coatings, rigid urethane foams, urethane/urea elastomers and plastics, adhesives, polymeric coatings and surfactants among others. Examples of such APCs include poly(propylene carbonate) (PPC); poly(ethylene carbonate) (PEC); poly(butylene carbonate) (PBC); and poly(cyclohexene carbonate) (PCHC) as well as copolymers of two or more of these.

To have utility in these applications, it is preferable that all polycarbonate polymer chain ends terminate with hydroxyl groups. Such hydroxyl groups serve as reactive moieties for cross-linking reactions or act as sites on which other blocks of a co-polymer can be constructed. It is problematic if a portion of the chain ends on the APC are not hydroxy groups since this results in incomplete cross-linking or termination of the block copolymer. A typical specification for aliphatic polycarbonate polyol resins for use in such applications is that at least 98% or in some cases greater than 99% of chain ends terminate in hydroxyl groups. In addition, these applications typically call for relatively low molecular weight oligomers (e.g. polymers having average molecular weight numbers ($M_n$) between about 500 and about 15,000 g/mol). It is also desirable that the polyols have a narrowly defined molecular weight distribution—for example, a polydispersity index less than about 2 is desirable, but much narrower distributions (i.e. PDI<1.2) can be advantageous. Furthermore, for certain applications, polyol polycarbonates having little or no contamination with ether linkages are desirable.

Aliphatic polycarbonates can be conveniently synthesized by copolymerization of carbon dioxide and epoxides as shown in Scheme 1.

SCHEME 1

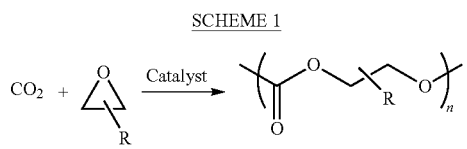

Currently, there are several catalytic systems utilized for such syntheses, namely: heterogeneous catalyst systems based on zinc or aluminum salts; double metal cyanide (DMC) catalysts; and homogenous catalysts based on coordination complexes of transition metals or aluminum.

The catalytic systems using heterogeneous zinc or aluminum salts are typified by those first described by Inoue in the 1960s (for example in U.S. Pat. Nos. 3,900,424 and 3,953,383. Further improvements to these catalysts have been made over the years (for example as described in W. Kuran, et al. *Chem. Macromol. Chem. Phys.* 1976, 177, pp 11-20 and Gorecki, et al. *J. Polym. Sci. Part C* 1985, 23, pp. 299-304). Nonetheless, these catalyst systems are generally not suitable for producing polyol resins with the low molecular weights and narrow polydispersity demanded by many applications. The catalysts are of relatively low activity and produce high molecular weight polymer with broad polydispersity. Additionally, the polycarbonates produced by these catalysts have a significant proportion of ether linkages in the chain which can be undesirable in certain applications.

A second class of catalysts for the polymerization of epoxides and $CO_2$ are the double metal cyanide (DMC) catalysts. Such catalysts are exemplified by those reported by Kruper and Smart in U.S. Pat. No. 4,500,704. Compared to the Inoue-type catalysts, the DMC systems are better suited to the formation of low molecular weight polymers and produce a predominance of chains with hydroxyl end groups. However, these catalysts produce polymers having a high proportion of ether linkages and the materials they produce are more properly regarded as polycarbonate-polyether copolymers rather than as aliphatic polycarbonates per se.

A more recently developed class of catalysts is based on coordination complexes of aluminum or a variety of transition metals, particularly complexes of cobalt, chromium and manganese. Examples of such catalysts are disclosed in U.S. Pat. Nos. 6,870,004 and 7,304,172. In some cases these catalytic systems are highly active and are capable of providing aliphatic polycarbonate with narrow polydispersity, a high percentage of carbonate linkages and good regioselectivity (e.g. high head-to-tail ratios for incorporation of monosubstituted epoxides). However, at high conversions under standard conditions, these catalysts produce high molecular weight polymers that are not suitable for many polyol applications. Additionally, using these systems, it has not been practical to synthesize polycarbonate polyols having a high percentage of hydroxyl end-groups.

The lack of hydroxyl end-groups is due to the fact that anion(s) associated with the metal center of the catalyst complex become covalently bound to the polymer chain during initiation of polymer chain growth. This is true also of anions associated with any optionally present cationic co-catalysts used in these reactions. Without wishing to be bound by theory or thereby limit the scope of the present invention, the sequence shown in Scheme 2, depicts a probable reaction sequence showing why the anions (denoted —X) associated with the catalyst complex (denoted 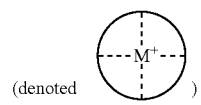 )

become covalently linked to the polycarbonate chain.

SCHEME 2

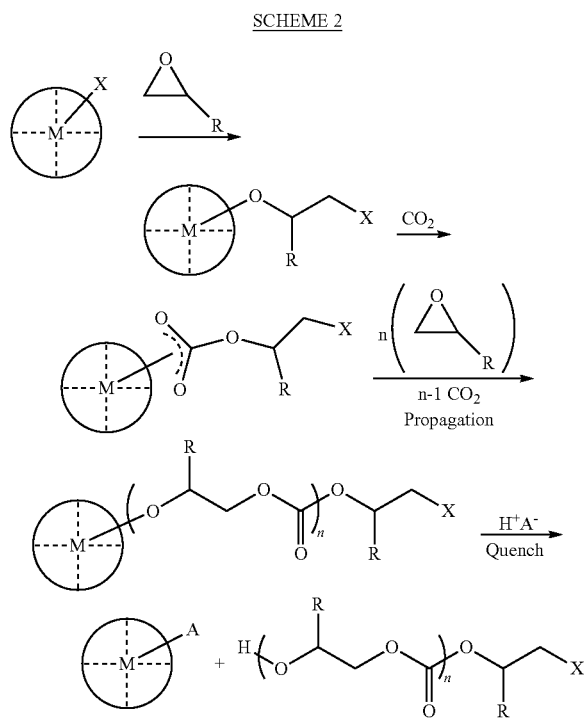

The counterions —X typically used for these catalysts include halides, sulfonates, phenolates, carboxylates and azide. Because polymerization is initiated when one of these anions opens an epoxide ring, one end of each polymer chain (the initiation end) is necessarily capped with a non-hydroxyl moiety such as a halogen, an alkylsulfonate, a phenylether, an acyl group, or an azide, respectively.

The other factor disfavoring the use of these catalytic systems to produce polyol resins is the fact that they produce high molecular weight polymer when taken to high conversions. Typical molecular weights are in the range of 20,000 to 400,000 g/mol-values well above the molecular weight range desired for most polyol resin applications. Potential strategies to produce lower molecular weight materials include: stopping the polymerization at low conversion; using high catalyst concentrations; degrading the high molecular weight polymer to shorter chains, or using chain transfer agents (CTAs) such as alcohols during the polymerization. Stopping the reaction at low conversion or increasing the catalyst concentration are undesirable due to cost considerations and added difficulties in purification occasioned by the increased concentration of catalyst-derived contaminants in the crude polymer. Degradation of higher molecular weight polymers to produce low molecular weight resins leads to increased polydispersity, adds additional steps to the production process, and leads to contamination with cyclic by-products. Chain transfer agents can be successfully employed to lower the molecular weight of the polymer without a significant increase in cost or contamination. However, this strategy does not alleviate the problem of non-hydroxyl end groups since polymer chains initiated by chain transfer agent will still have one end capped with a non-hydroxyl moiety (i.e. an ether corresponding to the alcohol used as the CTA).

As such, there remains a need for catalysts and methods that are capable of efficiently producing polycarbonate polyols having high carbonate content.

SUMMARY OF THE INVENTION

In one aspect, the present disclosure encompasses polymerization systems for the copolymerization of $CO_2$ and epoxides comprising 1) a metal complex including a metal coordination compound having a permanent ligand set and at least one ligand that is a polymerization initiator, and 2) a chain transfer agent having two or more sites that can initiate polymerization.

In some embodiments, a ligand that is a polymerization initiator has two or more sites capable of initiating polymerization, this variation leads to polycarbonate polyols with an extremely high proportion of —OH end groups. In certain embodiments, the chain transfer agent and the ligand that is a polymerization initiator are the same molecule (or ionic forms of the same molecule).

In certain embodiments, a polymerization system further includes a co-catalyst. In some embodiments, the co-catalyst is a cationic organic molecule. In certain embodiments, an anion present to balance the charge of a cationic co-catalyst is also a polymerization initiator having two or more sites that can initiate polymerization. In certain embodiments, the ligand that is a polymerization initiator, and the counterion of the co-catalyst are the same molecule. In certain embodiments, the chain transfer agent, the ligand that is a polymerization initiator, and an anion associated with a co-catalyst are the same molecule (or ionic forms of the same molecule).

In some embodiments, the present disclosure encompasses methods for the synthesis of polycarbonate polyols. In some embodiments, a method includes the steps of: 1) providing a reaction mixture including one or more epoxides and at least one chain transfer agent having two or more sites capable of initiating polymerization, 2) contacting the reaction mixture with a with a metal complex comprising a metal coordination compound having a permanent ligand set and at least one ligand that is a polymerization initiator, and 3) allowing the polymerization reaction to proceed for a length of time sufficient for the average molecular weight of the polycarbonate polyol formed to reach a desired value. In some embodiments the method further includes contacting the reaction mixture with a co-catalyst.

In some embodiments, the present disclosure encompasses polycarbonate polyol compositions characterized in that polymer chains have a high percentage of —OH end groups and a high percentage of carbonate linkages. Such compositions are further characterized in that polymer chains contain within them a polyfunctional moiety linked to a plurality of individual polycarbonate chains. In certain embodiments, polycarbonate polyol compositions are further characterized by having one or more of the following features: a carbonate-to-ether linkage ratio of at least 10:1, a head-to-tail ratio of at least 5:1, or a polydispersity index of less than 2. In certain embodiments of this aspect, a polymer composition is further characterized in that a polymer contains a plurality of polymer chain types differentiated by the presence of different polyfunctional polymerization initiators embedded within the chain, or by differences in the end-groups present on the polymer chains.

In certain embodiments, polycarbonate polyol compositions of the present disclosure are further characterized in that they contain a mixture of two or more chain types, wherein the chain different chain types are differentiated from one another by differences in the identity of the embedded polyfunctional polymerization initiators, the absence of embedded polyfunctional polymerization initiators, or the presence of non-hydroxyl end groups on certain chains.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, N Y, 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloallenyl)alkyl or (cycloalkyl)alkenyl.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In certain embodiments, the term "3- to 8-membered carbocycle" refers to a 3- to 8-membered saturated or partially unsaturated monocyclic carbocyclic ring. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring. In certain embodiments, the term "$C_{3-20}$ carbocycle" refers to a 3- to 8-membered saturated or partially unsaturated monocyclic carbocyclic ring, or a 7- to 20-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring. In certain embodiments, the term "6- to 12-membered aryl" refers to a phenyl or an 8- to 12-membered polycyclic aryl ring. In certain embodiments, the term "$C_{6-14}$ aryl" refers to a phenyl or an 8- to 14-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or +NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 8-membered heterocycle" refers to a 3- to 8-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur. In some embodiments, the term "3- to 14-membered heterocycle" refers to a 3- to 8-membered saturated or partially unsaturated monocyclic heterocyclic ring having 1 to 2 heteroatoms independently selected from nitrogen, oxygen, or sulfur, or a 7- to 14-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

One of ordinary skill in the art will appreciate that compound and synthetic methods, as described herein, may utilize a variety of protecting groups. By the term "protecting group," as used herein, it is meant that a particular functional moiety, e.g., O, S, or N, is masked or blocked, permitting, if desired, a reaction to be carried out selectively at another reactive site in a multifunctional compound. Suitable protecting groups are well known in the art and include those described in detail in *Protecting Groups in Organic Synthesis*, T. W. Greene and P. G. M. Wuts, 3$^{rd}$ edition, John Wiley & Sons, 1999, the entirety of which is incorporated herein by reference. In certain embodiments, a protecting group reacts selectively in good yield to give a protected substrate that is stable to the projected reactions; the protecting group is preferably selectively removable by readily available, preferably non-toxic reagents that do not attack the other functional groups; the protecting group forms a separable derivative (more preferably without the generation of new stereogenic centers); and the protecting group will preferably have a minimum of additional functionality to avoid further sites of reaction. As detailed herein, oxygen, sulfur, nitrogen, and carbon protecting groups may be utilized. By way of non-limiting example, hydroxyl protecting groups include methyl, methoxylmethyl (MOM), methylthiomethyl (MTM), t-butylthiomethyl, (phenyldimethylsilyl)methoxymethyl (SMOM), benzyloxymethyl (BOM), p-methoxybenzyloxymethyl (PMBM), (4-methoxyphenoxy)methyl (p-AOM), guaiacolmethyl (GUM), t-butoxymethyl, 4-pentenyloxymethyl (POM), siloxymethyl, 2-methoxyethoxymethyl (MEM), 2,2,2-trichloroethoxymethyl, bis(2-chloroethoxy)methyl, 2-(trimethylsilyl)ethoxymethyl (SEMOR), tetrahydropyranyl (THP), 3-bromotetrahydropyranyl, tetrahydrothiopyranyl, 1-methoxycyclohexyl, 4-methoxytetrahydropyranyl (MTHP), 4-methoxytetrahydrothiopyranyl, 4-methoxytetrahydrothiopyranyl S,S-dioxide, 1-[(2-chloro-4-methyl)phenyl]-4-methoxypiperidin-4-yl (CTMP), 1,4-dioxan-2-yl, tetrahydrofuranyl, tetrahydrothiofuranyl, 2,3,3a,4,5,6,7,7a-octahydro-7,8,8-trimethyl-4,7-methanobenzofuran-2-yl, 1-ethoxyethyl, 1-(2-chloroethoxy)ethyl, 1-methyl-1-methoxyethyl, 1-methyl-1-benzyloxyethyl, 1-methyl-1-benzyloxy-2-fluoroethyl, 2,2,2-trichloroethyl, 2-trimethylsilylethyl, 2-(phenylselenyl)ethyl, t-butyl, allyl, p-chlorophenyl, p-methoxyphenyl, 2,4-dinitrophenyl, benzyl, p-methoxybenzyl, 3,4-dimethoxybenzyl, o-nitrobenzyl, p-nitrobenzyl, p-halobenzyl, 2,6-dichlorobenzyl, p-cyanobenzyl, p-phenylbenzyl, 2-picolyl, 4-picolyl, 3-methyl-2-picolyl N-oxido, diphenylmethyl, p,p'-dinitrobenzhydryl, 5-dibenzosuberyl, triphenylmethyl, α-naphthyldiphenylmethyl, p-methoxyphenyldiphenylmethyl, di(p-methoxyphenyl)phenylmethyl, tri(p-methoxyphenyl)methyl, 4-(4'-bromophenacyloxyphenyl)diphenylmethyl, 4,4',4''-tris(4,5-dichlorophthalimidophenyl)methyl, 4,4',4''-tris(levulinoyloxyphenyl)methyl, 4,4',4''-tris(benzoyloxyphenyl)methyl, 3-(imidazol-1-yl)bis (4',4''-dimethoxyphenyl)methyl, 1,1-bis(4-methoxyphenyl)-1'-pyrenylmethyl, 9-anthryl, 9-(9-phenyl)xanthenyl, 9-(9-phenyl-10-oxo)anthryl, 1,3-benzodithiolan-2-yl, benzisothiazolyl S,S-dioxido, trimethylsilyl (TMS), triethylsilyl (TES), triisopropylsilyl (TIPS), dimethylisopropylsilyl (IPDMS), diethylisopropylsilyl (DEIPS), dimethylthexylsilyl, t-butyldimethylsilyl (TBDMS), t-butyldiphenylsilyl (TBDPS), tribenzylsilyl, tri-p-xylylsilyl, triphenylsilyl, diphenylmethylsilyl (DPMS), t-butylmethoxyphenylsilyl (TBMPS), formate, benzoylformate, acetate, chloroacetate, dichloroacetate, trichloroacetate, trifluoroacetate, methoxyacetate, triphenylmethoxyacetate, phenoxyacetate, p-chlorophenoxyacetate, 3-phenylpropionate, 4-oxopentanoate (levulinate), 4,4-(ethylenedithio)pentanoate (levulinoyldithioacetal), pivaloate, adamantoate, crotonate, 4-methoxycrotonate, benzoate, p-phenylbenzoate, 2,4,6-trimethylbenzoate (mesitoate), alkyl methyl carbonate, 9-fluorenylmethyl carbonate (Fmoc), alkyl ethyl carbonate, alkyl 2,2,2-trichloroethyl carbonate (Troc), 2-(trimethylsilyl)ethyl carbonate (TMSEC), 2-(phenylsulfonyl) ethyl carbonate (Psec), 2-(triphenylphosphonio) ethyl carbonate (Peoc), alkyl isobutyl carbonate, alkyl vinyl carbonate alkyl allyl carbonate, alkyl p-nitrophenyl carbonate, alkyl benzyl carbonate, alkyl p-methoxybenzyl carbonate, alkyl 3,4-dimethoxybenzyl carbonate, alkyl o-nitrobenzyl carbonate, alkyl p-nitrobenzyl carbonate, alkyl S-benzyl thiocarbonate, 4-ethoxy-1-napththyl carbonate, methyl dithiocarbonate, 2-iodobenzoate, 4-azidobutyrate, 4-nitro-4-methylpentanoate, o-(dibromomethyl)benzoate, 2-formylbenzenesulfonate, 2-(methylthiomethoxy)ethyl, 4-(methylthiomethoxy)butyrate, 2-(methylthiomethoxymethyl)benzoate, 2,6-dichloro-4-methylphenoxyacetate, 2,6-dichloro-4-(1,1,3,3-tetramethylbutyl)phenoxyacetate, 2,4-bis(1,1-dimethylpropyl)phenoxyacetate, chlorodiphenylacetate, isobutyrate, monosuccinoate, (E)-2-methyl-2-butenoate, o-(methoxycarbonyl)benzoate, α-naphthoate, nitrate, alkyl N,N,N',N'-tetramethylphosphorodiamidate, alkyl N-phenylcarbamate, borate, dimethylphosphinothioyl, alkyl 2,4-dinitrophenylsulfenate, sulfate, methanesulfonate (mesylate), benzylsulfonate, and tosylate (Ts). For protecting 1,2- or 1,3-diols, the protecting groups include methylene acetal, ethylidene acetal, 1-t-butylethylidene ketal, 1-phenylethylidene ketal, (4-methoxyphenyl)ethylidene acetal, 2,2,2-trichloroethylidene acetal, acetonide, cyclopentylidene ketal, cyclohexylidene ketal, cycloheptylidene ketal, benzylidene acetal, p-methoxybenzylidene acetal, 2,4-dimethoxybenzylidene ketal, 3,4-dimethoxybenzylidene acetal, 2-nitrobenzylidene acetal, methoxymethylene acetal, ethoxymethylene acetal, dimethoxymethylene ortho ester, 1-methoxyethylidene ortho ester, 1-ethoxyethylidine ortho ester, 1,2-dimethoxyethylidene ortho ester, α-methoxybenzylidene ortho ester, 1-(N,N-dimethylamino)ethylidene derivative, α-(N,N'-dimethylamino)benzylidene derivative, 2-oxacyclopentylidene ortho ester, di-t-butylsilylene group (DTBS), 1,3-(1,1,3,3-tetraisopropyldisiloxanylidene) derivative (TIPDS), tetra-t-butoxydisiloxane-1,3-diylidene derivative (TBDS), cyclic carbonates, cyclic boronates, ethyl boronate, and phenyl boronate. Amino-protecting groups include methyl carbamate, ethyl carbamante, 9-fluorenylmethyl carbamate (Fmoc), 9-(2-sulfo)fluorenylmethyl carbamate, 9-(2,7-dibromo)fluoroenylmethyl carbamate, 2,7-di-t-butyl-[9-(10,10-dioxo-10,10,10,10-tetrahydrothioxanthyl)]methyl carbamate (DBD-Tmoc), 4-methoxyphenacyl carbamate (Phenoc), 2,2,2-trichloroethyl carbamate (Troc), 2-trimethylsilylethyl carbamate (Teoc), 2-phenylethyl carbamate (hZ), 1-(1-adamantyl)-1-methylethyl carbamate (Adpoc), 1,1-dimethyl-2-haloethyl carbamate, 1,1-dimethyl-2,2-dibromocthyl carbamate (DB-t-BOC), 1,1-dimethyl-2,2,2-trichloroethyl carbamate (TCBOC), 1-methyl-1-(4-biphenylyl)ethyl carbamate (Bpoc), 1-(3,5-di-t-butylphenyl)-1-methylethyl carbamate (t-Bumeoc), 2-(2'- and 4'-pyridyl)ethyl carbamate (Pyoc), 2-(N,N-dicyclohexylcarboxamido)ethyl carbamate, t-butyl carbamate (BOC), 1-adamantyl carbamate (Adoc), vinyl carbamate (Voc), allyl carbamate (Alloc), 1-isopropylallyl carbamate (Ipaoc), cinnamyl carbamate (Coc), 4-nitrocinnamyl carbamate (Noc), 8-quinolyl carbamate, N-hydroxypiperidinyl carbamate, alkyldithio carbamate, benzyl carbamate (Cbz), p-methoxybenzyl carbamate (Moz), p-nitobenzyl carbamate, p-bromobenzyl carbamate, p-chlorobenzyl carbamate, 2,4-dichlorobenzyl carbamate, 4-methylsulfinylbenzyl carbamate (Msz), 9-anthrylmethyl carbamate, diphenylmethyl carbamate, 2-methylthioethyl carbamate, 2-methylsulfonylethyl carbamate, 2-(p-toluenesulfonyl)ethyl carbamate, [2-(1,3-dithianyl)]methyl carbamate (Dmoc), 4-methylthiophenyl carbamate (Mtpc), 2,4-dimethylthiophenyl carbamate (Bmpc), 2-phosphonioethyl carbamate (Peoc), 2-triphenylphosphonioisopropyl carbamate (Ppoc), 1,1-dimethyl-2-cyanoethyl carbamate, m-chloro-p-acyloxybenzyl carbamate, p-(dihydroxyboryl)benzyl carbamate, 5-benzisoxazolylmethyl carbamate, 2-(trifluoromethyl)-6-chromonylmethyl carbamate (Tcroc), m-nitrophenyl carbamate, 3,5-dimethoxybenzyl carbamate, o-nitrobenzyl carbamate, 3,4-dimethoxy-6-nitrobenzyl carbamate, phenyl(o-nitrophenyl)methyl carbamate, phenothiazinyl-(10)-carbonyl derivative, N'-p-toluenesulfonylaminocarbonyl derivative, N'-phenylaminothiocarbonyl derivative, t-amyl carbamate, S-benzyl thiocarbamate, p-cyanobenzyl carbamate, cyclobutyl carbamate, cyclohexyl carbamate, cyclopentyl carbamate, cyclopropylmethyl carbamate, p-decyloxybenzyl carbamate, 2,2-dimethoxycarbonylvinyl carbamate, o-(N,N-dimethylcarboxamido)benzyl carbamate, 1,1-dimethyl-3-(N,N-dimethylcarboxamido)propyl carbamate, 1,1-dimethylpropynyl carbamate, di(2-pyridyl)methyl carbamate, 2-furanylmethyl carbamate, 2-iodoethyl carbamate, isoborynl carbamate, isobutyl carbamate, isonicotinyl carbamate, p-(p'-methoxyphenylazo)benzyl carbamate, 1-methylcyclobutyl carbamate, 1-methylcyclohexyl carbamate, 1-methyl-1-cyclopropylmethyl carbamate, 1-methyl-1-(3,5-dimethoxyphenyl)ethyl carbamate, 1-methyl-1-(p-phenylazophenyl)ethyl carbamate, 1-methyl-1-phenylethyl carbamate, 1-methyl-1-(4-pyridyl) ethyl carbamate, phenyl carbamate, p-(phenylazo)benzyl carbamate, 2,4,6-tri-t-butylphenyl carbamate, 4-(trimethylammonium)benzyl carbamate, 2,4,6-trimethylbenzyl carbamate, formamide, acetamide, chloroacetamide, trichloroacetamide, trifluoroacetamide, phenylacetamide, 3-phenylpropanamide, picolinamide, 3-pyridylcarboxamide, N-benzoylphenylalanyl derivative, benzamide, p-phenylbenzamide, o-nitophenylacetamide, o-nitrophenoxyacetamide, acetoacetamide, (N'-dithiobenzyloxycarbonylamino) acetamide, 3-(p-hydroxyphenyl)propanamide, 3-(o-nitrophenyl)propanamide, 2-methyl-2-(o-nitrophenoxy)propanamide, 2-methyl-2-(o-phenylazophenoxy)propanamide, 4-chlorobutanamide, 3-methyl-3-nitrobutanamide, o-nitrocinnamide, N-acetylmethionine derivative, o-nitrobenzamide, o-(benzoyloxymethyl)benzamide, 4,5-diphenyl-3-oxazolin-2-one, N-phthalimide, N-dithiasuccinimide (Dts), N-2,3-diphenylmaleimide, N-2,5-dimethylpyrrole, N-1,1,4,4-tetramethyldisilylazacyclopentane adduct (STABASE), 5-substituted 1,3-dimethyl-1,3,5-triazacyclohexan-2-one, 5-substituted 1,3-dibenzyl-1,3,5-triazacyclohexan-2-one, 1-substituted 3,5-dinitro-4-pyridone, N-methylamine, N-allylamine, N-[2-(trimethylsilyl)ethoxy]methylamine (SEM), N-3-acetoxypropylamine, N-(1-isopropyl-4-nitro-2-oxo-3-pyroolin-3-yl)amine, quaternary ammonium salts, N-benzylamine, N-di(4-methoxyphenyl)methylamine, N-5-dibenzosuberylamine, N-triphenylmethylamine (Tr), N-[(4-methoxyphenyl)diphenylmethyl]amine (MMTr), N-9-phenylfluorenylamine (PhF), N-2,7-dichloro-9-fluorenylmethyleneamine, N-ferrocenylmethylamino (Fcm), N-2-picolylamino N'-oxide, N-1,1-dimethylthiomethyleneamine, N-benzylideneamine, N-p-methoxybenzylideneamine, N-diphenylmethyleneamine, N-[(2-pyridyl)mesityl]methyleneamine, N—(N',N'-dimethylaminomethylene) amine, N,N'-isopropylidenediamine, N-p-nitrobenzylideneamine, N-salicylideneamine, N-5-chlorosalicylideneamine, N-(5-chloro-2-hydroxyphenyl) phenylmethyleneamine, N-cyclohexylideneamine, N-(5,5-dimethyl-3-oxo-1-cyclohexenyl)amine, N-borane derivative, N-diphenylborinic acid derivative, N-[phenyl (pentacarbonylchromium- or tungsten)carbonyl]amine, N-copper chelate, N-zinc chelate, N-nitroamine, N-nitrosoamine, amine N-oxide, diphenylphosphinamide (Dpp), dimethylthiophosphinamide (Mpt), diphenylthiophosphinamide (Ppt), dialkyl phosphoramidates, dibenzyl phosphoramidate, diphenyl phosphoramidate, benzenesulfenamide, o-nitrobenzenesulfenamide (Nps), 2,4-dinitrobenzenesulfenamide, pentachlorobenzenesulfenamide, 2-nitro-4-methoxybenzencsulfenamide, triphenylmethylsulfenamide, 3-nitropyridincsulfenamide (Npys), p-toluenesulfonamide (Ts), benzenesulfonamide, 2,3,6,-trimethyl-4-methoxybenzenesulfonamide (Mtr), 2,4,6-trimethoxybenzenesulfonamide (Mtb), 2,6-dimethyl-4-methoxybenzenesulfonamide (Pme), 2,3,5,6-tetramethyl-4-methoxybenzenesulfonamide (Mte), 4-methoxybenzenesulfonamide (Mbs), 2,4,6-trimethylbenzenesulfonamide (Mts), 2,6-dimethoxy-4-methylbenzenesulfonamide (iMds), 2,2,5,7,8-pentamethylchroman-6-sulfonamide (Pmc), methanesulfonamide (Ms), β-trimethylsilylethanesulfonamide (SES), 9-anthracenesulfonamide, 4-(4',8'-dimethoxynaphthylmethyl)benzenesulfonamide (DNMBS), benzylsulfonamide, trifluoromethylsulfonamide, and phenacylsulfonamide. Exemplary protecting groups are detailed herein, however, it will be appreciated that the present invention is not intended to be limited to these protecting groups; rather, a variety of additional equivalent protecting groups can be readily identified using the above criteria and utilized in the method of the present invention. Additionally, a variety of protecting groups are described by Greene and Wuts (supra).

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R^\circ$; —$(CH_2)_{0-4}OR^\circ$; —O—$(CH_2)_{0-4}C(O)OR^\circ$; —$(CH_2)_{0-4}CH(OR^\circ)_2$; —$(CH_2)_{0-4}SR^\circ$; —$(CH_2)_{0-4}Ph$, which may be substituted with $R^\circ$; —$(CH_2)_{0-4}O(CH_2)_{0-1}Ph$ which may be substituted with $R^\circ$; —CH=CHPh, which may be substituted with $R^\circ$; —$NO_2$; —CN; —$N_3$; —$(CH_2)_{0-4}N(R^\circ)_2$; —$(CH_2)_{0-4}N(R^\circ)C(O)R^\circ$; —$N(R^\circ)C(S)R^\circ$; —$(CH_2)_{0-4}N(R^\circ)C(O)NR^\circ_2$; —$N(R^\circ)C(S)NR^\circ_2$; —$(CH_2)_{0-4}N(R^\circ)C(O)OR^\circ$; —$N(R^\circ)N(R^\circ)C(O)R^\circ$; —$N(R^\circ)N(R^\circ)C(O)NR^\circ_2$; —$N(R^\circ)N(R^\circ)C(O)OR^\circ$; —$(CH_2)_{0-4}C(O)R^\circ$; —$C(S)R^\circ$; —$(CH_2)_{0-4}C(O)OR^\circ$; —$(CH_2)_{0-4}C(O)N(R^\circ)_2$; —$(CH_2)_{0-4}C(O)SR^\circ$; —$(CH_2)_{0-4}C(O)OSiR^\circ_3$; —$(CH_2)_{0-4}OC(O)R^\circ$; —$OC(O)(CH_2)_{0-4}SR$—, $SC(S)SR^\circ$; —$(CH_2)_{0-4}SC(O)R^\circ$; —$(CH_2)_{0-4}C(O)NR^\circ_2$; —$C(S)NR^\circ_2$; —$C(S)SR^\circ$; —$SC(S)SR^\circ$, —$(CH_2)_{0-4}OC(O)NR^\circ_2$; —$C(O)N(OR^\circ)R^\circ$; —$C(O)C(O)R^\circ$; —$C(O)CH_2C(O)R^\circ$; —$C(NOR^\circ)R^\circ$; —$(CH_2)_{0-4}SSR^\circ$; —$(CH_2)_{0-4}S(O)_2R^\circ$; —$(CH_2)_{0-4}S(O)_2OR^\circ$; —$(CH_2)_{0-4}OS(O)_2R^\circ$; —$S(O)_2NR^\circ_2$; —$(CH_2)_{0-4}S(O)R^\circ$; —$N(R^\circ)S(O)_2NR^\circ_2$; —$N(R^\circ)S(O)_2R^\circ$; —$N(OR^\circ)R^\circ$; —$C(NH)NR^\circ_2$; —$P(O)_2R^\circ$; —$P(O)R^\circ_2$; —$OP(O)R^\circ_2$; —$OP(O)(OR^\circ)_2$; $SiR^\circ_3$; ($C_{1-4}$ straight or branched alkylene)O—$N(R^\circ)_2$; or —($C_{1-4}$ straight or branched alkylene)C(O)O—$N(R^\circ)_2$, wherein each $R^\circ$ may be substituted as defined below and is independently hydrogen, $C_{1-8}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur, or, notwithstanding the definition above, two independent occurrences of $R^\circ$, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on $R^\circ$ (or the ring formed by taking two independent occurrences of $R^\circ$ together with their intervening atoms), are independently halogen, —$(CH_2)_{0-2}R^\bullet$, -(haloR$^\bullet$), —$(CH_2)_{0-2}OH$, —$(CH_2)_{0-2}OR^\bullet$, —$(CH_2)_{0-2}CH(OR^\bullet)_2$; O(haloR$^\bullet$), —CN, —$N_3$, —$(CH_2)_{0-2}C(O)R^\bullet$, —$(CH_2)_{0-2}C(O)OH$, —$(CH_2)_{0-2}C(O)OR^\bullet$, —$(CH_2)_{0-4}C(O)N(R^\circ)_2$; —$(CH_2)_{0-2}SR^\bullet$, —$(CH_2)_{0-2}SH$, —$(CH_2)_{0-2}NH_2$, —$(CH_2)_{0-2}NHR^\bullet$, —$(CH_2)_{0-2}NR^\bullet_2$, —$NO_2$, —$SiR^\bullet_3$, —$OSiR^\bullet_3$, —$C(O)SR^\bullet$, —($C_{1-4}$ straight or branched alkylene)C(O)OR$^\bullet$, or —SSR$^\bullet$ wherein each $R^\bullet$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R^\circ$ include =O and =S.

Suitable divalent substituents on a saturated carbon atom of an "optionally substituted" group include the following: =O, =S, =NNR$^*_2$, =NNHC(O)R$^*$, =NNHC(O)OR$^*$, =NNHS(O)$_2$R$^*$, =NR$^*$, =NOR$^*$, —$O(C(R^*_2))_{2-3}O$—, or —$S(C(R^*_2))_{2-3}S$—, wherein each independent occurrence of R$^*$ is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —$O(CR^*_2)_{2-3}O$—, wherein each independent occurrence of R$^*$ is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R$^*$ include halogen, —$R^\bullet$, —(haloR$^\bullet$), —OH, —OR$^\bullet$, —O(haloR$^\bullet$), —CN, —C(O)OH, —C(O)OR$^\bullet$, —$NH_2$, —NHR$^\bullet$, —NR$^\bullet_2$, or —$NO_2$, wherein each R$^\bullet$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —$R^\dagger$, —$NR^\dagger_2$, —$C(O)R^\dagger$, —$C(O)OR^\dagger$, —$C(O)C(O)R^\dagger$, —$C(O)CH_2C(O)R^\dagger$, —$S(O)_2R^\dagger$, —$S(O)_2NR^\dagger_2$, —$C(S)NR^\dagger_2$, —$C(NH)NR^\dagger_2$, or —$N(R^\dagger)S(O)_2R^\dagger$; wherein each $R^\dagger$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of $R^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of $R^\dagger$ are independently halogen, —$R^\bullet$, -(haloR$^\bullet$), —OH, —OR$^\bullet$, —O(haloR$^\bullet$), —CN, —C(O)OH, —C(O)OR$^\bullet$, —$NH_2$, —NHR$^\bullet$, —NR$^\bullet_2$, or —$NO_2$, wherein each R$^\bullet$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

As used herein, the term "tautomer" includes two or more interconvertable compounds resulting from at least one formal migration of a hydrogen atom and at least one change in valency (e.g., a single bond to a double bond, a triple bond to a single bond, or vice versa). The exact ratio of the tautomers depends on several factors, including temperature, solvent, and pH. Tautomerizations (i.e., the reaction providing a tautomeric pair) may be catalyzed by acid or base. Exemplary tautomerizations include keto-to-enol; amide-to-imide; lactam-to-lactim; enamine-to-imine; and enamine-to-(a different) enamine tautomerizations.

As used herein, the term "catalyst" refers to a substance the presence of which increases the rate and/or extent of a chemical reaction, while not being consumed or undergoing a permanent chemical change itself.

DETAILED DESCRIPTION OF CERTAIN EMBODIMENTS

I. Polymerization Systems of the Invention

In one aspect, the present invention provides polymerization systems for the copolymerization of $CO_2$ and epoxides to produce polycarbonate polyol resins with a high proportion of —OH end-groups. A polymerization system includes 1) a metal complex including a permanent ligand set and at least one ligand that is a polymerization initiator, and 2) a chain transfer agent having a plurality of sites capable of initiating polymer chains. In some embodiments, a polymerization system further includes a co-catalyst. In certain embodiments, a ligand that is a polymerization initiator has a plurality of polymer initiation sites.

I.a. Chain Transfer Agents

Chain transfer agents suitable for the present invention include any compound having two or more sites capable of initiating chain growth in the co-polymerization of an epoxide and carbon dioxide. Preferably such compounds do not have other functional groups that interfere with the polymerization.

Suitable chain transfer agents may have a broad array of chemical structures. In general, the only requirement is that each molecule of the chain transfer agent be capable of initiating two or more polycarbonate chains, this can occur by several mechanisms including: by ring-opening an epoxide monomer, by reacting with carbon dioxide molecules to yield a moiety capable of sustaining polymer chain growth, or by a combination of these. In some embodiments, a chain transfer agent may have two or more functional groups independently capable of reacting with carbon dioxide or an epoxide; examples of these include, but are not limited to molecules such as diacids, glycols, diols, triols, hydroxyacids, amino acids, amino alcohols, dithiols, mercapto alcohols, saccharides, catechols, polyethers, etc. In some embodiments, the chain transfer agent may include a multiply active functional group that is itself able to react multiple times to initiate more than one polymer chain. Examples of the latter include, but are not limited to functional groups having a single atom capable of reacting multiple times such as ammonia, primary amines and water, as well as functional groups having more than one nucleophilic atom such as amindines, guanidines, urea, boronic acids, ect.

In certain embodiments, chain transfer agents of the present disclosure have a structure Y-A-(Y)$_n$, where:
- each —Y group is independently a functional group capable of initiating chain growth of epoxide $CO_2$ copolymers and each Y group may be the same or different,
- -A- is a covalent bond or a multivalent compound; and
- n is an integer between 1 and 10 inclusive.

In some embodiments each Y group is independently selected from the group consisting of: —OH, —C(O)OH, —C(OR$^y$)OH, —OC(R$^y$)OH, —NHR$^y$, —NHC(O)R$^y$, —NHC=NR$^y$; —NR$^y$C=NH; —NR$^y$C(NR$^y$$_2$)=NH; —NHC(NR$^y$$_2$)=NR$^y$; —NHC(O)OR$^y$, —NHC(O)NR$^y$$_2$; —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$(O)$_d$H, —OP(O)$_a$(R$^y$)$_b$(OR$^y$)$_c$(O)$_d$H, —N(R$^y$)OH, —ON(R$^y$)H; =NOH, =NN(R$^y$)H, where each occurrence of R$^y$ is independently —H, or an optionally substituted radical selected from the group consisting of C$_{1-20}$ aliphatic, C$_{1-20}$ heteroaliphatic, 3- to 12-membered heterocyclic, and 6- to 12-membered aryl, a and b are each independently 0 or 1, c is 0, 1 or 2, d is 0 or 1, and the sum of a, b, and c is 1 or 2. In some embodiments, an acidic hydrogen atom bound in any of the above functional groups may be replaced by a metal atom or an organic cation without departing from the present invention (e.g. —C(O)OH may instead be —C(O)O$^-$ Na$^+$, —C(O)O$^-$N$^+$(R)$_4$, —C(O)O$^-$ (Ca$^{2+}$)$_{0.5}$, —C(O)O$^-$ PPN$^+$ or —SH, may be —S$^-$Na$^+$ etc.) such alternatives are specifically included herein and alternate embodiments employing such salts are implicitly encompassed by the disclosure and examples herein.

In some embodiments, one or more Y groups are hydroxyl or a hydroxy salt. In certain embodiments, each hydroxyl group is a primary or secondary alcohol. In other embodiments, a hydroxyl group is bonded to an aromatic or heteroaromatic ring. In certain embodiments, a hydroxyl group is a phenol. In some embodiments, a hydroxyl group is benzylic, allylic or propargylic. In other embodiments, hydroxyl groups are part of a carbohydrate. In other embodiments, a hydroxyl group is part of a polymer or oligomer such as a polyether, a polyester, a polyvinyl alcohol or a hydroxy-functionalized or hydroxy-terminated polyolefin.

In some embodiments, a chain transfer agent is a polyhydric alcohol. In certain embodiments, a polyhydric alcohol is a diol, while in other embodiments the polyhydric alcohol is a triol, a tetraol or a higher polyol. In certain embodiments, n is 1, (i.e. two Y groups are present) and both Y groups are hydroxyl groups (i.e the chain transfer agent is a diol). In some embodiments, two hydroxyl groups are on adjacent carbons (i.e. the chain transfer agent is a glycol).

In some embodiments, two hydroxyl groups are on non-adjacent carbons. In certain embodiments, two hydroxyl groups are on the opposite ends of a chain (i.e. the chain transfer agent is an α-ω diol). In certain embodiments, such α-ω diols include C$_3$ to C$_{20}$ aliphatic chains (i.e. -A- is an optionally substituted C$_{3-20}$ aliphatic chain). In certain embodiments, such α-ω diols comprise a polyether (i.e. -A- is a polyether chain). In certain embodiments, such α-ω diols comprise a hydroxy-terminated polyolefin (i.e. -A- is a polyolefin chain). In certain embodiments, such α-ω diols comprise paraformaldehyde (i.e. -A- is a polyoxymethylene chain).

In certain embodiments, -A- is a covalent bond. For example, when Y-A-(Y)$_n$ is oxalic acid, -A- is a covalent bond.

In some embodiments, one —OH group of a diol is phenolic and the other is aliphatic. In other embodiments each hydroxy group is phenolic. In certain embodiments, a chain transfer agent is an optionally substituted catechol, resorcinol or hydroquinone derivative.

In some embodiments where a Y-group is —OH, the —OH group is an enol tautomer of a carbonyl group. In some embodiments where a Y group is —OH, the —OH group is a carbonyl hydrate or a hemiacetal.

In other embodiments where n is 1, only one Y group is —OH, and the other Y group is selected from the group consisting of: —C(O)OH, —C(OR$^y$)OH, —OC(R$^y$)OH, —NHR$^y$, —NHC(O)R$^y$, —NHC(O)OR$^y$, —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$OH, —OP(O)$_a$(R$^y$)$_b$(OR$^y$)$_c$OH, —N(R$^y$)OH, —ON(R$^y$)H; =NOH, =NN(R$^y$)H. In particular embodiments, n is 1, one Y group is —OH, and the other Y group is selected from the group consisting of —SH, —C(O)OH, —NHR$^y$, and —C(O)NHR$^y$. In certain embodiments, n is 1, one Y group is —OH, and the other Y group is —C(O)OH. In other embodiments where n is 1, one Y group is —OH and the other Y group is —SH. In other embodiments where n is 1, one Y group is —OH and one Y group is —NHR$^y$. In certain embodiments, n is 2, and each Y group is —OH (i.e. the chain transfer agent is a triol). In particular embodiments where n is 2, two Y groups are —OH, and the third Y group is selected from the group consisting of —SH, —C(O)OH, —NHR$^y$, and —C(O)NHR$^y$. In other embodiments where n is 2, only one Y group is —OH, while the other two Y groups are independently selected from the group consisting of —SH, —C(O)OH, —NHR$^y$, and —C(O)NHR$^y$.

In some embodiments, polyalcohol chain transfer agents encompass naturally occurring materials such as sugar alcohols, carbohydrates, saccharides, polysaccharides, starch, starch derivatives, lignins, lignans, partially hydrolyzed triglycerides, and the like, as well as known derivatives of any of these materials. In certain embodiments, a chain transfer agent is starch. In certain embodiments, a chain transfer agent is isosorbide.

In other embodiments, at least one Y group of a chain transfer agent is an amine. In some embodiments, at least one Y group is a primary amine. In other embodiments, at least one Y group is a secondary amine. In certain embodiments, at least one Y group is an aniline or aniline derivative. In some embodiments, at least one Y group is an N—H group that is part of a heterocycle.

In certain embodiments, a chain transfer agent is a polyamine. In some embodiments, a chain transfer agent is a diamine. In other embodiments, a chain transfer agent is a triamine, tetraamine or a higher amine oligomer.

In certain embodiments, at least one Y group is an amine and one or more additional Y groups are independently selected from the group consisting of —OH, —C(O)OH, —C(OR$^y$)OH, —OC(R$^y$)OH, —NHC(O)R$^y$, —NHC(O)OR$^y$, —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$OH, —OP(O)$_a$(R$^y$)$_b$(OR$^y$)$_c$OH, —N(R$^y$)OH, —ON(R$^y$)H; =NOH, =NN(R$^y$)H. In certain embodiments, at least one Y group is an amine and one or more additional Y groups are independently selected from the group consisting of —OH, —SH, —C(O)OH, and —C(O)NHR$^y$. In some embodiments, a chain transfer agent is an amino alcohol. In some embodiments, a chain transfer agent is an amino acid. In some embodiments, a chain transfer agent is an amino thiol. In some embodiments, a chain transfer agent is an amino amide.

In some embodiments, at least one Y group is a carboxylic acid or a salt thereof. In some embodiments, all Y groups present are carboxylic acid salts thereof, while in other embodiments, one or more carboxylic acid Y groups are present along with one or more other functional groups that can initiate the copolymerization. In certain embodiments, at least one Y group is a benzoic acid derivative.

In certain embodiments, a chain transfer agent is a diacid, a triacid or a higher polyacid. In some embodiments, a chain transfer agent is a diacid. In certain embodiments, n is 1, and both Y groups present are carboxylic acids. In certain embodiments, a diacid is phthalic acid, isophthalic acid, terephthalic acid. In certain embodiments, a diacid is maleic acid, succinic acid, malonic acid, glutaric acid, adipic acid, pimelic acid, suberic acid, or azelaic acid. In some embodiments, a chain transfer agent is a triacid. In certain embodiments, a triacid is citric acid, isocitric acid, cis- or trans-aconitic acid, propane-1,2,3-tricarboxylic acid or trimesic acid.

In certain embodiments, at least one Y group is a carboxylic acid or carboxylate and one or more additional Y groups are independently selected from the group consisting of —OH, —C(OR$^y$)OH, —OC(R$^y$)OH, —NHR$^y$, —NHC(O)R$^y$, —NHC(O)OR$^y$, —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$OH, —OP(O)$_a$(R$^y$)$_b$(OR$^y$)$_c$OH, —N(R$^y$)OH, —ON(R$^y$)H; =NOH, =NN(R$^y$)H. In certain embodiments, at least one Y group is a carboxylic acid and one or more additional Y groups are independently selected from the group consisting of —OH, —SH, —NHR$^y$, and —C(O)NHR$^y$.

In some embodiments, a chain transfer agent is an amino acid. In certain embodiments, amino acid chain transfer agents include the naturally occurring amino acids. In certain embodiments, amino acid chain transfer acids include peptides. In some embodiments, the peptides contain between 2 and about 20 amino acid residues. In other embodiments, the chain transfer agent is a thiol acid.

In some embodiments, the chain transfer agent is a hydroxy acid. In some embodiments, hydroxy acids are alpha-hydroxy acids. In certain embodiments an alpha hydroxy acid is selected from the group consisting of: glycolic acid, DL-lactic acid, D-lactic acid, L-lactic, citric acid and mandelic acid. In some embodiments, a hydroxy acid is a beta-hydroxy acid. In certain embodiments, a beta hydroxy acid is selected from the group consisting of: 3-hydroxypropionic acid, DL 3-hydroxybutryic acid, D-3 hydroxybutryic acid, L 3-hydroxybutyric acid, DL-3-hydroxy valeric acid, D-3-hydroxy valeric acid, L-3-hydroxy valeric acid, salicylic acid, and derivatives of salicylic acid. In some embodiments, a hydroxy acid is an α-ω hydroxy acid. In certain embodiments, α-ω hydroxy acids are selected from the group consisting of optionally substituted $C_{3-20}$ aliphatic α-ω hydroxy acids. In certain embodiments, an α-ω hydroxy acid is a polyester oligomeric ester.

In some embodiments, where one or more Y groups is a carboxyl group, a chain transfer agent is provided as a carboxylate salt. In certain embodiments, a carboxylate salt is a group I or II metal salt. In some embodiments, a carboxylate salt is an ammonium salt. In certain embodiments, an ammonium cation is $NH_4^I$. In some embodiments, an ammonium cation is a protonated primary, secondary, or tertiary amine. In some embodiments, a salt is a quaternary ammonium salt. In some embodiments, a quaternary ammonium cation of a salt is tetramethyl, tetrabutyl, or trahexylammonium ammonium. In certain embodiments, a carboxylate salt is a phosphonium carboxylate.

In other embodiments, at least one Y group of a chain transfer agent is a thiol. In some embodiments, at least one Y group is a primary thiol. In other embodiments, at least one Y group is a secondary or tertiary thiol. In certain embodiments, at least one Y group is a thiophenol or thiophenol derivative.

In certain embodiments, a chain transfer agent is a polythiol. In some embodiments, a chain transfer agent is a dithiol. In some embodiments, a chain transfer agent is a trithiol, higher thiol oligomer.

In certain embodiments, at least one Y group is a thiol and one or more additional Y groups are independently selected from the group consisting of —OH, —C(O)OH, —C(OR$^y$)OH, —OC(R$^y$)OH, —NHR$^y$, —NHC(O)R$^y$, —NHC(O)OR$^y$, —C(O)NHR$^y$, —C(S)NHR$^y$, —OC(O)NHR$^y$, —OC(S)NHR$^y$, —C(O)SH, —B(OR$^y$)OH, —P(O)$_a$(R$^y$)$_b$(OR$^y$)$_c$OH, —OP(O)$_a$(R$^y$)$_b$(OR$^y$)$_c$OH, —N(R$^y$)OH, —ON(R$^y$)H; =NOH, =NN(R$^y$)H. In certain embodiments, at least one Y group is a thiol and one or more additional Y groups are independently selected from the group consisting of —OH, —NHR$^y$, —C(O)OH, and —C(O)NHR$^y$. In some embodiments, a chain transfer agent is a thio alcohol. In some embodiments, a chain transfer agent is an amino thiol. In some embodiments, a chain transfer agent is a thiol carboxylic acid.

In certain embodiments, a Y group of a chain transfer agent is an active NH-containing functional group. In certain embodiments, a nitrogen atom of the NH-containing functional group is nucleophilic. In certain embodiments, a active NH-containing functional group is selected from the group consisting of C-linked amides, N-linked amides, O-linked carbamates N-linked carbamates, ureas, guanidines, amidines, hydrazones, and N- or C-linked thioamides. In certain embodiments, one or more Y groups is a primary amide.

In certain embodiments, polymerization systems of the present invention include only one chain transfer agent, while in other embodiments, mixtures of two or more chain transfer agents are used.

In certain embodiments, polymerization systems of the present invention include a solvent in which a chain transfer agent dissolves. In certain embodiments, a chain transfer agent is poorly soluble in the epoxide, but is soluble in a mixture of epoxide and another solvent added to the reaction mixture. In certain embodiments, the solvent added to the polymerizations system is chosen from the group consisting of esters, nitriles, ketones, aromatic hydrocarbons, ethers, amines and combinations of two or more of these.

In some embodiments, a polymerization initiator includes a multiply active functional group that is itself able to react multiple times to initiate more than one polymer chain. One subset of such multiply-active functional groups react multiple times at the same atom. Examples of such groups include, but are not limited to ammonia, primary amines, hydrogen sulfide and water, all of which remain nucleophilic after the first addition and are thereby able to react again initiating additional polymer chains. Another subset of multiply active functional groups can react at different atoms in the functional group to initiate multiple chains. Examples of such groups include, but are not limited to guanidines, ureas, boronic acids, hydroxyl amines, and amidines.

In some embodiments, a chain transfer agent may contain a single multiply active functional group. In some embodiments, the chain transfer agent may contain a single multiply active functional group in addition to one or more of the Y-groups described above. In certain embodiments, a chain transfer agent may contain two or more multiply active functional groups. In certain embodiments, a chain transfer agent may contain two or more multiply active functional groups in combination with one or more of the Y groups described hereinabove.

I.b Metal Centered Catalysts

In certain embodiments, provided metal complexes are transition metal catalysts. Thus, in some embodiments, polymerization systems of the present invention incorporate transition metal catalysts capable of catalyzing the copolymerization of carbon dioxide and epoxides. In certain embodiments, the polymerization systems include any of the catalysts disclosed in U.S. Pat. Nos. 7,304,172, and 6,870,004; in PCT Application Numbers WO2008136591A1, WO2008150033A1, PCT/US09/042926; and PCT/US09/054773 and in Chinese Patent Application Numbers CN200710010706, and CN200810229276, the entirety of each of which is hereby incorporated herein by reference.

In certain embodiments, polymerization systems of the present invention include metal complexes denoted $L_p$-M-$(L_I)_m$, where $L_p$ is a permanent ligand set, M is a metal atom, and $L_I$ is a ligand that is a polymerization initiator, and m is an integer between 0 and 2 inclusive representing the number of initiating ligands present.

I.b.1 Metal Atoms

In some embodiments, a metal atom, M, is selected from periodic table groups 3-13, inclusive. In certain embodiments, M is a transition metal selected from periodic table groups 5-12, inclusive. In some embodiments, M is a transition metal selected from periodic table groups 4-11, inclusive. In certain embodiments, M is a transition metal selected from periodic table groups 5-10, inclusive. In certain embodiments, M is a transition metal selected from periodic table groups 7-9, inclusive. In some embodiments, M is selected from the group consisting of Cr, Mn, V, Fe, Co, Mo, W, Ru, Al, and Ni. In some embodiments, M is a metal atom selected from the group consisting of: cobalt; chromium; aluminum; titanium; ruthenium; and manganese. In some embodiments, M is cobalt. In some embodiments, M is chromium. In some embodiments, M is aluminum.

In certain embodiments, a metal complex is a zinc, cobalt, chromium, aluminum, titanium, ruthenium, or manganese complex. In certain embodiments, a metal complex is an aluminum complex. In other embodiments, a metal complex is a chromium complex. In yet other embodiments, a metal complex is a zinc complex. In certain other embodiments, a metal complex is a titanium complex. In still other embodiments, a metal complex is a ruthenium complex. In certain embodiments, a metal complex is a manganese complex. In certain embodiments, a metal complex is cobalt complex. In certain embodiments where a metal complex is a cobalt complex, the cobalt metal has an oxidation state of +3 (i.e., Co(III)). In other embodiments, the cobalt metal has an oxidation state of +2 (i.e., Co(II)).

I.b.2 Permanent Ligand Sets

A permanent ligand set '$L_p$' comprises one or more ligands that remain coordinated with a metal center throughout the catalytic cycle. This is in contrast to other ligands such as polymerization initiators, monomer molecules, polymer chains, and solvent molecules that may participate in the catalytic cycle or may be exchanged under the polymerization conditions.

In certain embodiments, a permanent ligand set comprises a single multidentate ligand that remains associated with the metal center during catalysis. In some embodiments, the permanent ligand set includes two or more ligands that remain associated with the metal center during catalysis. In some embodiments, a metal complex comprises a metal atom coordinated to a single tetradentate ligand while in other embodiments, a metal complex comprises a chelate containing a plurality of individual permanent ligands. In certain embodiments, a metal complex contains two bidentate ligands. In some embodiments, a metal complex contains a tridentate ligand.

In various embodiments, tetradentate ligands suitable for metal complexes of the present invention may include, but are not limited to: salen derivatives 1, derivatives of salan ligands 2, bis-2-hydroxybenzamido derivatives 3, derivatives of the Trost ligand 4, porphyrin derivatives 5, derivatives of tetrabenzoporphyrin ligands 6, derivatives of corrole ligands 7, phthalocyaninate derivatives 8, and dibenzotetramethyltetraaza[14]annulene (tmtaa) derivatives 9 or 9'.

1

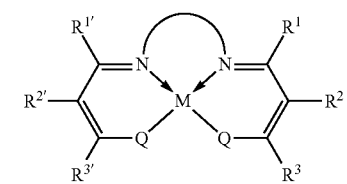

2

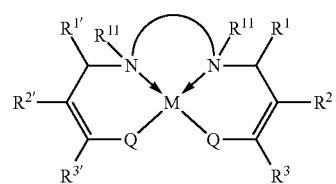

3

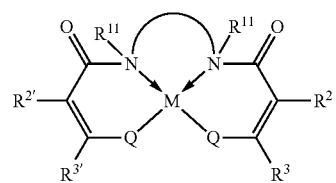

4

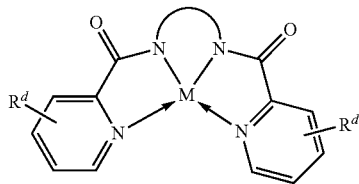

5

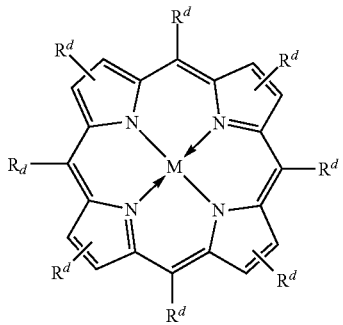

6

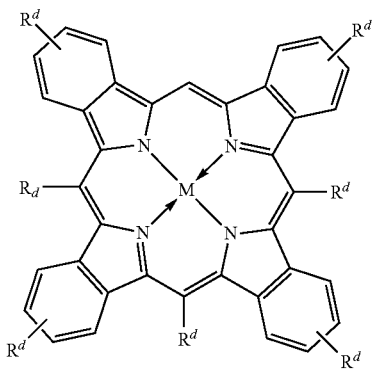

7

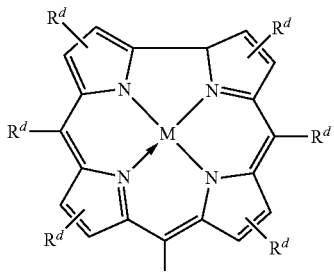

8

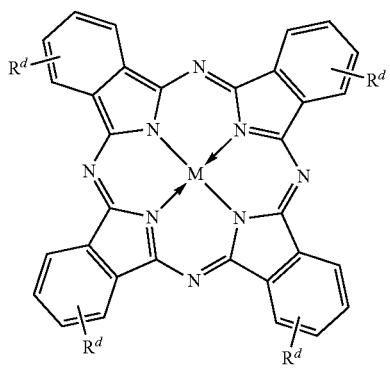

9

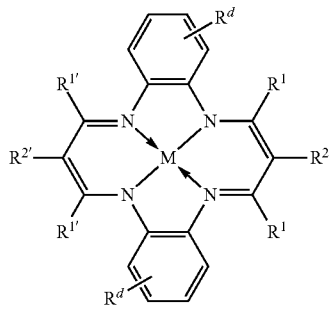

9'

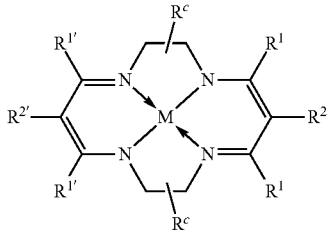

wherein,

Q, at each occurrence is independently O or S;

$R^1$ and $R^{1'}$ are independently selected from the group consisting of: —H, optionally substituted $C_1$ to $C_{12}$ aliphatic; optionally substituted 3- to 14-membered carbocycle; optionally substituted 3- to 14-membered heterocycle; and $R^{21}$;

$R^2$ and $R^{2'}$ are independently selected from the group consisting of: —H; optionally substituted $C_1$ to $C_{12}$ aliphatic; optionally substituted 3- to 14-membered carbocycle; optionally substituted 3- to 14-membered heterocycle; $R^{14}$; $R^{20}$; and $R^{21}$;

$R^3$ and $R^{3'}$ are independently selected from the group consisting of: —H; optionally substituted $C_1$ to $C_{12}$ aliphatic; optionally substituted 3- to 14-membered carbocycle; optionally substituted 3- to 14-membered heterocycle, and $R^{21}$;

$R^c$ at each occurrence is independently selected from the group consisting of: —H; optionally substituted $C_1$ to $C_{12}$ aliphatic; an optionally substituted 3- to 14-membered carbocycle; an optionally substituted 3- to 14 membered heterocycle; $R^{20}$; and $R^{21}$, where two or more $R^c$ groups may be taken together with intervening atoms to form one or more optionally substituted rings and, when two $R^c$ groups are attached to the same carbon atom, they may be taken together along with the carbon atom to which they are attached to form a moiety selected from the group consisting of: an optionally substituted 3- to 8-membered spirocyclic ring, a carbonyl, an oxime, a hydrazone, and an imine;

$R^d$ at each occurrence is independently selected from the group consisting of: optionally substituted $C_1$ to $C_{12}$ aliphatic; optionally substituted 3- to 14-membered carbocycle; optionally substituted 3- to 14-membered heterocycle; $R^{20}$; and $R^{21}$, where two or more $R^d$ groups may be taken together with intervening atoms to form one or more optionally substituted rings; and

⌒ represents an optionally substituted moiety covalently linking two nitrogen atoms, where any of [$R^{2'}$ and $R^{3'}$], [$R^2$ and $R^3$], [$R^1$ and $R^2$], and [$R^{1'}$ and $R^{2'}$] may optionally be taken together with intervening atoms to form one or more rings which may in turn be substituted with one or more groups selected from $R^{14}$; $R^{20}$; and $R^{21}$; and where $R^{14}$ at each occurrence is independently selected from the group consisting of: halogen; optionally substituted $C_1$ to $C_{12}$ aliphatic; optionally substituted 3- to 14-membered carbocycle; optionally substituted 3- to 14-membered heterocycle; —$OR^{10}$; —$OC(O)R^{13}$; —$OC(O)OR^{13}$; —$OC(O)NR^{11}R^{12}$; —CN; —CNO; —$C(R^{13})_zH_{(3-z)}$; —$C(O)R^{13}$; —$C(O)OR^{13}$; —$C(O)NR^{11}R^{12}$; —$NR^{11}R^{12}$; —$NR^{11}C(O)R^{13}$; —$NR^{11}C(O)OR^{13}$; —$NR^{11}SO_2R^{13}$; —$N^+R^{11}R^{12}R^{13}$ $X^-$; —$P^+(R^{11})_3$ $X^-$; —$P(R^{11})_3$=$N^+$=$P(R^{11})_3$ $X^-$; —$As^+R^{11}R^{12}R^{13}$ $X^-$; —NCO; —$N_3$; —$NO_2$; —$S(O)_xR^{13}$; and —$SO_2NR^{11}R^{12}$, $R^{16}$ at each occurrence is independently selected from the group consisting of: optionally substituted $C_1$-$C_{12}$ aliphatic, an optionally substituted 3- to 14-membered carbocycle; an optionally substituted 3- to 14-membered heterocycle; and —$C(R^{17})_zH_{(3-z)}$, $R^{17}$ at each occurrence is independently selected from the group consisting of: —H; optionally substituted $C_1$ to $C_{12}$ aliphatic; an optionally substituted 3- to 14-membered carbocycle; and optionally substituted 3- to 14-membered heterocycle, $R^{20}$ at each occurrence is independently selected from the group consisting of: halogen; —$OR^{10}$; —$OC(O)R^{13}$; —$OC(O)OR^{13}$; —$N^+(R^{11})_3$ $X^-$; —$P^+(R^{11})_3$ $X^-$; —$P(R^{11})_3$=$N^+$=$P(R^{11})_3$ $X^-$; —$As^+R^{11}R^{12}R^{13}$ $X^-$; —$OC(O)NR^{11}R^{12}$; —CN; —CNO; —$C(O)R^{13}$; —$C(O)OR^{13}$; —$C(O)NR^{11}R^{12}$; —$C(R^{13})_zH_{(3-z)}$; —$NR^{11}R^{12}$; —$NR^{11}C(O)R^{13}$; —$NR^{11}C(O)OR^{13}$; —NCO; —$NR^{11}SO_2R^{13}$; $S(O)_xR^{13}$; —$SO_2NR^{11}R^{12}$; —$NO_2$; —$N_3$; and —$Si(R^{13})_{(3-z)}[(CH_2)_kR^{14}]_z$, $R^{21}$ at each occurrence is independently selected from the group consisting of: —$(CH_2)_kR^{20}$; —$(CH_2)_k$—$Z''$—$(CH_2)_kR^{20}$; —$C(R^{17})_zH_{(3-z)}$; —$(CH_2)_kC(R^{17})_zH_{(3-z)}$; —$(CH_2)_m$—$Z''$—$(CH_2)_mC(R^{17})_zH_{(3-z)}$; —$(CH_2)_k$—$Z''$—$R^{16}$;

$X^-$ is any anion, $Z''$ is a divalent linker selected from the group consisting of —(CH=CH)$_a$—; —(CH≡CH)$_a$—; —C(O)—; —C(=NOR$^{11}$)—; —C(=NNR$^{11}$R$^{12}$)—; —O—; —OC(O)—; —C(O)O—; —OC(O)O—; —N(R$^{11}$)—; —N(C(O)R$^{13}$)—; —C(O)NR$^{13}$—; —N(C(O)R$^{13}$)O—; —NR$^{13}$C(O) R$^{13}$N—; —S(O)$_x$—; a polyether; and a polyamine, $R^{10}$ at each occurrence is independently selected from the group consisting of: —H; optionally substituted $C_{1-12}$ aliphatic; an optionally substituted 3- to 14-membered carbocycle; an optionally substituted 3- to 14-membered heterocycle —$S(O)_2R^{13}$; —$Si(R^{15})_3$; —$C(O)R^{13}$; and a hydroxyl protecting group, $R^{11}$ and $R^{12}$ at each occurrence are independently selected from the group consisting of: —H; optionally substituted $C_1$ to $C_{12}$ aliphatic; an optionally substituted 3- to 14-membered carbocycle; an optionally substituted 3- to 14-membered heterocycle; where two or more $R^{11}$ or $R^{12}$ groups can optionally be taken together with intervening atoms to form an optionally substituted 3- to 10-membered ring, $R^{13}$ at each occurrence is independently selected from the group consisting of: —H; optionally substituted $C_1$ to $C_{12}$ aliphatic; an optionally substituted 3- to 14-membered carbocycle; and optionally substituted 3- to 14-membered heterocycle, where two or more $R^{13}$ groups on the same molecule may optionally be taken together to form ring.

$R^{15}$ at each occurrence is independently selected from the group consisting of: optionally substituted $C_{1-12}$ aliphatic, an optionally substituted 3- to 14-membered carbocycle; and an optionally substituted 3- to 14-membered heterocycle, a is 1, 2, 3, or 4, k is independently at each occurrence an integer from 1 to 8, inclusive, m is 0 or an integer from 1 to 8, inclusive, q is 0 or an integer from 1 to 5, inclusive, x is 0, 1, or 2, and z is 1, 2, or 3.

In certain embodiments, of complexes 1 through 4,

⌒ is selected from the group consisting of a $C_{3-14}$ carbocycle, a $C_{6-10}$ aryl group, a 3- to 14-membered heterocycle, and a 5- to 10-membered heteroaryl group; a polyether group, or an optionally substituted $C_{2-20}$ aliphatic group, wherein one or more methylene units are optionally and independently replaced by —NR$^y$—, —N(R$^y$)C(O)—, —C(O)N(R$^y$)—, —OC(O)N(R$^y$)—, —N(R$^y$)C(O)O—, —OC(O)O—, —O—, —C(O)—, —OC(O)—, —C(O)O—, —S—, —SO—, —SO$_2$—, —C(=S)—, —C(=NR$^y$)—, —C(=NOR$^y$)— or —N=N—.

In some embodiments, one or more of the substituents on metal complexes 1 through 9' is an activating moiety —⌇⌇(Z)$_p$, where "—⌇⌇" represents a covalent linker containing one or more atoms selected from the group consisting of C, O, N, S, and Si; "Z" is an activating functional group having co-catalytic activity in epoxide $CO_2$ copolymerization, and p is an integer from 1 to 4 indicating the number of individual activating functional groups present on a given activating moiety.

In certain embodiments, the linker moiety "—⌇—" is as described in co-pending PCT application number PCT/US09/54773. In some embodiments, the one or more Z group(s) present on the activating moiety is independently selected from the group consisting of PPN$^+$ derivatives (—PR$_2$=N$^+$=PR$_3$); ammonium salts; phosphonium salts; or an optionally substituted N-linked imidazolium, thiazolium, or oxazolium group. In certain embodiments, a Z group is an optionally substituted N-linked piperidine or N-linked pyrrolidine. In some embodiments, a Z group is an optionally substituted guanidine. In other embodiments, a Z group is any of those described in PCT/US09/54773.

In some embodiments, provided metal complexes have a structure selected from the group consisting of:

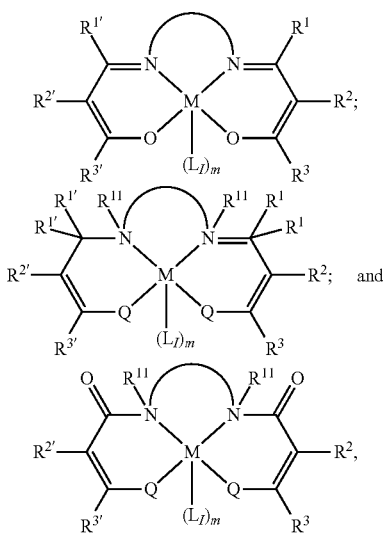

wherein:
  M, L$_I$, m R$^1$, R$^{1'}$, R$^2$, R$^{2'}$, R$^3$, R$^{3'}$ and R$^{11}$ are as defined above.

In some embodiments, a permanent ligand set is a salen ligand. In certain embodiments, a metal complex is a metallosalenate. In certain embodiments, a metal complex is a cobalt salen complex. In certain embodiments, a metal complex is a chromium salen complex. In other embodiments, a metal complex is an aluminum salen complex.

In certain embodiments, metal complexes of the present invention have the formula:

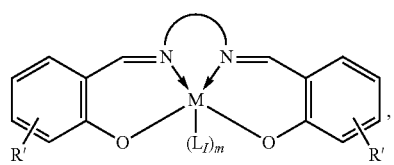

I wherein:
  M is the metal atom;
  L$_I$ is a nucleophile capable of ring opening an epoxide;
  m is an integer from 0-2 inclusive; and

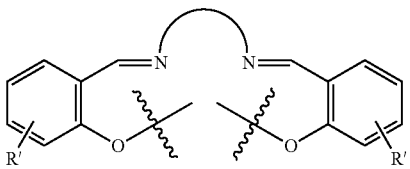

is the permanent ligand set;
  wherein

is as defined previously and each R' independently represents one or more substituents optionally present on the phenyl rings.

In certain embodiments, each R' is independently an R$^d$ group or a —⌇—(z)$_p$ group, where two or more adjacent R' groups can be taken together to form an optionally substituted saturated, partially unsaturated, or aromatic 3- to 12-membered ring containing 0 to 4 heteroatoms, In certain embodiments, the

moiety is selected from the group consisting of:

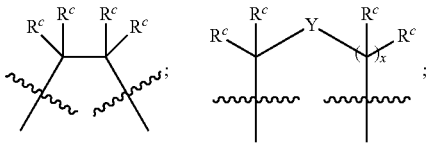

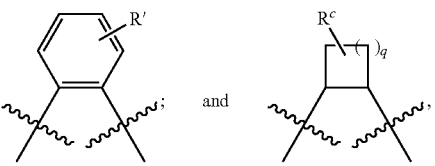

R$^c$ and R' are as previously defined,
  Y is a divalent linker selected from the group consisting of: —N(R$^{11}$)—; —O—; —S(O)$_x$—; —(CH$_2$)$_k$—; —C(O)—; —C(=NOR$^{10}$)—; —C(R$^c$)$_x$H$_{2-x}$—; a polyether; an optionally substituted 3- to 8-membered carbocycle; and an optionally substituted 3 to 8-membered heterocycle,
  q is 0 or an integer from 1 to 5 inclusive, and
  x is 0, 1, or 2, In certain embodiments provided metal complexes have a structure selected from the group consisting of:

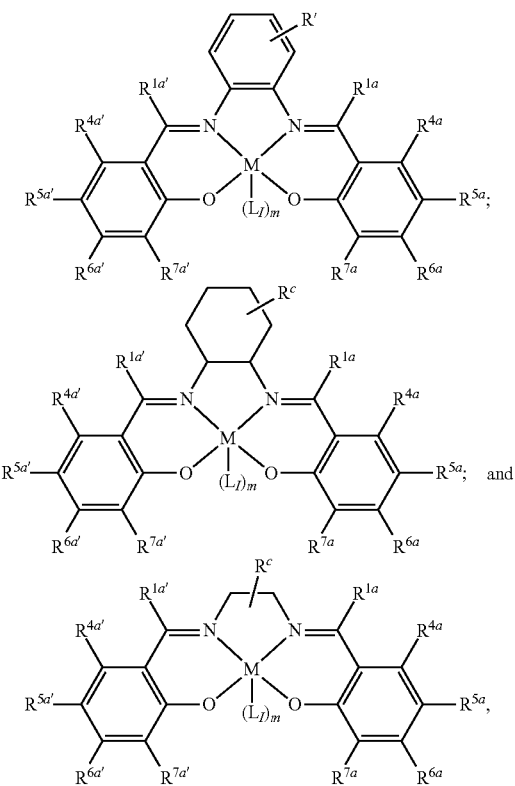

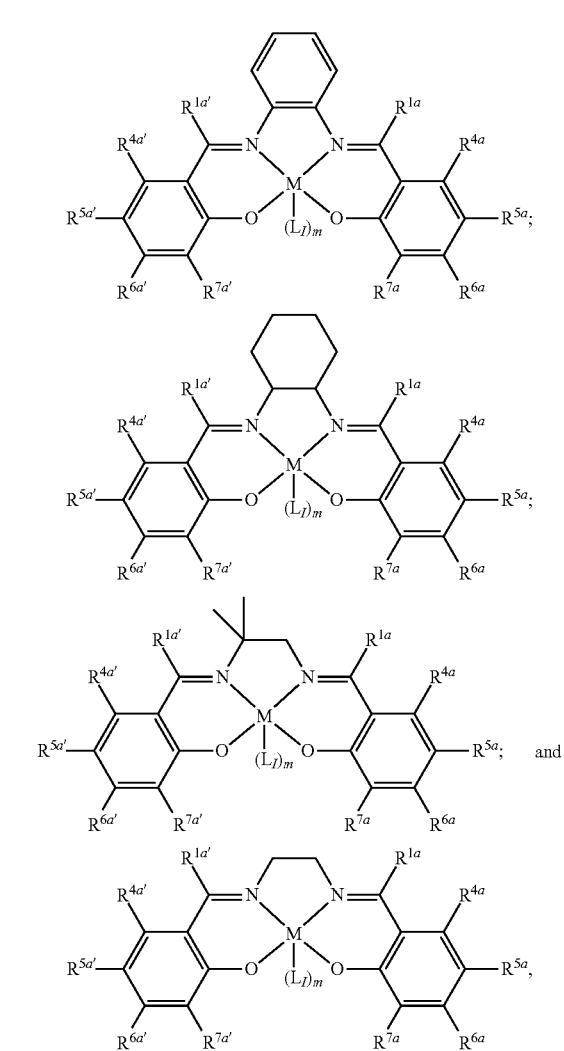

wherein:

M, $R^c$, R', $L_I$, and m are as defined above;

$R^{4a}$, $R^{4a'}$, $R^{5a}$, $R^{5a'}$, $R^{6a}$, $R^{6a'}$, $R^{7a}$, and $R^{7a'}$ are each independently hydrogen, a —ww—$(z)_p$ group, halogen. —$NO_2$, —CN, —$SR^{13}$, —$S(O)R^{13}$, —$S(O)_2R^{13}$, —$NR^{11}C(O)R^{13}$, —$OC(O)R^{13}$, —$CO_2R^{13}$, —NCO, —$N_3$, —$OR^{10}$, —$OC(O)NR^{11}R^{12}$, —$Si(R^{13})_3$, —$NR^{11}R^{12}$, —$NR^{11}C(O)R^{13}$, and —$NR^{11}C(O)OR^{13}$; or an optionally substituted radical selected from the group consisting of $C_{1-20}$ aliphatic; $C_{1-20}$ heteroaliphatic; 6- to 10-membered aryl; 5- to 10-membered heteroaryl; and 3- to 7-membered heterocyclic, where [$R^{1a}$ and $R^{4a}$], [$R^{1a'}$ and $R^{4a'}$] and any two adjacent $R^{4a}$, $R^{4a'}$, $R^{5a}$, $R^{5a'}$, $R^{6a}$, $R^{6a'}$, $R^{7a}$, and $R^{7a'}$ groups can be taken together with intervening atoms to form one or more optionally substituted rings optionally containing one or more heteroatoms;

n is 0 or an integer from 1 to 8, inclusive; and p is 0 or an integer from 1 to 4, inclusive.

In some embodiments, $R^{1a}$, $R^{1a'}$, $R^{4a}$, $R^{4a'}$, $R^{6a}$, and $R^{6a'}$ are each —H. In some embodiments, $R^{5a}$, $R^{5a'}$, $R^{7a}$ and $R^{7a'}$ are each optionally substituted $C_1$-$C_{12}$ aliphatic. In some embodiments, $R^{4a}$, $R^{4a'}$, $R^{5a}$, $R^{5a'}$, $R^{6a}$, $R^{6a'}$, $R^{7a}$, and $R^{7a'}$ are each independently selected from the group consisting of: —H, —$SiR_3$; methyl, ethyl, n-propyl, i-propyl, n-butyl, sec-butyl, t-butyl, isoamyl, t-amyl, thexyl, and trityl. In some embodiments, $R^{1a}$, $R^{1a'}$, $R^{4a}$, $R^{4a'}$, $R^{6a}$, and $R^{6a'}$ are each —H. In some embodiments, $R^{7a}$ is selected from the group consisting of —H; methyl; ethyl; n-propyl; i-propyl; n-butyl; sec-butyl; t-butyl; isoamyl; t-amyl; thexyl; and trityl. In some embodiments, $R^{5a}$ and $R^{7a}$ are independently selected from the group consisting of —H; methyl; ethyl; n-propyl; i-propyl; n-butyl; sec-butyl; t-butyl; isoamyl; t-amyl; thexyl; and trityl. In certain embodiments, one or more of $R^{5a}$, $R^{5a'}$, $R^{7a}$ and $R^{7a'}$ is a —ww—$(z)_p$ group. In some embodiments, $R^{5a}$ and $R^{5a'}$ are each a —ww—$(z)_p$ group. In some embodiments, $R^{5a}$ is a —ww—$(z)_p$ group and $R^{5a'}$ is $C_{1-8}$ aliphatic. In some embodiments, $R^{7a}$ and $R^{7a'}$ are each a —ww—$(z)_p$ group. In some embodiments, $R^{7a}$ is a —ww—$(z)_p$ group and $R^{7a'}$ is $C_{1-8}$ aliphatic.

In certain embodiments, provided metal complexes have a structure selected from the group consisting of:

where $R^{1a}$ through $R^{7a'}$ are as defined above.

In certain embodiments, provided metal complexes have a structure selected from the group consisting of:

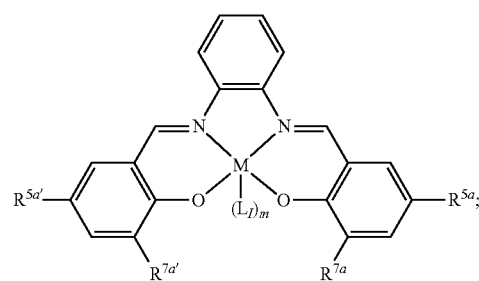

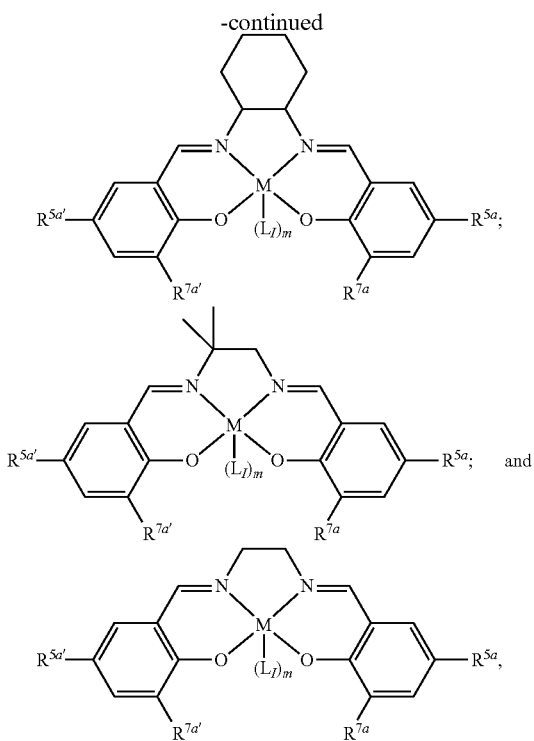

where $R^{5a}$, $R^{5a'}$, $R^{7a}$, and $R^{7a'}$ are as defined above. In certain embodiments, each pair of substituents on the salicaldehyde portions of the complexes above are the same (i.e. $R^{5a}$ & $R^{5a'}$ are the same and $R^{7a}$ & $R^{7a'}$ are the same). In other embodiments, at least one of $R^{5a}$ & $R^{5a'}$ or $R^{7a}$ & $R^{7a}$ are different from one another.

In certain embodiments, a metal complex has formula III:

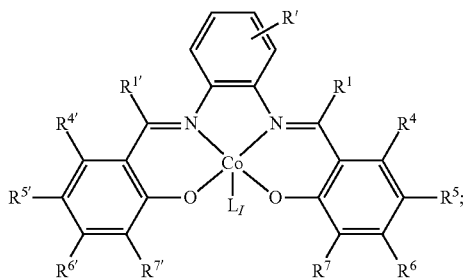

In certain embodiments, a metal complex has formula IV:

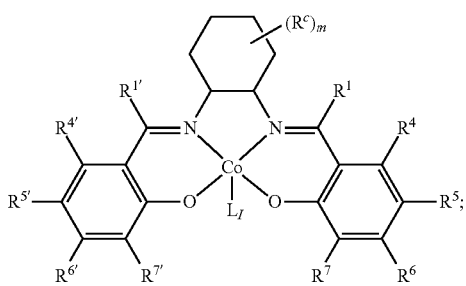

In certain embodiments, wherein a metal complex has formula V:

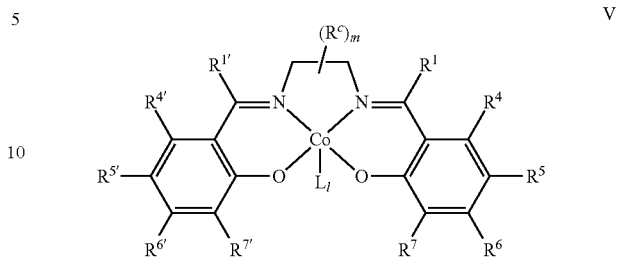

wherein:

$R^c$, $R^d$, $L_I$, m, and q are as described above, and
$R^4$, $R^{4'}$, $R^5$, $R^{5'}$, $R^6$, $R^{6'}$, $R^7$, and $R^{7'}$ are each independently selected from the group consisting of: —H; —$R^{20}$; —$R^{21}$; optionally substituted $C_1$-$C_{12}$ aliphatic; optionally substituted 3- to 14-membered carbocycle; and optionally substituted 3- to 14-membered heterocycle;
where [$R^1$ and $R^4$], [$R^{1'}$ and $R^{4'}$] and any two adjacent $R^4$, $R^{4'}$, $R^5$, $R^{5'}$, $R^6$, $R^{6'}$, $R^7$, and $R^{7'}$ groups can optionally be taken together with intervening atoms to form one or more rings optionally substituted with one or more $R^{20}$ groups.

In certain embodiments, wherein a metal complex has formula III, $R^1$, $R^{1'}$, $R^4$, $R^{4'}$, $R^6$, and $R^{6'}$ are each —H. In certain embodiments, wherein a metal complex has formula III, $R^5$, $R^{5'}$, $R^7$ and $R^{7'}$ are each optionally substituted $C_1$-$C_{12}$ aliphatic.

In certain embodiments, wherein a metal complex has formula III, $R^4$, $R^{4'}$, $R^5$, $R^{5'}$, $R^6$, $R^{6'}$, $R^7$, and $R^{7'}$ are each independently selected from the group consisting of: —H, —Si($R^{13}$)$_3$; —Si[($CH_2$)$_k R^{22}$]$_z$($R^{13}$)$_{(3-z)}$; methyl, ethyl, n-propyl, i-propyl, n-butyl, sec-butyl, t-butyl, isoamyl, t-amyl, thexyl, trityl, —C($CH_3$)$Ph_2$, —($CH_2$)$_p$C[($CH_2$)$_p R^{22}$]$_z$H$_{(3-z)}$, and —Si($R^{13}$)$_{(3-z)}$[($CH_2$)$_k R^{22}$]$_z$, where p is an integer from 0 to 12 inclusive and $R^{22}$ is selected from the group consisting of: a heterocycle; an amine; a guanidine; —N$^+$($R^{11}$)$_3$ X$^-$; —P$^+$($R^{11}$)$_3$X$^-$, —P($R^{11}$)$_2$=N$^+$=P($R^{11}$)$_3$ X$^-$; —As$^+$($R^{11}$)$_3$ X$^-$, and optionally substituted pyridinium.

In certain embodiments, wherein a metal complex has formula III, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —($CH_2$)$_p$CH$_{(3-z)}$[($CH_2$)$_p R^{22}$]$_z$ and —Si($R^{13}$)$_{(3-z)}$[($CH_2$)$_k R^{22}$]$_z$.

In certain embodiments, a metal complex has formula IV, $R^1$, $R^{1'}$, $R^4$, $R^{4'}$, $R^6$, and $R^{6'}$ are each —H. In certain embodiments, wherein the complex is a metallosalenate complex of formula IV, $R^5$, $R^{5'}$, $R^7$ and $R^{7'}$ are each optionally substituted $C_1$-$C_{12}$ aliphatic.

In certain embodiments, wherein a metal complex has formula IV, $R^4$, $R^{4'}$, $R^5$, $R^{5'}$, $R^6$, $R^{6'}$, $R^7$, and $R^{7'}$ are each independently selected from the group consisting of: —H, —Si($R^{13}$)$_3$; —Si($R^{13}$)$_{(3-z)}$[($CH_2$)$_k R^{22}$]$_z$; methyl, ethyl, n-propyl, i-propyl, n-butyl, sec-butyl, t-butyl, isoamyl, t-amyl, thexyl, trityl, —($CH_2$)$_p$C[($CH_2$)$_p R^{22}$]$_z$H$_{(3-z)}$.

In certain embodiments, wherein a metal complex has formula IV, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —($CH_2$)$_p$CH$_{(3-z)}$[($CH_2$)$_p R^{22}$]$_z$ and —Si($R^{13}$)$_{(3-z)}$[($CH_2$)$_k R^{22}$]$_z$.

In certain embodiments, wherein a metal complex has formula V, $R^1$, $R^{1'}$, $R^4$, $R^{4'}$, $R^6$, and $R^{6'}$ are each —H. In certain embodiments, wherein a complex is a metallosalenate complex of formula V, $R^5$, $R^{5'}$, $R^7$ and $R^{7'}$ are each optionally substituted $C_1$-$C_{12}$ aliphatic.

In certain embodiments, wherein a metal complex has formula V, $R^4$, $R^{4'}$, $R^5$, $R^{5'}$, $R^6$, $R^{6'}$, $R^7$, and $R^{7'}$ are each independently selected from the group consisting of: —H, —Si($R^{13}$)$_3$; —Si[(CH$_2$)$_k$R$^{21}$]$_z$($R^{13}$)$_{(3-z)}$; methyl, ethyl, n-propyl, i-propyl, n-butyl, sec-butyl, t-butyl, isoamyl, t-amyl, thexyl, trityl, —(CH$_2$)$_p$CH$_{(3-z)}$[(CH$_2$)$_p$R$^{22}$]$_z$ and —Si($R^{13}$)$_{(3-z)}$[(CH$_2$)$_k$R$^{22}$]$_z$.

In certain embodiments, wherein a metal complex has formula V, $R^7$ is selected from the group consisting of —H; methyl; ethyl; n-propyl; i-propyl; n-butyl; sec-butyl; t-butyl; isoamyl; t-amyl; thexyl; and trityl; and $R^5$ is selected from the group consisting of —(CH$_2$)$_p$CH$_{(3-z)}$[(CH$_2$)$_p$R$^{22}$]$_z$ and —Si($R^{13}$)$_{(3-z)}$[(CH$_2$)$_k$R$^{22}$]$_z$.

In some embodiments, a metal complex has a structure $L_p$-M-($L_I$)$_m$, where $L_p$-M is selected from the group consisting of:

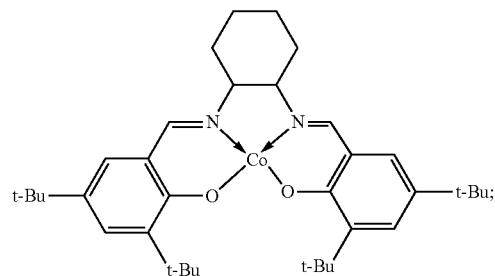

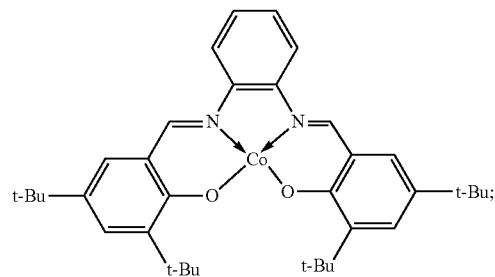

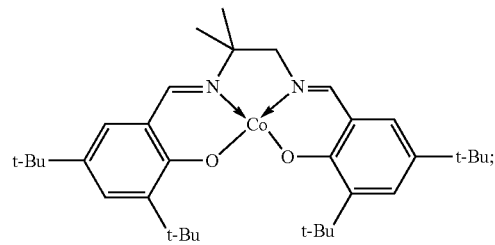

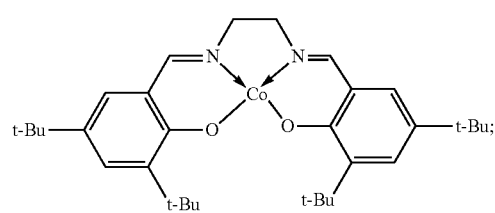

-continued

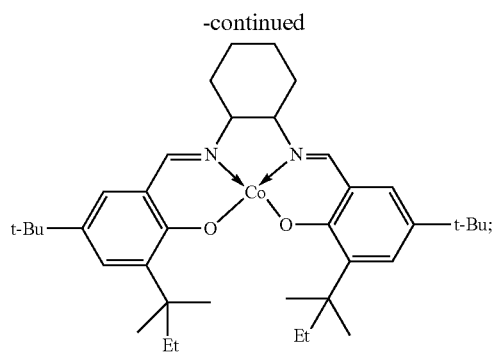

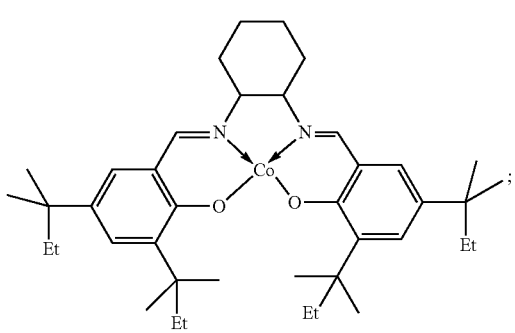

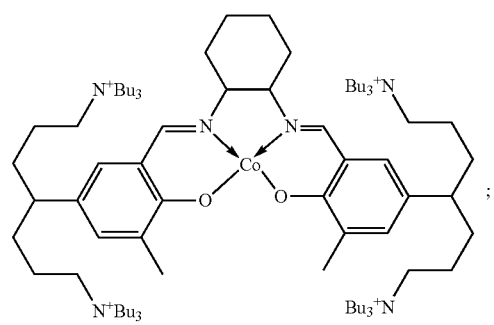

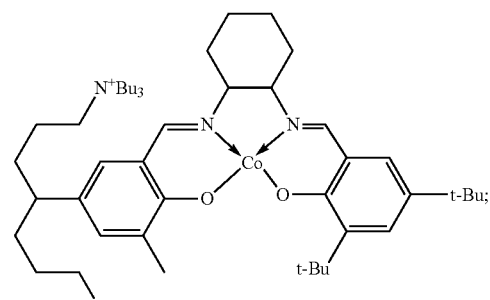

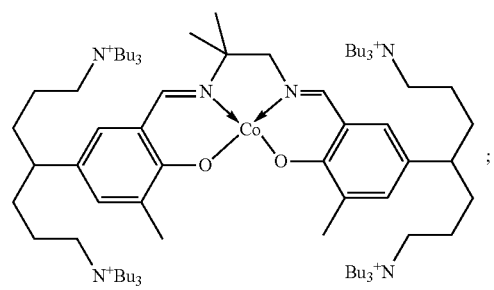

-continued

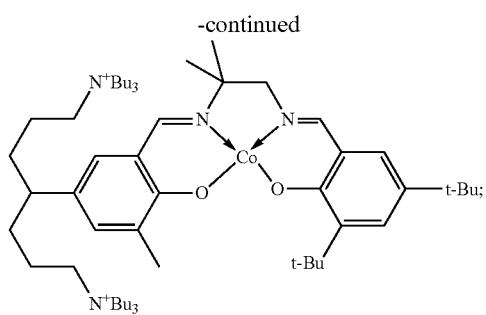

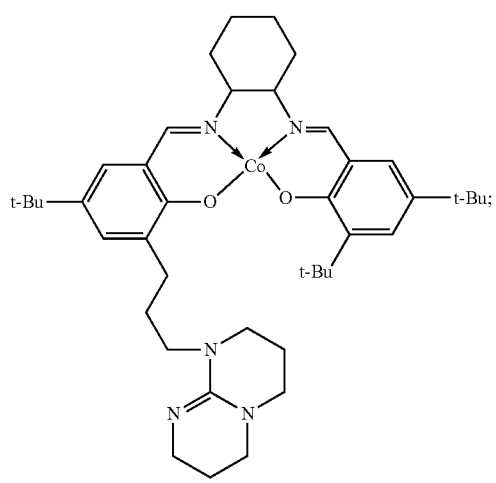

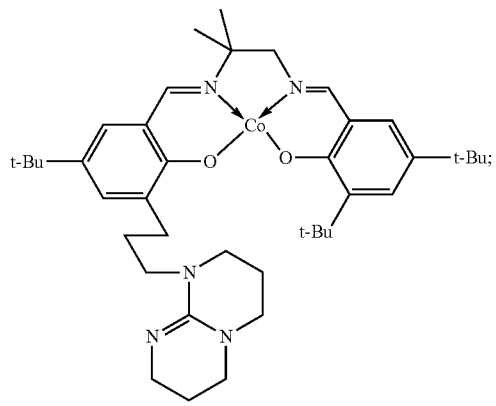

-continued

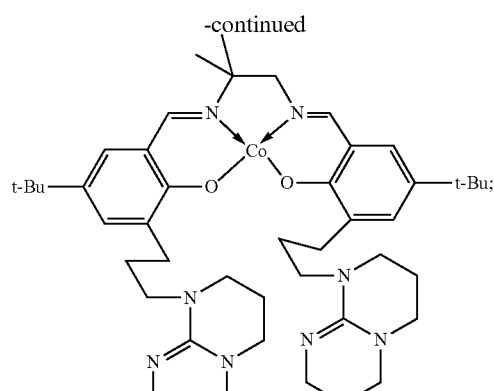

In other embodiments, the permanent ligand set comprises a porphyrin ring and L-M has the structure:

XLVIII

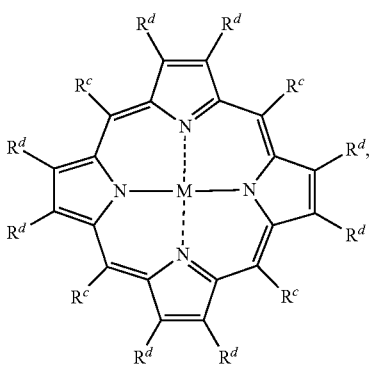

wherein:

M, $L_p$, $R^c$, and $R^d$ are as defined above and any two adjacent $R^c$ or $R^d$ groups can be taken together to form one or more rings optionally substituted with one or more $R^{20}$ groups In certain embodiments where the permanent ligand set comprises a porphyrin ring, M is a metal atom selected from the group consisting of: cobalt; chromium; aluminum; titanium; ruthenium, and manganese.

As noted above, in some embodiments herein, the permanent ligand set may comprise a plurality of discrete ligands. In certain embodiments the permanent ligand set includes two bidentate ligands. In certain embodiments, such bidentate ligands may have the structure

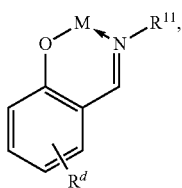

where $R^d$ and $R^{11}$ are as defined hereinabove. Metal complexes having two such ligands may adopt one of several geometries, and the present disclosure encompasses complex having any of the possible geometries, as well as mixtures of two or more geometrical isomers.

In certain embodiments, metal complexes including two bidentate ligands may have structures selected from the group consisting of:

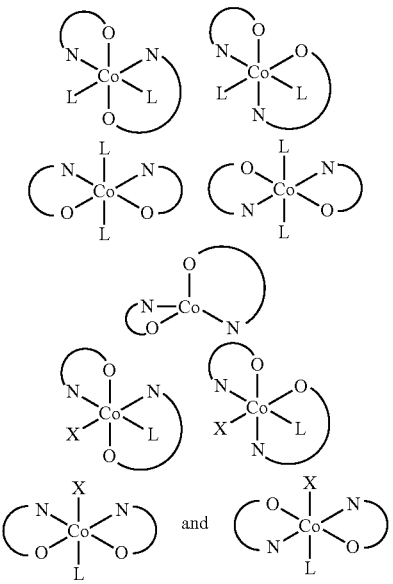

where each

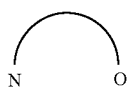

represents a ligand:

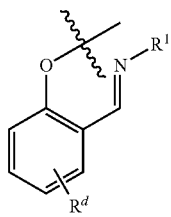

I.a.3 Initiating Ligands

In addition to a metal atom and a permanent ligand set described hereinabove, metal complexes suitable for polymerization systems of the present invention optionally include one or more initiating ligands $-L_I$. In some embodiments, these ligands act as polymerization initiators and become a part of a growing polymer chain. In certain embodiments, there is one initiating ligand present (i.e. m=1). In other embodiments, there are two initiating ligands present (i.e. m=2). In certain embodiments, an initiating ligand may be absent (i.e. m=0). In certain embodiments, a metal complex may be added to a reaction mixture without an initiating ligand, but may form a species in situ that includes one or two initiating ligands.

In certain embodiments, $-L_I$ is any anion. In certain embodiments, $-L_I$ is a nucleophile. In some embodiments, initiating ligands $-L_I$ are nucleophiles capable of ring-opening an epoxide. In some embodiments, a polymerization initiator $L_I$ is selected from the group consisting of: azide, halides, alkyl sulfonates, carboxylates, alkoxides, and phenolates.

In some embodiments, initiating ligands include, but are not limited to, $-OR^x$, $-SR^x$, $-OC(O)R^x$, $-OC(O)OR^x$, $-OC(O)N(R^x)_2$, $-NR^xC(O)R^x$, $-CN$, halo (e.g., $-Br$, $-I$, $-Cl$), $-N_3$, and $-OSO_2R^x$ wherein each $R^x$ is, independently, selected from hydrogen, optionally substituted aliphatic, optionally substituted heteroaliphatic, optionally substituted aryl and optionally substituted heteroaryl and where two $R^x$ groups can be taken together to form an optionally substituted ring optionally containing one or more additional heteroatoms.

In certain embodiments, $-L_I$ is $-OC(O)R^x$, wherein $R^x$ is selected from optionally substituted aliphatic, fluorinated aliphatic, optionally substituted heteroaliphatic, optionally substituted aryl, fluorinated aryl, and optionally substituted heteroaryl.

In certain embodiments, $-L_I$ is $-OC(O)R^x$, wherein $R^x$ is optionally substituted aliphatic. In certain embodiments, $-L_I$ is $-OC(O)R^x$, wherein $R^x$ is optionally substituted alkyl or fluoroalkyl. In certain embodiments, $-L_I$ is $-OC(O)CH_3$ or $-OC(O)CF_3$.

Furthermore, in certain embodiments, $-L_I$ is $-OC(O)R^x$, wherein $R^x$ is optionally substituted aryl, fluoroaryl, or heteroaryl. In certain embodiments, $-L_I$ is $-OC(O)R^x$, wherein $R^x$ is optionally substituted aryl. In certain embodiments, $-L_I$ is $-OC(O)R^x$, wherein $R^x$ is optionally substituted phenyl. In certain embodiments, $-L_I$ is $-OC(O)C_6H_5$ or $-OC(O)C_6F_5$.

In certain embodiments, $-L_I$ is $-OR^x$, wherein $R^x$ is selected from optionally substituted aliphatic, optionally substituted heteroaliphatic, optionally substituted aryl, and optionally substituted heteroaryl.

For example, in certain embodiments, $-L_I$ is $-OR^x$, wherein $R^x$ is optionally substituted aryl. In certain embodiments, $-L_I$ is $-OR^x$, wherein $R^x$ is optionally substituted phenyl. In some embodiments, $-L_I$ is a 2,4-dinitrophenolate anion. In certain embodiments, $-L_I$ is $-OC_6H_5$.

In certain embodiments, $-L_I$ is halo. In certain embodiments, $-L_I$ is $-Br$. In certain embodiments, $-L_I$ is $-Cl$. In certain embodiments, $-L_I$ is $-I$.

In certain embodiments, $-L_I$ is $-O(SO_2)R^x$. In certain embodiments $-L$ is -OTs. In certain embodiments $-L_I$ is $-OSO_2Me$. In certain embodiments $-L_I$ is $-OSO_2CF_3$.

In some embodiments, metal complexes $L_p$-M-$(L_I)_m$, include one or more initiating ligands $-L_I$ characterized in that each ligand is capable of initiating two or more polymer chains. In some embodiments, the initiating ligand is any of the molecules described above as being suitable as chain transfer agents. In certain embodiments, an initiating ligand is an anion derived from any of the chain transfer agents described hereinabove.

In some embodiments, a polymerization initiator -$L_I$ comprises a compound of the formula -Q'-A'-(Z')$_n$, wherein:
-Q'- is a carboxy or alkoxy group,
-A'- is a covalent bond or a multivalent moiety,
each Z' is independently a functional group that can initiate a polymer chain, and
n is an integer between 1 and 10 inclusive.

In certain embodiments wherein a polymerization initiator comprises a compound having the formula -Q'-A'(Z')$_n$, each —Z', is a functional group independently selected from the group consisting of: —OH, —C(O)OH, —C(OR$^y$)OH, —OC(R$^y$)OH, —NHR$^y$, —NHC(O)R$^y$, —NHC═NR$^y$; —NR$^y$C═NH; —NR$^y$C(NR$^y{}_2$)═NH; —NHC(NR$^y{}_2$)═NR$^y$; —NHC(O)OR$^y$, —NHC(O)NR$^y{}_2$, —C(O)NHR$^y$, —C(S)NHR$^y$, —OC(O)NHR$^y$, —OC(S)NHR$^y$, —SH, —C(O)SH, —B(OR$^y$)OH, —P(O)$_a$(R$^y$)$_b$(OR$^y$)$_c$(OH)$_d$, —OP(O)$_a$(R$^y$)$_b$(OR$^y$)$_c$(OH)$_d$, —N(R$^y$)OH, —ON(R$^y$)H; ═NOH, ═NN(R$^y$)H, where each occurrence of R$^y$ is independently —H, or an optionally substituted radical selected from the group consisting of $C_{1-20}$ aliphatic, $C_{1-20}$ heteroaliphatic, 3- to 12-membered heterocyclic, and 6- to 12-membered aryl, a and b are each independently 0 or 1, c is 0, 1 or 2, d is 0 or 1, and the sum of a, b, and c is 1 or 2; and
-A'- is selected from the group consisting of: a) $C_2$-$C_{20}$ aliphatic b) a $C_3$-$C_{20}$ carbocycle; c) a 3- to 12-membered heterocycle; d) a saccharide; e) an oligosaccharide; f) a polysaccharide; and g) a polymer chain, wherein any of (a) through (g) are optionally substituted with one or more R$^{20}$ groups.

In certain embodiments wherein a polymerization initiator comprises a compound having the formula -Q'-A'-(Z')$_n$, each —Z', is independently selected from the group consisting of: —OH; and —C(O)OH—.

In some embodiments, -A'- is a covalent bond.

In certain embodiments wherein a polymerization initiator comprises a compound having the formula -Q'-A'-(Z')$_n$, -A'- is a $C_{2-20}$ aliphatic group, and n is an integer from 1 to 5.

In certain embodiments wherein a polymerization initiator comprises a compound having the formula -Q'-A'(Z')$_n$, -A'- is a $C_{2-12}$ aliphatic group, and n is an integer from 1 to 3.

In certain embodiments wherein a polymerization initiator comprises a compound having the formula -Q'-A'(Z')$_n$, Q' is —OC(O)—; -A'- is a $C_{2-20}$ aliphatic group; Z' is —OH; and n is an integer from 1 to 3.

In certain embodiments, where a polymerization initiator has more than one site capable of coordinating with a metal atom, a single polymerization initiator may be shared by multiple metal complexes (each metal complex including at one metal atom and a permanent ligand set). For example, when $L_I$ is a diacid, each carboxyl group of the diacid may be coordinated to a metal atom of a separate metal complex (i.e. a dimeric or pseudodimeric complex having a formula $L_p$-M-O$_2$C-A'-CO$_2$-M-$L_p$, where A', M, and $L_p$ are as defined previously). Similarly, a triacid may be coordinated to one two or three metal centers, or a hydroxy acid, a dialkoxide, amino acid or other polyfunctional compound can coordinate with two or more $L_p$-M groups.

In certain embodiments, an initiating ligand is a polycarboxylic acid having 2 to 4 carboxyl groups. In certain embodiments, an initiating ligand is a $C_{2-20}$ diacid. In certain embodiments, an initiating ligand is selected from the group consisting of I-1 through I-24:

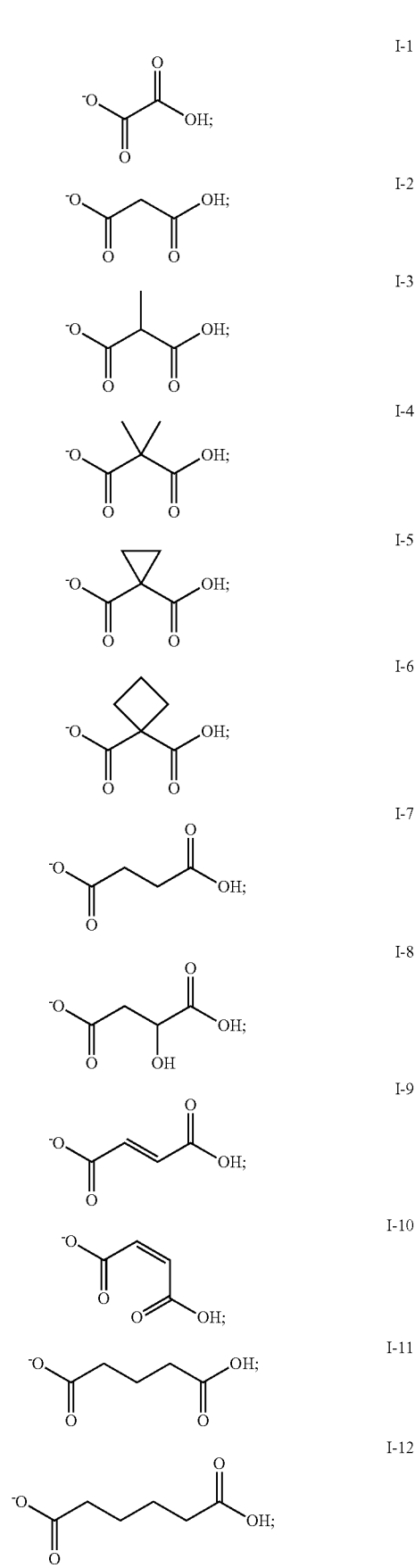

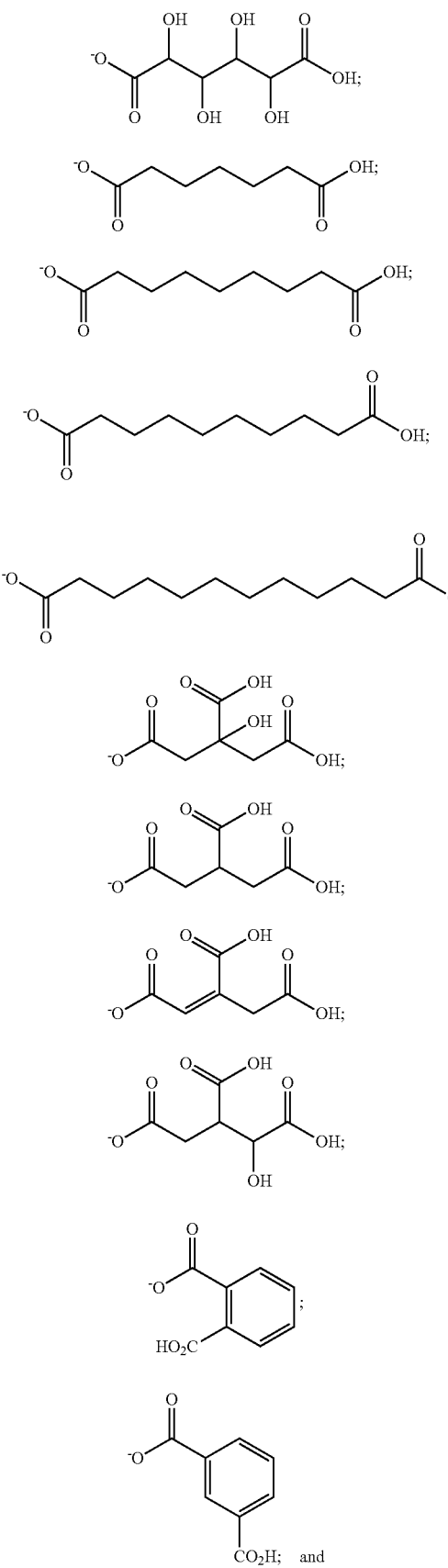
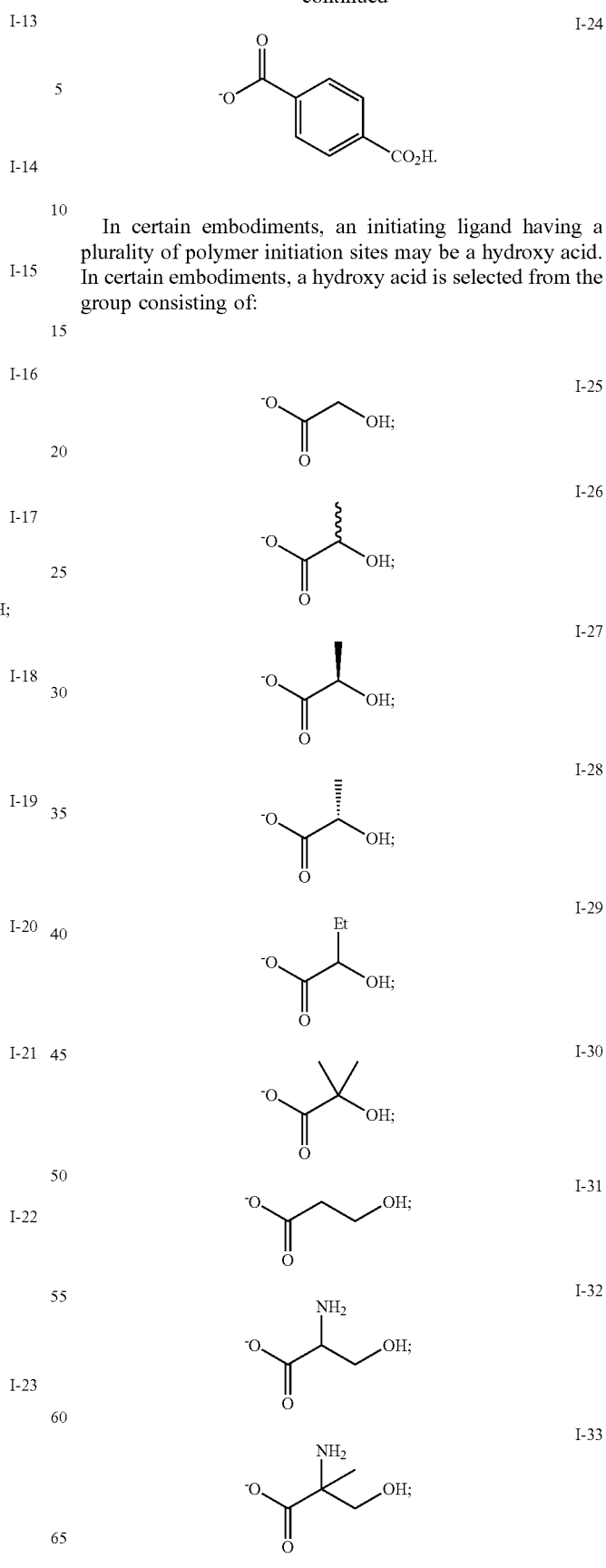
In certain embodiments, an initiating ligand having a plurality of polymer initiation sites may be a hydroxy acid. In certain embodiments, a hydroxy acid is selected from the group consisting of:

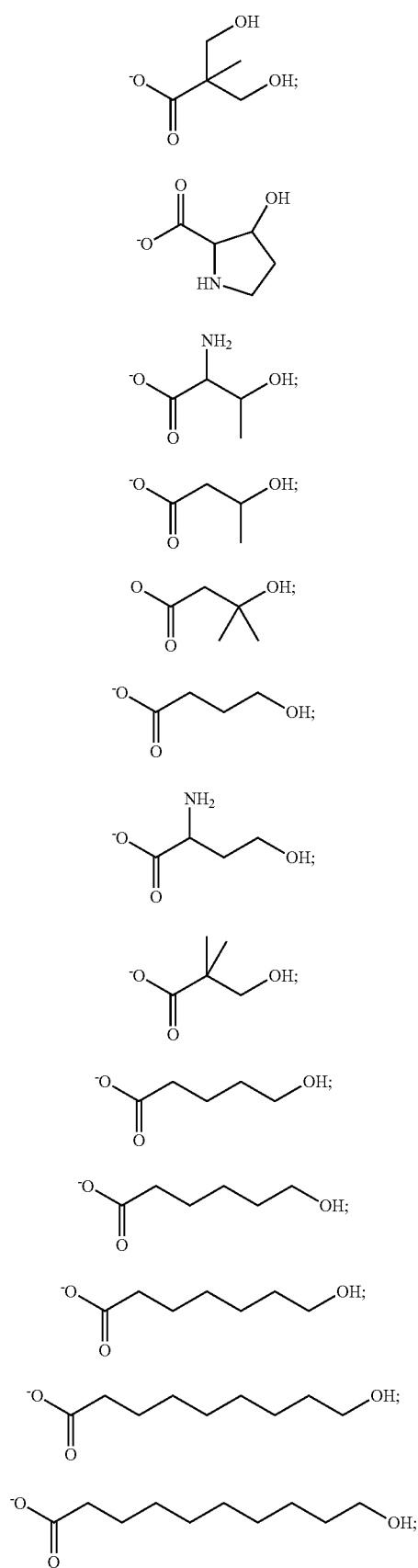
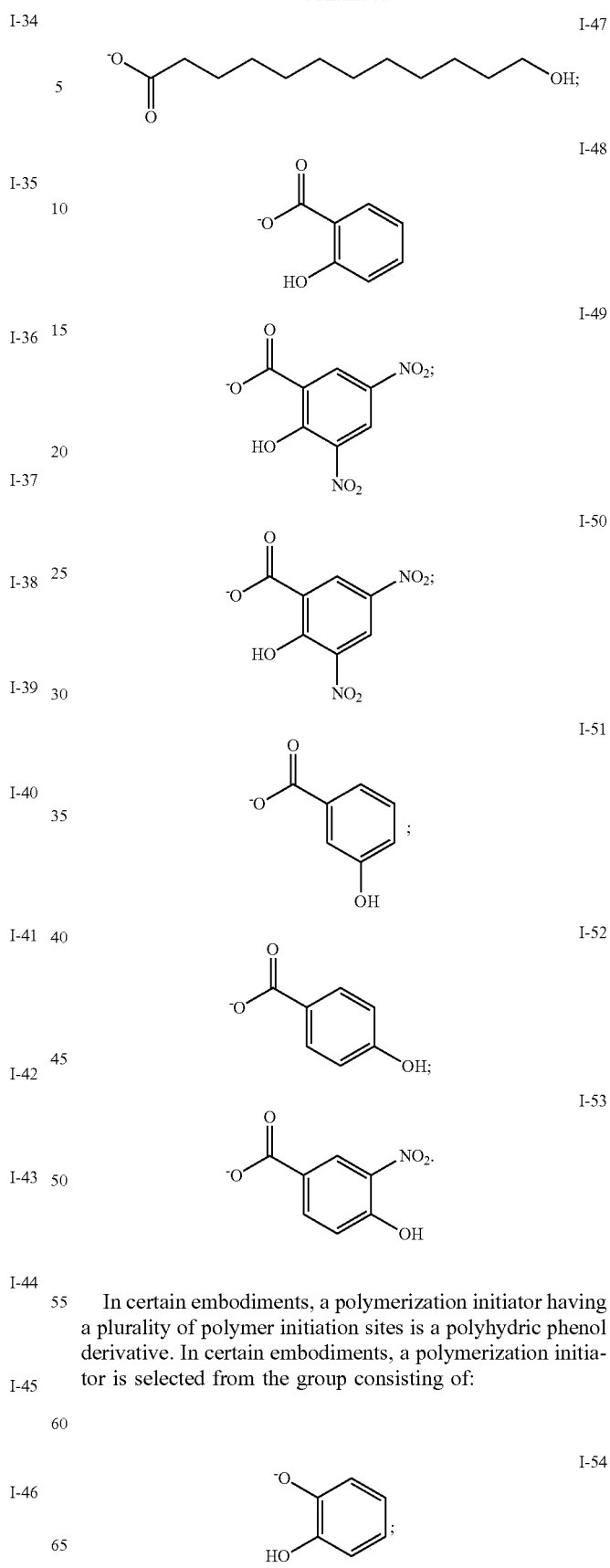
In certain embodiments, a polymerization initiator having a plurality of polymer initiation sites is a polyhydric phenol derivative. In certain embodiments, a polymerization initiator is selected from the group consisting of:
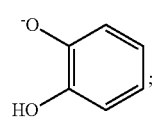

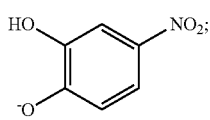

I-55

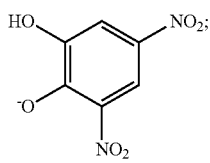

I-56

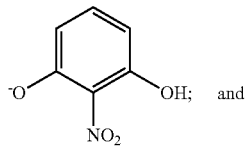

I-57

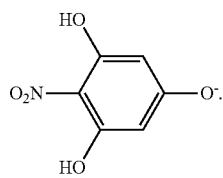

I-58

In some embodiments, an initiating ligand is a polyalcohol. In certain embodiments, a polyalcohol is a diol. Suitable diols include but are not limited to: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and 1,4-cyclohexanediethanol.

In some embodiments, an initiating ligand is an alkoxide derived from a compound selected from the group consisting of: diethylene glycol, triethylene glycol, tetraethylene glycol, pentaethylene glycol, higher poly(ethylene glycol), dipropylene glycol, tripropylene glycol, and higher poly(propylene glycol). In some embodiments, higher poly(ethylene glycol) compounds are those having number average molecular weights of from 220 to about 2000 g/mol. In some embodiments, higher poly(propylene glycol) compounds are those having number average molecular weights of from 234 to about 2000 g/mol.

In some embodiments, suitable diols include 4,4'-(1-methylethylidene) bis[cyclohexanol], 2,2'-methylenebis[phenol], 4,4'-methylenebis[phenol], 4,4'-(phenylmethylene)bis[phenol], 4,4'-(diphenylmethylene)bis[phenol], 4,4'-(1,2-ethanediyl)bis[phenol], 4,4'-(1,2-cyclohexanediyl)bis[phenol], 4,4'-(1,3-cyclohexanediyl)bis[phenol], 4,4'-(1,4-cyclohexanediyl)bis[phenol], 4,4'-ethylidenebis[phenol], 4,4'-(1-phenylethylidene)bis[phenol], 4,4'-propylidenebis[phenol], 4,4'-cyclohexylidenebis[phenol], 4,4'-(1-methylethylidene)bis[phenol], 4,4'-(1-methylpropylidene)bis[phenol], 4,4'-(1-ethylpropylidene)bis[phenol], 4,4'-cyclohexylidenebis[phenol], 4,4'-(2,4,8,10-tetraoxaspiro[5.5]undecane-3,9-diyldi-2, 1-ethanediyl)bis[phenol], 1,2-benzenedimethanol, 1,3-benzenedimethanol, 1,4-benzenedimethanol, 4,4'-[1,3-phenylenebis(1-methylethylidene)]bis[phenol], 4,4'-[1,4-phenylenebis(1-methylethylidene)]bis[phenol], phenolphthalein, 4,4'-(1-methylidene)bis[2-methylphenol], 4,4'-(1-methylethylidene)bis[2-(1-methylethyl)phenol], 2,2'-methylenebis[4-methyl-6-(l-methylethyl)phenol], In some embodiments, a polyol is a triol. Suitable triols may include, but are not limited to: aliphatic triols having a molecular weight less than 500 such as trimethylolethane; trimethylolpropane; glycerol; 1,2,4-butanetriol; 1,2,6-hexanetriol; tris(2-hydroxyethyl)isocyanurate; hexahydro-1,3,5-tris(hydroxyethyl)-s-triazine; 6-methylheptane-1,3,5-triol; polypropylene oxide triol; and polyester triols.

In certain embodiments, a polyol is a tetraol. Examples of suitable tetraols include, but are not limited to: erythritol, pentaerythritol; 2,2'-dihydroxymethyl-1, 3-propanediol; and 2,2'-(oxydimethylene) bis-(2-ethyl-1,3-propanediol).

In certain embodiments, a metal coordination complex is selected from the group consisting of:

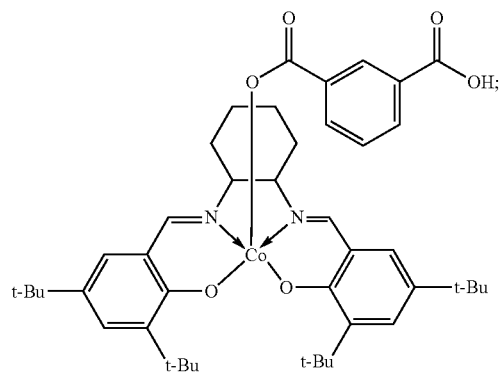

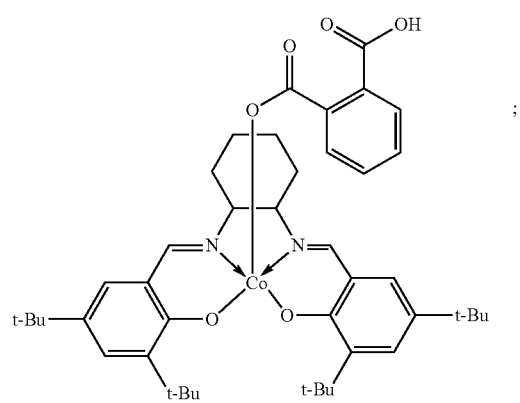

45
-continued
46
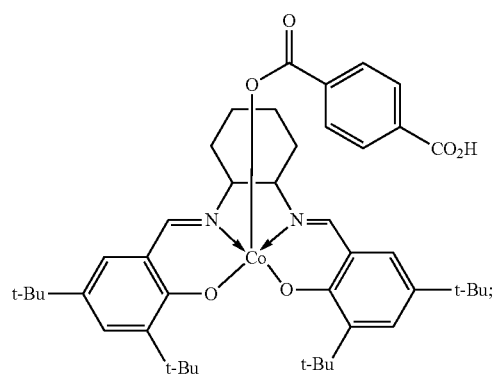
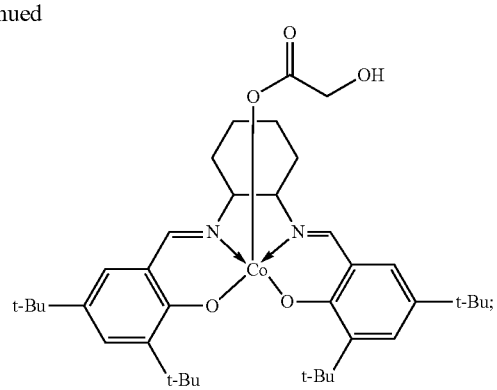
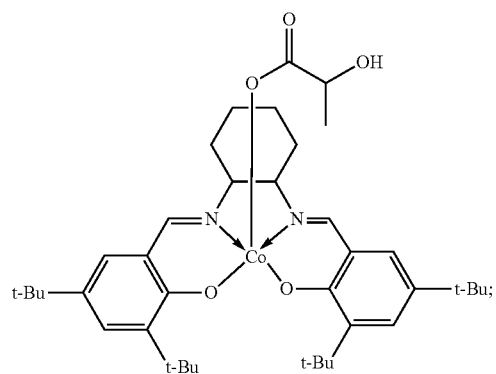
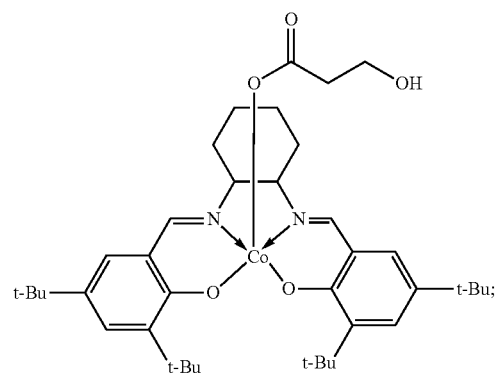
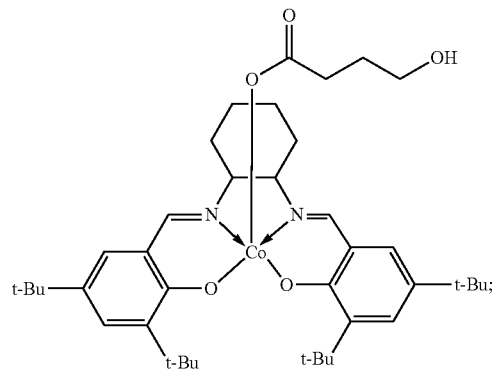
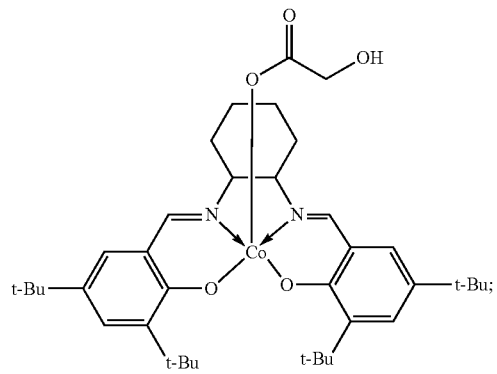
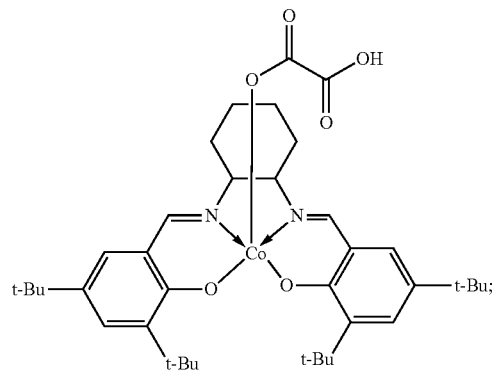
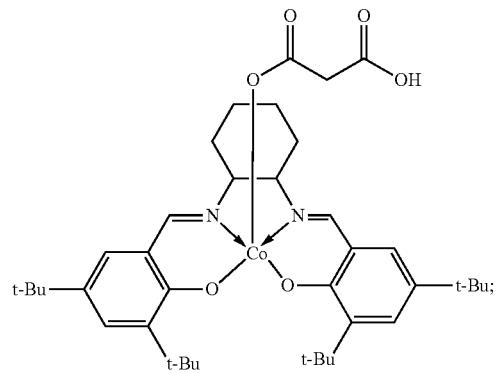

-continued
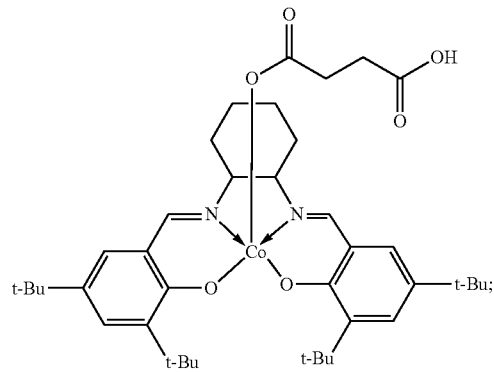
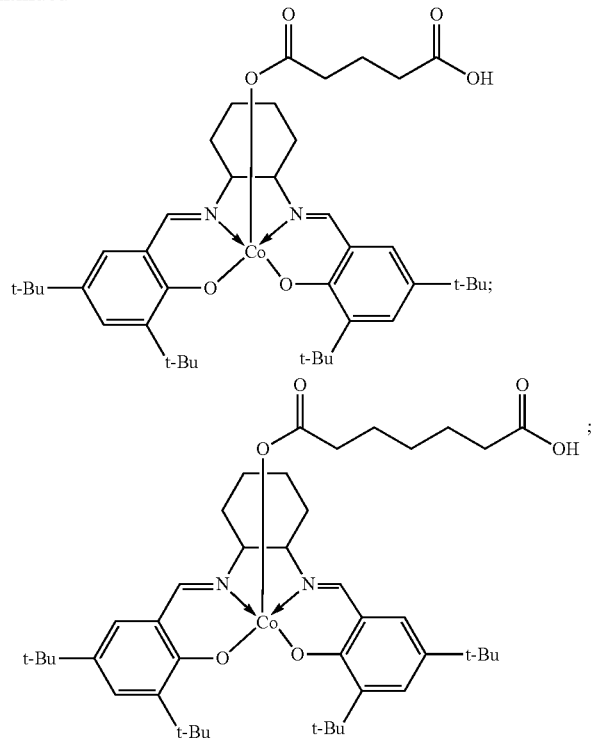
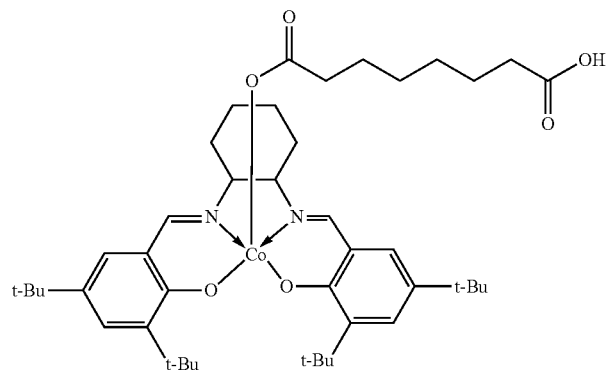
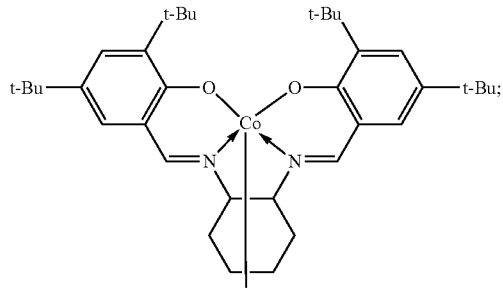
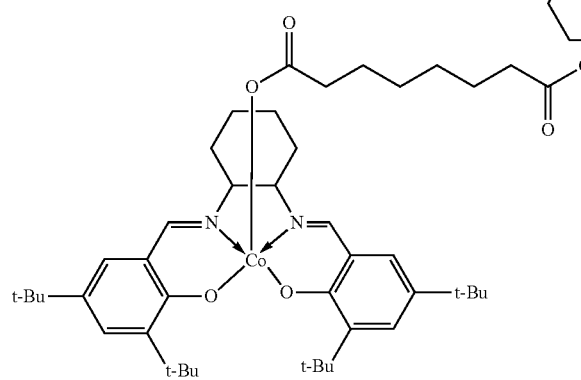

-continued
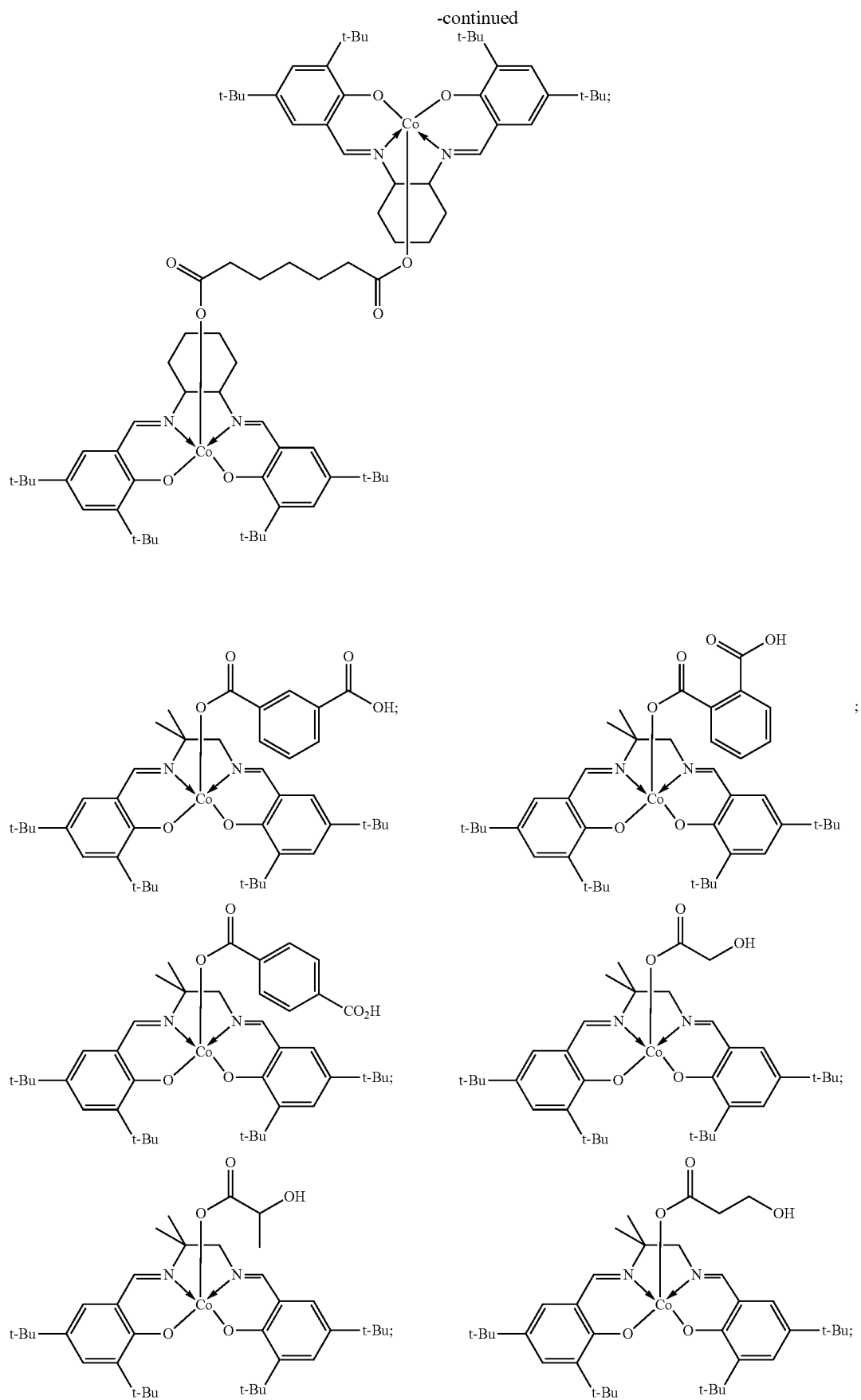

-continued
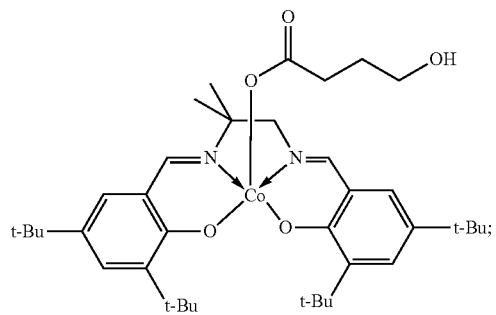
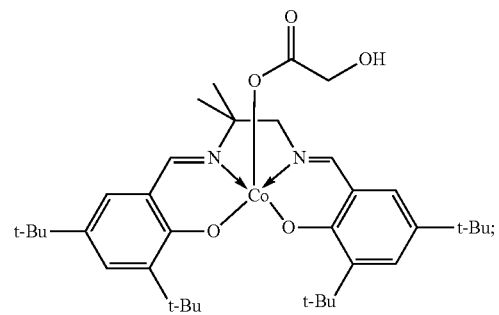
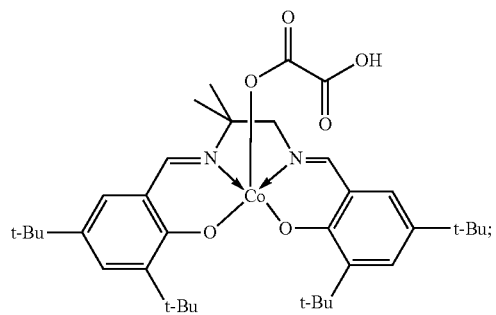
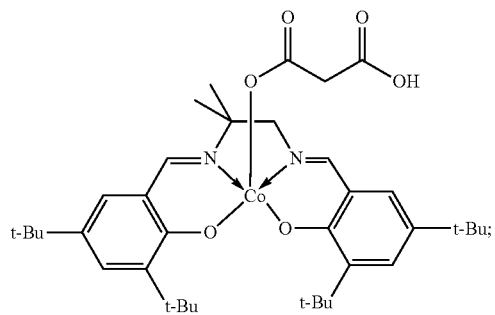
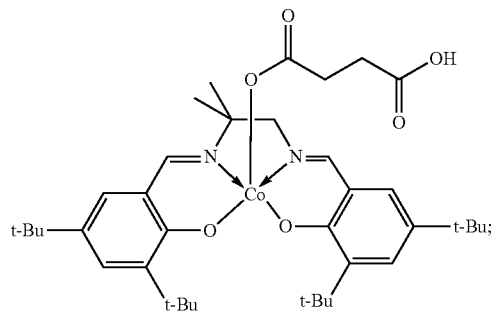
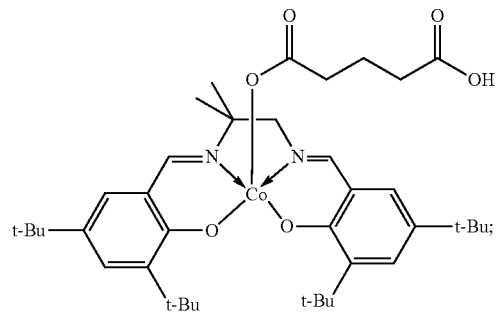
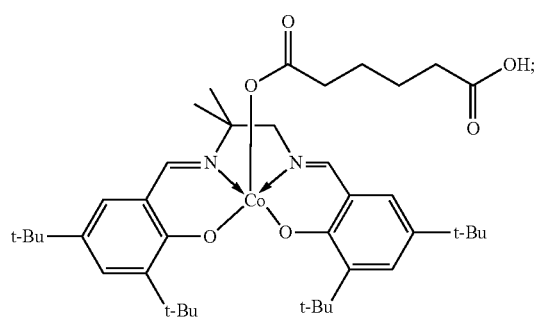
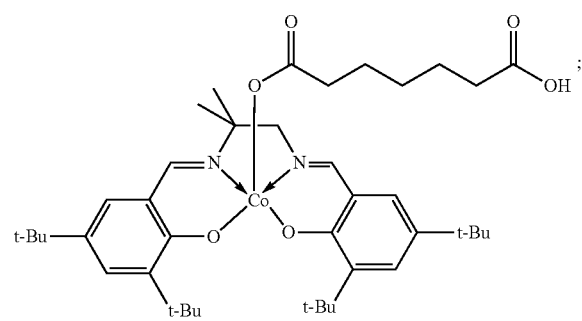
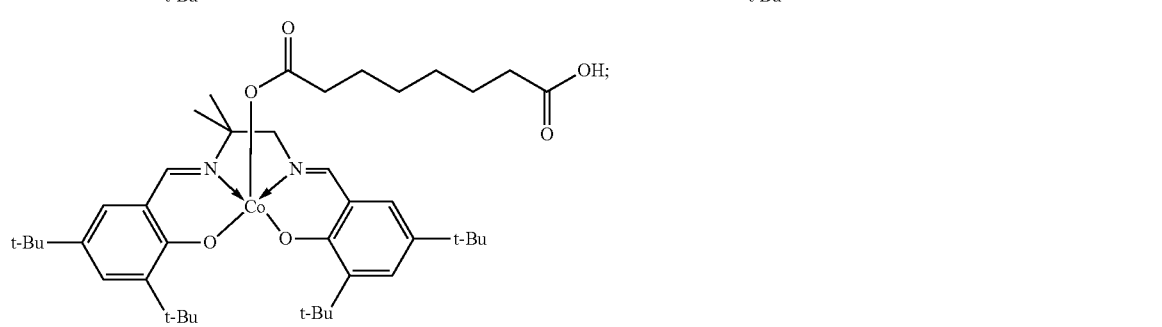

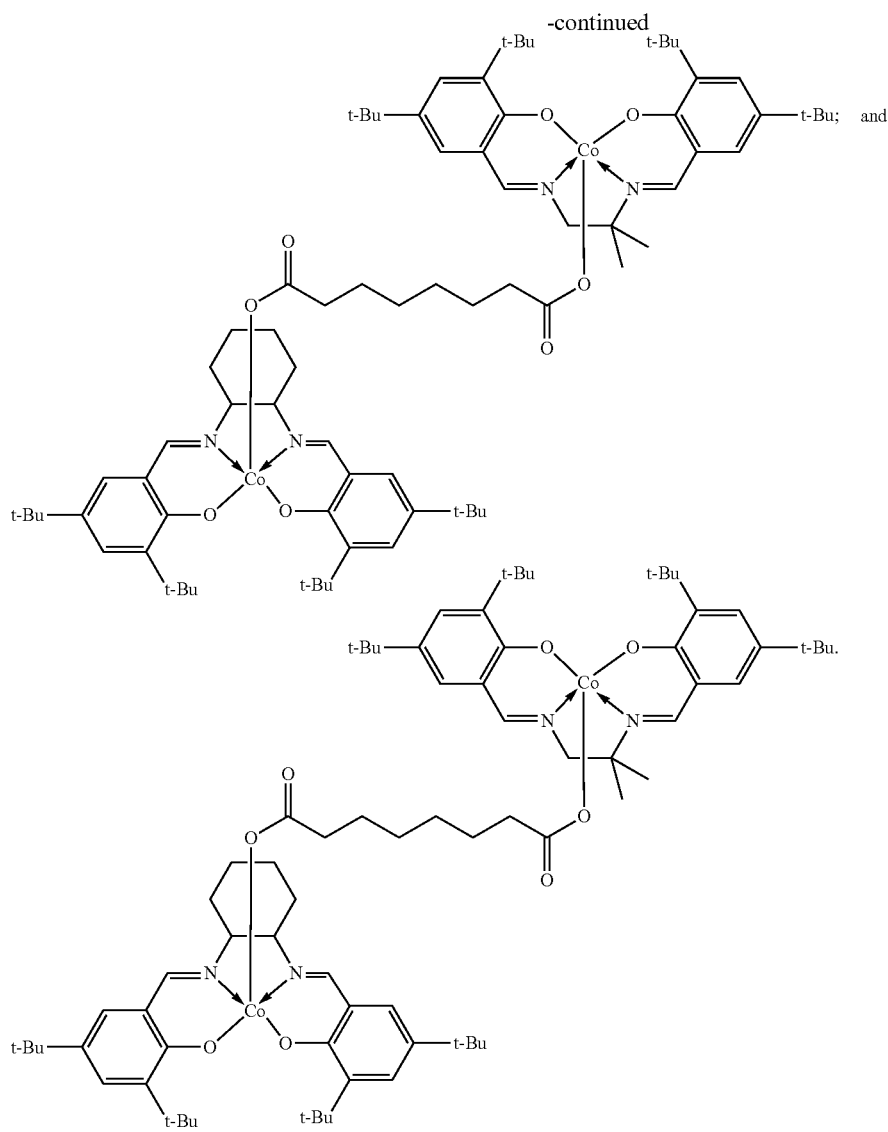
In some embodiments, a metal coordination complex is selected from compounds of formulae XLIX through LIV:
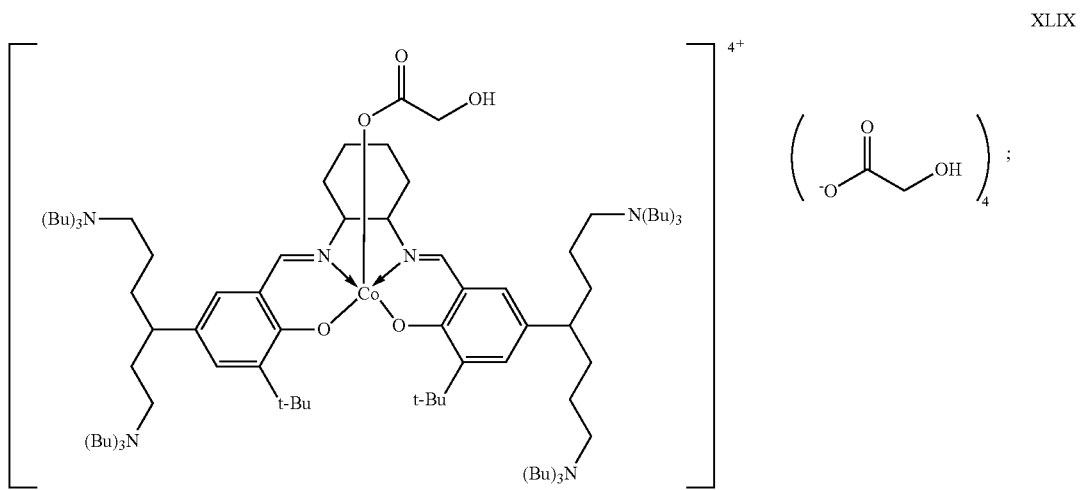

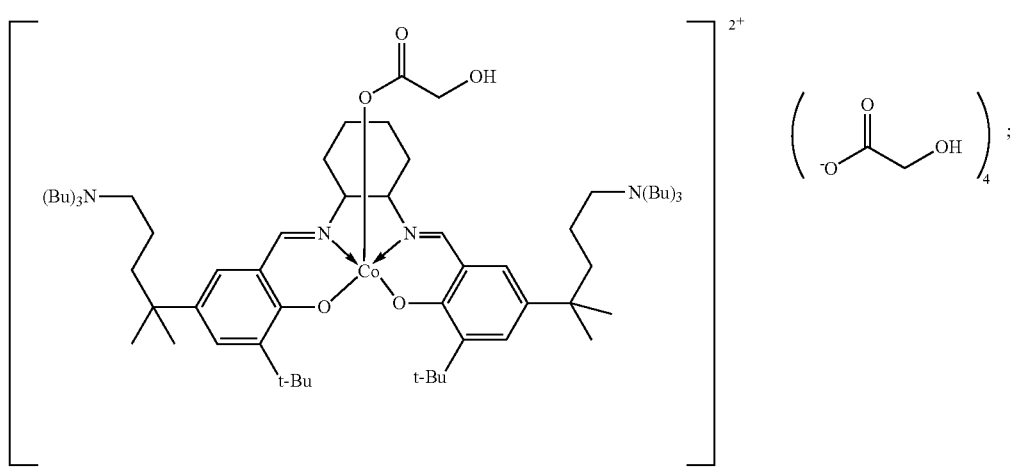
L
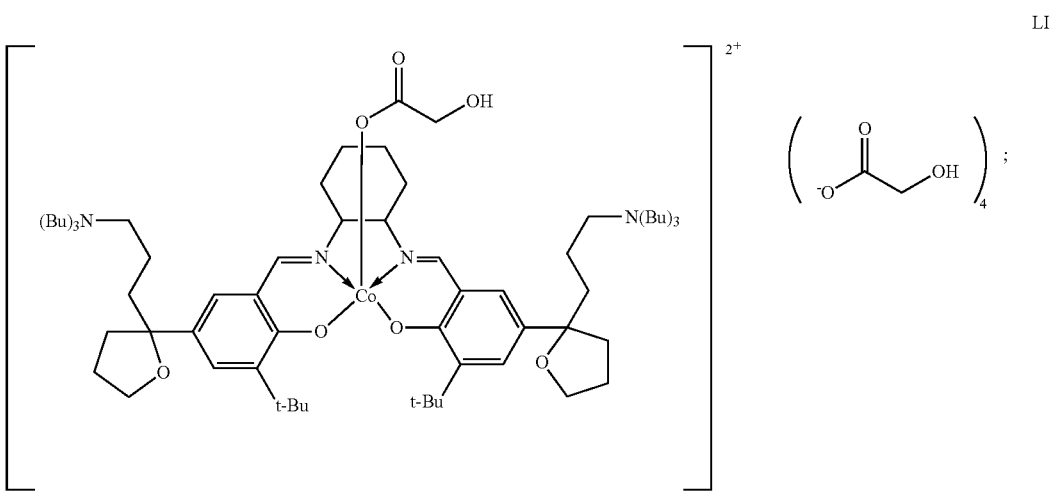
LI
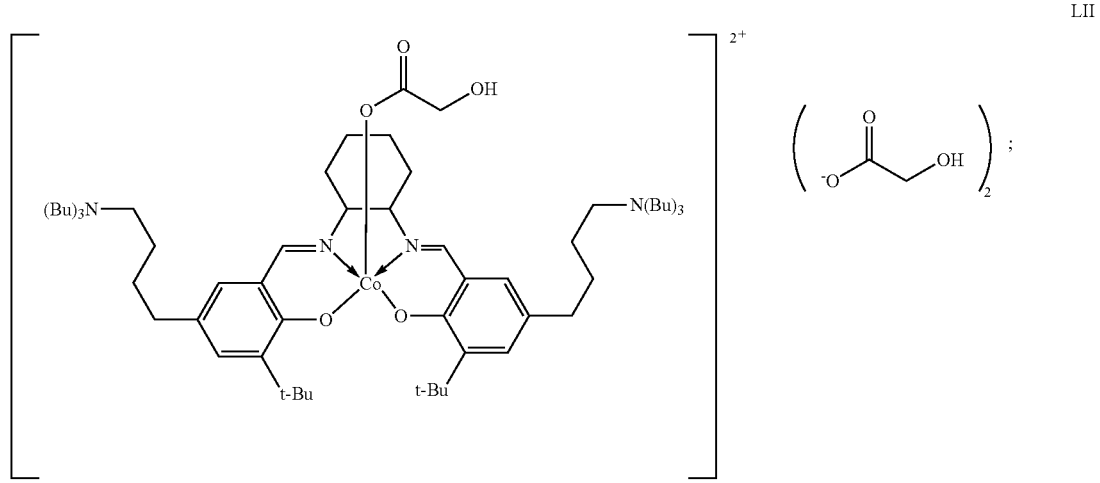
LII

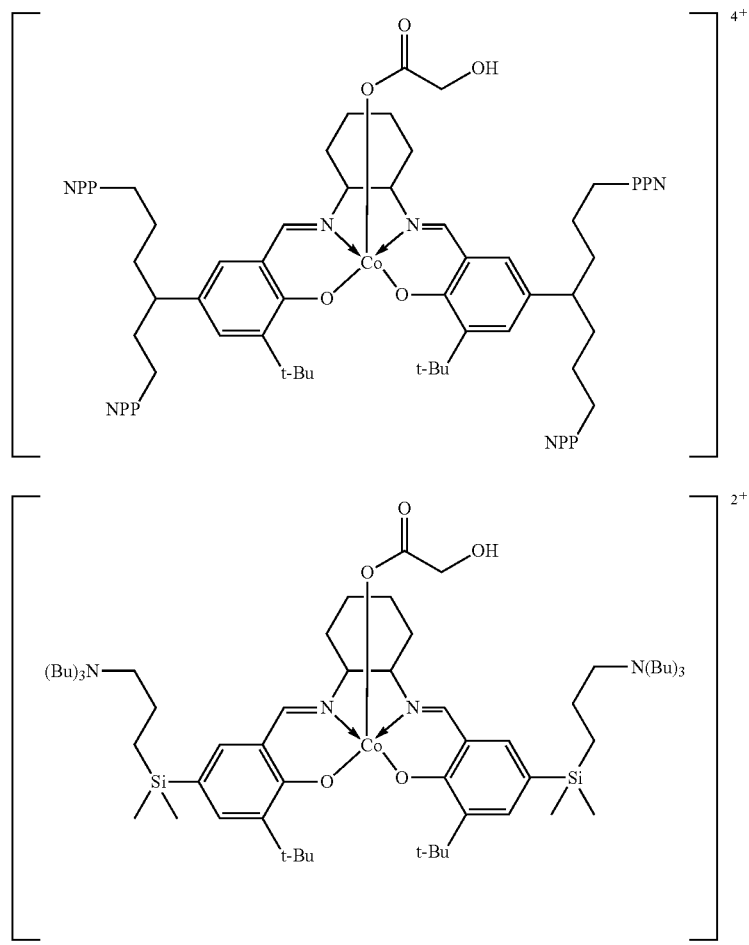

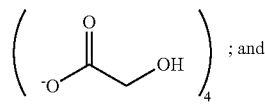

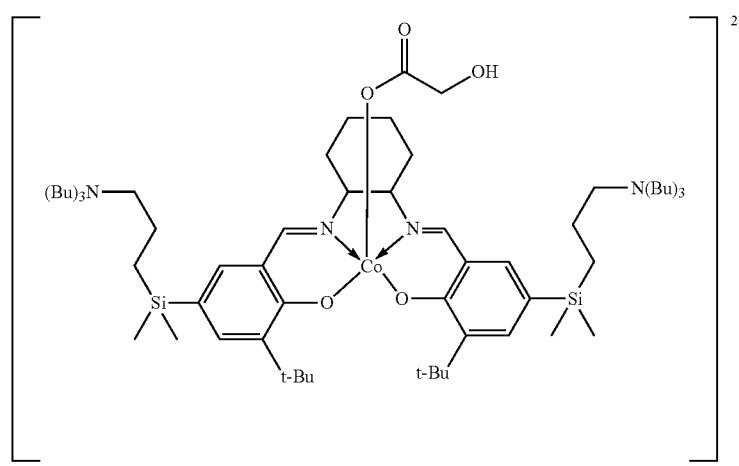

In some embodiments, polymerization systems of the present invention further include at least one co-catalyst. In some embodiments, a co-catalyst is selected from the group consisting of: amines, guanidines, amidines, phosphines, nitrogen-containing heterocycles, ammonium salts, phosphonium salts, arsonium salts, bisphosphine ammonium salts, and a combination of any two or more of the above.

In embodiments where the co-catalyst is an 'onium' salt, there is necessarily an anion present to balance the charge of the salt. In certain embodiments, this is any anion. In certain embodiments, the anion is a nucleophile. In some embodiments, the anion is a nucleophile capable of ring-opening an epoxide. In some embodiments, the anion is selected from the group consisting of: azide, halides, alkyl sulfonates, carboxylates, alkoxides, and phenolates.

In some embodiments, ionic co-catalyst include anions selected from the group consisting of: —$OR^x$, —$SR^x$, —$OC(O)R^x$, —$OC(O)OR^x$, —$OC(O)N(R^x)_2$, —$NR^xC(O)R^x$, —CN, halo (e.g., —Br, —I, —Cl), —$N_3$, and —$OSO_2R^x$ wherein each $R^x$ is, independently, selected from hydrogen, optionally substituted aliphatic, optionally substituted heteroaliphatic, optionally substituted aryl and optionally substituted heteroaryl and where two $R^x$ groups can be taken together to form an optionally substituted ring optionally containing one or more additional heteroatoms.

In certain embodiments, a co-catalyst anion is —OC(O)$R^x$, wherein $R^x$ is selected from optionally substituted aliphatic, fluorinated aliphatic, optionally substituted heteroaliphatic, optionally substituted aryl, fluorinated aryl, and optionally substituted heteroaryl.

In certain embodiments, a co-catalyst anion is —OC(O)$R^x$, wherein $R^x$ is optionally substituted aliphatic. In certain embodiments, a co-catalyst anion is —OC(O)$R^x$, wherein $R^x$ is optionally substituted alkyl and fluoroalkyl. In certain embodiments, a co-catalyst anion is —OC(O)$CH_3$ or —OC(O)$CF_3$.

Furthermore, in certain embodiments, a co-catalyst anion is —OC(O)$R^x$, wherein $R^x$ is optionally substituted aryl, fluoroaryl, or heteroaryl. In certain embodiments, a co-catalyst anion is —OC(O)$R^x$, wherein $R^x$ is optionally substituted aryl. In certain embodiments, a co-catalyst anion is —OC(O)$R^x$, wherein $R^x$ is optionally substituted phenyl. In certain embodiments, a co-catalyst anion is —OC(O)$C_6H_5$ or —OC(O)$C_6F_5$.

In certain embodiments, a co-catalyst anion is —$OR^x$, wherein $R^x$ is selected from optionally substituted aliphatic, optionally substituted heteroaliphatic, optionally substituted aryl, and optionally substituted heteroaryl.

For example, in certain embodiments, a co-catalyst anion is —$OR^x$, wherein $R^x$ is optionally substituted aryl. In certain embodiments, a co-catalyst anion is —$OR^x$, wherein $R^x$ is optionally substituted phenyl. In certain embodiments, a co-catalyst anion is —$OC_6H_5$ or —$OC_6H_2(2,4-NO_2)$.

In certain embodiments, a co-catalyst anion is halo. In certain embodiments, a co-catalyst anion is —Br. In certain embodiments, a co-catalyst anion is —Cl. In certain embodiments, a co-catalyst anion is —I.

In certain embodiments, a co-catalyst anion is —O(SO$_2$)R$^x$. In certain embodiments a co-catalyst anion is -OTs. In certain embodiments a co-catalyst anion is —OSO$_2$Me. In certain embodiments a co-catalyst anion is —OSO$_2$CF$_3$. In some embodiments, a co-catalyst anion is a 2,4-dinitrophenolate anion.

In certain embodiments, polymerization systems of the present invention include a cationic co-catalyst having a counterion characterized in that the counterion is capable of initiating polymerization at two or more sites. In some embodiments, a counterion is any of the molecules described above as being suitable as initiating ligands (L$_I$). In certain embodiments, an anion is derived from any of the chain transfer agents described hereinabove.

In some embodiments, an anion of the ionic co-catalyst comprises an anion of the formula $^-$Q'-A'(Z')$_1$, wherein:
  $^-$Q'- is a carboxy or alkoxy group,
  -A'- is a covalent bond or a multivalent moiety,
  each Z' is independently a functional group that can initiate a polymer chain, and
  n is an integer between 1 and 10 inclusive, In certain embodiments, where an anion of an ionic co-catalyst is a polyfunctional compound, it is possible for a polyfunctional compound to be counterion to more than one cationic co-catalyst, or to be associated with both a co-catalyst cation and a metal complex. For example, if a co-catalyst is an ammonium salt and the counterion is a diacid, the diacid may be doubly deprotonated and maybe associated with two ammonium cations: N$^+$R$_4$$^-$O$_2$C-A'-CO$_2$—N$^+$R$_4$. Similarly, two PPN+ cations may be associated with a single diacid. Alternatively, the diacid may be associated with both a co-catalytic cation and a metal complex: N$^+$R$_4$$^-$O$_2$C-A'-CO$_2$$^-$M$^+$-L$_p$. It will be apparent to the skilled artisan that many such variations are possible and it will also be understood that the ionic compounds and coordination complexes described may be in equilibrium. As such that the active species present at different times during the polymerization reactions may change. In some instances known methods of producing mono salts of polyfunctional compounds can be used to influence the stoichiometry of the polymerization system.

In certain embodiments, anions present to balance the charge of cationic co-catalysts, and the initiating ligand on the metal complex are selected to be the same compound. In certain embodiments, an initiating ligand, a counterion present on a cationic co-catalyst, and a chain transfer agent are chosen to be the same molecule. For instance, in one example of this embodiment if glycolic acid were employed as the chain transfer agent, the metal complex would be chosen to include glycolate as the initiating ligand L and a cationic co-catalyst including a glycolate counterion (such as tetrabutylammonium glycolate) could be employed as the co-catalyst. Such embodiments of the present invention provide polycarbonate polyol compositions that are highly homogenous since virtually all chains have the same chemical makeup. The details of these compositions and methods to produce them are described in more detail hereinbelow.

Ic. Stoichiometry of the Polymerization Systems

Having described in detail each of the components of the polymerization system, we turn now to the relative ratios of those components. In certain embodiments, a metal complex L$_p$-M-(L$_I$)$_m$ and a chain transfer agent Y-A-(Y)$_n$ are present in a defined ratio selected to maximize conversion of the epoxide monomers while achieving the desired molecular weight polycarbonate polyol. In embodiments, where a co-catalyst is present, the ratios between a metal complex, a co-catalyst and a chain transfer agent are selected to maximize conversion of the epoxide monomers while achieving the desired molecular weight polycarbonate polyol.

In some embodiments, a metal complex and a chain transfer agent are present in a molar ratio ranging from about 1:10 to about 1:1000. In certain embodiments, the ratio is between about 1:50 and about 1:500. In certain embodiments, the ratio is between about 1:50 and about 1:250. In certain embodiments, the ratio is between about 1:20 and about 1:100. In certain embodiments, the ratio is between about 1:100 and about 1:250. In some embodiments, a metal complex and a chain transfer agent are present in a molar ratio greater than 1:1000. In some embodiments, a metal complex and a chain transfer agent are present in a molar ratio less than 1:1000.

In some embodiments, a metal complex and a co-catalyst are present in a molar ratio ranging from about 0.1:1 to about 1:10. In certain embodiments, the ratio is from about 0.5:1 to about 5:1. In other embodiments, the ratio is from about 1:1 to about 4:1. In certain embodiments the ratio between the metal complex and the co-catalyst is about 1:1. In other embodiments, the molar ratio between a metal complex and a co-catalyst is about 1:2.

II. Polycarbonate Polyol Compositions

As described above, there have not been methods heretofore available to produce aliphatic polycarbonate polyol resins combining the features of high carbonate linkage content, a high percentage of hydroxyl end groups and low molecular weight (e.g. less than about 20 kg/mol). In one aspect, the present invention encompasses these novel materials.

In some embodiments, the present invention encompasses epoxide CO$_2$ copolymers with a molecular weight number between about 400 and about 20,000 characterized in that the polymer chains have a carbonate content of >90%, and at least 90% of the end groups are hydroxyl groups.

In certain embodiments, the carbonate linkage content of the polycarbonate chains of epoxide CO$_2$ copolymers of the present invention is at least 90%. In some embodiments greater than 92% of linkages are carbonate linkages. In certain embodiments, at least 95% of linkages are carbonate linkages. In certain embodiments, at least 97% of linkages are carbonate linkages. In some embodiments, greater than 98% of linkages are carbonate linkages in some embodiments at least 99% of linkages are carbonate linkages. In some embodiments essentially all of the linkages are carbonate linkages (i.e. there are essentially only carbonate linkages detectable by typical methods such as $^1$H or $^{13}$C NMR spectroscopy).

In certain embodiments, the ether linkage content of the polycarbonate chains of epoxide CO$_2$ copolymers of the present invention is less than 10%. In some embodiments, less than 8% of linkages are ether linkages. In certain embodiments, less than 5% of linkages are ether linkages. In certain embodiments, no more than 3% of linkages are ether linkages. In some embodiments, fewer than 2% of linkages are ether linkages in some embodiments less than 1% of linkages are ether linkages. In some embodiments essentially none of the linkages are ether linkages (i.e. there are essentially no ether bonds detectable by typical methods such as $^1$H or $^{13}$C NMR spectroscopy).

In some embodiments, the epoxide CO$_2$ copolymers of the present invention have average molecular weight numbers ranging from about 400 to about 400,000 g/mol. In some embodiments, the epoxide $CO_2$ copolymers of the present invention have average molecular weight numbers ranging from about 400 to about 20,000 g/mol. In some embodiments, the copolymers have an Mn between about 500 and about 5,000 g/mol. In other embodiments, the copolymers have an Mn between about 800 and about 4,000 g/mol. In some embodiments, the copolymers have an Mn between about 1,000 and about 3,000 g/mol. In some embodiments, the copolymers have an Mn of about 1,000 g/mol. In some embodiments, the copolymers have an Mn of about 2,000 g/mol. In some embodiments, the copolymers have an Mn of about 3,000 g/mol. In certain embodiments, epoxide $CO_2$ copolymers of the invention have about 10 to about 200 repeat units. In other embodiments, the copolymers have about 20 to about 100 repeat units.

ments, the PDI is less than about 1.4. In certain embodiments, the PDI is less than about 1.2. In other embodiments, the PDI is less than about 1.1. In certain embodiments, the polycarbonate polyol compositions are further characterized in that they have a unimoldal molecular weight distribution.

In certain embodiments, the polycarbonate polyols of the present invention contain repeat units derived from epoxides that are not C2 symmetric. In these cases, the epoxide can be incorporated into the growing polymer chain in one of several orientations. The regiochemistry of the enchainment of adjacent monomers in such cases is characterized by the head-to-tail ratio of the composition. As used herein the term "head-to-tail" refers to the regiochemistry of the enchainment of a substituted epoxide in the polymer chain as shown in the FIGURE below for propylene oxide:

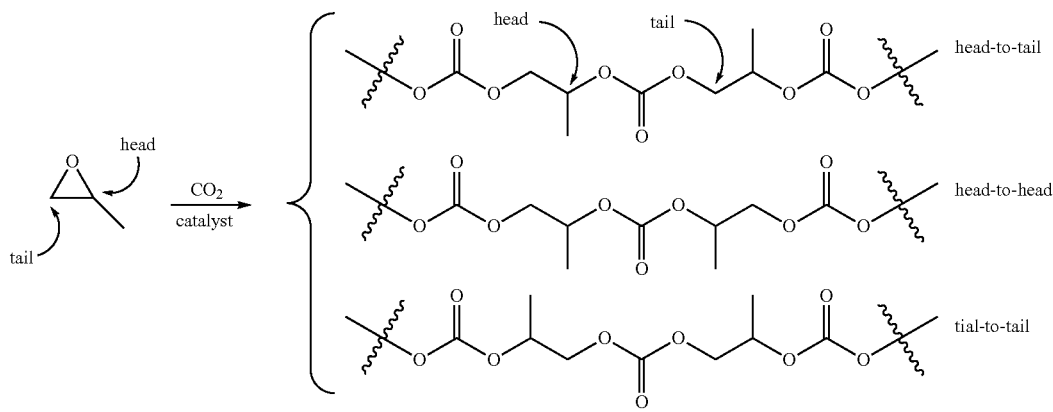

In some embodiments, the $CO_2$ epoxide copolymers of the present invention are formed from $CO_2$ and one type of epoxide. In other embodiments, the copolymers incorporate two or more types of epoxide. In some embodiments, the copolymers predominantly incorporate one epoxide with lesser amounts of one or more additional epoxides. In certain embodiments where two or more epoxides are present, the copolymer is random with respect to the position of the epoxide moieties within the chain. In other embodiments where two or more epoxides are present, the copolymer is a tapered copolymer with respect to the incorporation of different epoxides. In some embodiments where two or more epoxides are present, the copolymer is a block copolymer with respect to the incorporation of different epoxides.

In certain embodiments, the polymer chains may contain embedded polymerization initiators or may be a block-copolymer with a non-polycarbonate segment. In certain examples of these embodiments, the stated total carbonate content of the polymer chain may be lower than the stated carbonate content limitations described above. In these cases, the carbonate content refers only to the epoxide $CO_2$ copolymeric portions of the polymer composition. In other words, a polymer of the present invention may contain a polyester, polyether or polyether-polycarbonate moiety embedded within or appended to it. The non-carbonate linkages in such moieties are not included in the carbonate and ether linkage limitations described above.

In certain embodiments, polycarbonate polyols of the present invention are further characterized in that they have narrow polydispersity. In certain embodiments, the PDI of the provided polymer compositions is less than 2. In some embodiments, the PDI is less than 1.5. In other embodi- In certain embodiments the disclosure encompasses polycarbonate polyol compositions characterized in that, on average, more than about 80% of linkages between adjacent epoxide monomer units are head-to-tail linkages. In certain embodiments, on average, more than 85% of linkages between adjacent epoxide monomer units are head-to-tail linkages. In certain embodiments, on average, more than 90% of linkages between adjacent epoxide monomer units are head-to-tail linkages. In certain embodiments, more than 95% of linkages between adjacent epoxide monomer units are head-to-tail linkages. In certain embodiments, more than 99% of linkages between adjacent epoxide monomer units are head-to-tail linkages.

In certain embodiments, the polycarbonate polyols of the present invention contain repeat units derived from epoxides that contain a chiral center. In these cases, the epoxide can be incorporated into the growing polymer chain in defined orientations relative to adjacent monomer units. In certain embodiments, the adjacent stereocenters are arranged randomly within the polymer chains. In certain embodiments, the polycarbonate polyols of the present invention are atactic. In other embodiments, more than about 60% of adjacent monomer units have the same stereochemistry. In certain embodiments, more than about 75% of adjacent monomer units have the same stercochemistry. In certain embodiments, more than about 85% of adjacent monomer units have the same stereochemistry. In certain embodiments, more than about 95% of adjacent monomer units have the same stereochemistry. In certain embodiments the polycarbonate polyols of the present invention are isotactic. In other embodiments, more than about 60% of adjacent monomer units have the opposite stereochemistry. In certain embodiments, more than about 75% of adjacent monomer units have the opposite stereochemistry. In certain embodiments, more than about 85% of adjacent monomer units have the opposite stereochemistry. In certain embodiments, more than about 95% of adjacent monomer units have the opposite stereochemistry. In certain embodiments the polycarbonate polyols of the present invention are syndiotactic.

In certain embodiments, where a chiral epoxide is incorporated into the polycarbonate polyol compositions of the present invention, the polymers are enantio-enriched. In other embodiments, where a chiral epoxide is incorporated into the polycarbonate polyol compositions of the present invention, the polymers are not enantio-enriched.

In certain embodiments, the epoxide monomers incorporated into polycarbonate polyols of the present invention have a structure:

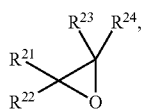

where, $R^{21}$, $R^{22}$, $R^{23}$, and $R^{24}$, are each independently selected from the group consisting of: —H; and an optionally substituted group selected from $C_{1-30}$ aliphatic; $C_{6-14}$ aryl; 3- to 12-membered heterocycle, and 5- to 12-membered heteroaryl, where any two or more of $R^{21}$, $R^{22}$, $R^{23}$, and $R^{24}$ can be taken together with intervening atoms to form one or more optionally substituted 3- to 12-membered rings, optionally containing one or more heteroatoms.

In certain embodiments, the polycarbonate polyols of the present invention incorporate one or more epoxides selected from the group consisting of:

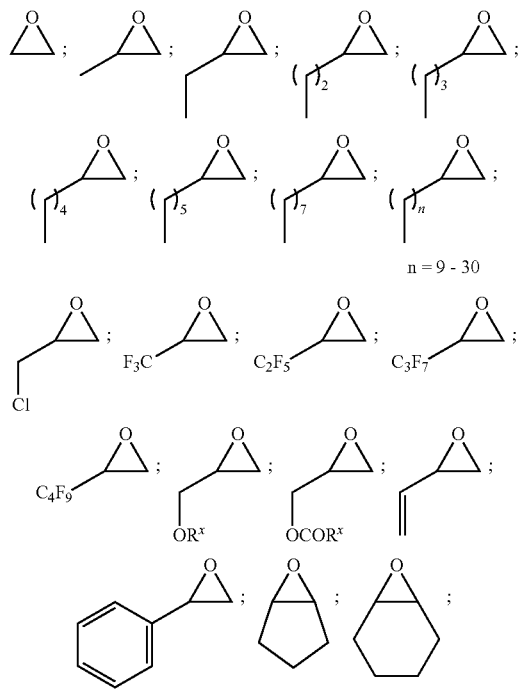

n = 9 - 30

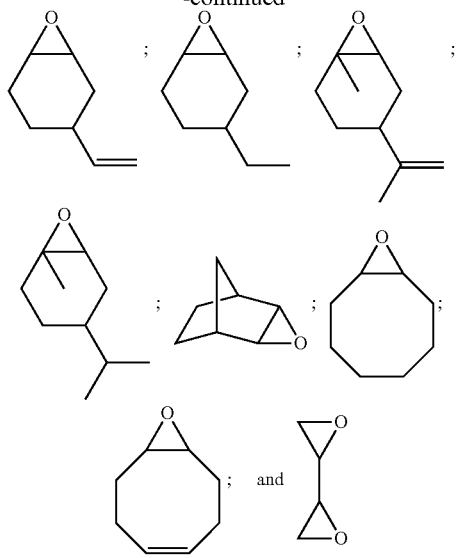

wherein each $R^x$ is, independently, selected from optionally substituted aliphatic, optionally substituted heteroaliphatic, optionally substituted aryl fluoroalkyl, and optionally substituted heteroaryl.

In certain embodiments, polycarbonate polyols of the present invention comprise poly(ethylene carbonate). In other embodiments, polycarbonate polyols of the present invention comprise poly(propylene carbonate). In other embodiments, polycarbonate polyols of the present invention comprise poly(cyclohexene carbonate). In other embodiments, polycarbonate polyols of the present invention comprise poly(epichlorohydrin carbonate). In certain embodiments, polycarbonate polyols of the present invention incorporate a glycidyl ether or glycidyl ester. In certain embodiments, polycarbonate polyols of the present invention incorporate phenyl glycidyl ether. In certain embodiments, polycarbonate polyols of the present invention incorporate t-butyl glycidyl ether.

In some embodiments, polycarbonate polyols of the present invention comprise poly(propylene-co-ethylene carbonate). In certain embodiments, polycarbonate polyols of the present invention comprise poly(propylene carbonate) incorporating from about 0.1 to about 10% of a $C_4$-$C_{30}$ epoxide. In certain embodiments, polycarbonate polyols of the present invention comprise poly(propylene carbonate) incorporating from about 0.1 to about 10% of a glycidyl ether. In certain embodiments, polycarbonate polyols of the present invention comprise poly(propylene carbonate) incorporating from about 0.1 to about 10% of a glycidyl ester. In certain embodiments, polycarbonate polyols of the present invention comprise poly(ethylene carbonate) incorporating from about 0.1 to about 10% of a glycidyl ether. In certain embodiments, polycarbonate polyols of the present invention comprise poly(ethylene carbonate) incorporating from about 0.1 to about 10% of a glycidyl ester. In certain embodiments, polycarbonate polyols of the present invention comprise poly(ethylene carbonate) incorporating from about 0.1 to about 10% of a $C_4$-$C_{30}$ epoxide.

In certain embodiments, epoxide monomers incorporated into polycarbonate polyols of the present invention include epoxides derived from naturally occurring materials such as epoxidized resins or oils. Examples of such epoxides include, but are not limited to: Epoxidized Soybean Oil;

Epoxidized Linseed Oil; Epoxidized Octyl Soyate; Epoxidized PGDO; Methyl Epoxy Soyate; Butyl Epoxy Soyate; Epoxidized Octyl Soyate; Methyl Epoxy Linseedate; Butyl Epoxy Linseedate; and Octyl Epoxy Linseedate. These and similar materials are available commercially from Arkema Inc. under the trade name Vikoflex®. Examples of such commerically available Vikoflex® materials include Vikoflex 7170 Epoxidized Soybean Oil, Vikoflex 7190 Epoxidized Linseed, Vikoflex 4050 Epoxidized Octyl Soyate, Vikoflex 5075 Epoxidized PGDO, Vikoflex 7010 Methyl Epoxy Soyate, Vikoflex 7040 Butyl Epoxy Soyate, Vikoflex 7080 Epoxidized Octyl Soyate, Vikoflex 9010 Methyl Epoxy Linseedate, Vikoflex 9040 Butyl Epoxy Linseedate, and Vikoflex 9080 Octyl Epoxy Linseedate. In certain embodiments, the polycarbonate polyols of the present invention incorporate epoxidized fatty acids:

In certain embodiments of the present invention, polycarbonate polyols of the present invention incorporate epoxides derived from alpha olefins. Examples of such epoxides include, but are not limited to those derived from $C_{10}$ alpha olefin, $C_{12}$ alpha olefin, $C_{14}$ alpha olefin, $C_{16}$ alpha olefin, $C_{18}$ alpha olefin, $C_{20}$-$C_{24}$ alpha olefin, $C_{24}$-$C_{28}$ alpha olefin and $C_{30+}$ alpha olefins. These and similar materials are commercially available from Arkema Inc. under the trade name Vikolox®. Commerically available Vikolox® materials include those depicted in Table 4, below. In certain embodiments, provided aliphatic polycarbonates derived from alpha olefins are heteropolymers incorporating other simpler epoxide monomers including, but not limited to: ethylene oxide, propylene oxide, butylene oxide, hexene oxide, cyclopentene oxide and cyclohexene oxide. These heteropolymers can include random co-polymers, tapered copolymers and block copolymers.

TABLE 4

| Trade Name | Formula | Minimum Oxirane |
|---|---|---|
| Vikolox 10 | $C_{10}H_{20}O$ | 9.0% |
| Vikolox 12 | $C_{12}H_{24}O$ | 7.8% |
| Vikolox 14 | $C_{14}H_{28}O$ | 6.8% |
| Vikolox 16 | $C_{16}H_{32}O$ | 6.0% |
| Vikolox 18 | $C_{18}H_{36}O$ | 5.4% |
| Vikolox 20-24 | $C_{20-24}H_{40-48}O$ | 4.4% |
| Vikolox 24-28 | $C_{24-28}H_{48-56}O$ | 3.25% |
| Vikolox 30+ | $C_{30+}H_{60}O$ | 2.25% |

In certain embodiments, the present disclosure encompasses aliphatic polycarbonate compositions comprising a plurality of polymer chain types. In certain embodiments these different chain types are derived from more than one type of initiating moiety. These compositions are described in more detail below. In each case, the polycarbonate chains contain one or more polymeric units arising from the alternating copolymerization of $CO_2$ and one or more epoxides. In the descriptions that follow of the several chain types that may be present in the compositions of the present invention, these alternating copolymeric units are denoted -T, where each -T is a polycarbonate chain having a formula independently selected from the group consisting of:

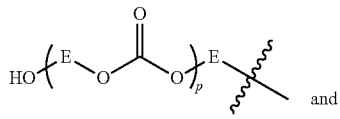 and

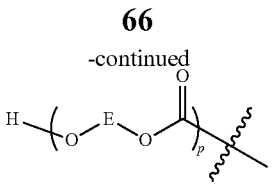

wherein:
E is an optionally substituted $C_2$ unit derived from an epoxide, where E may represent a monomer unit derived from one type of epoxide, or from a mixture of two or more types of epoxide, and
p ranges from about 5 to about 10,000.

In some embodiments of polymers encompassed by the present invention, -E- is:

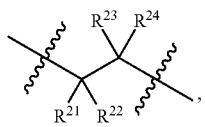

where $R^{21}$, $R^{22}$, $R^{23}$, and $R^{24}$ are as defined above.

In certain embodiments, -E- is selected from the group consisting of:

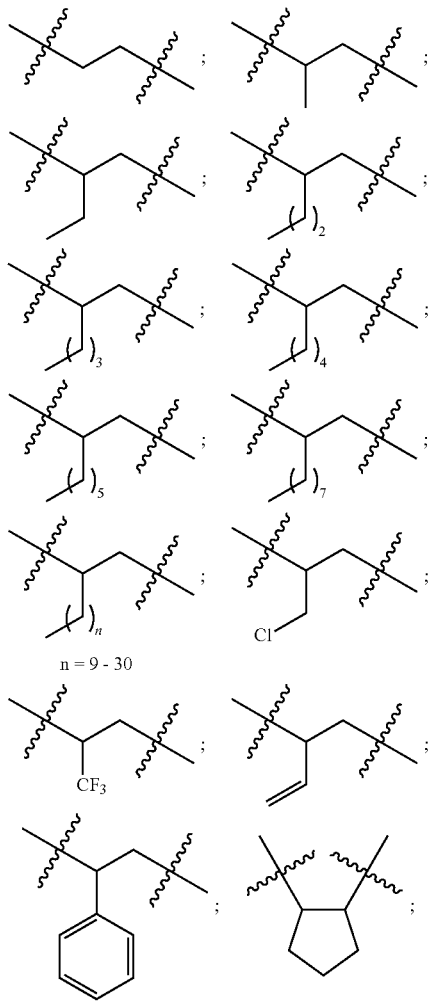

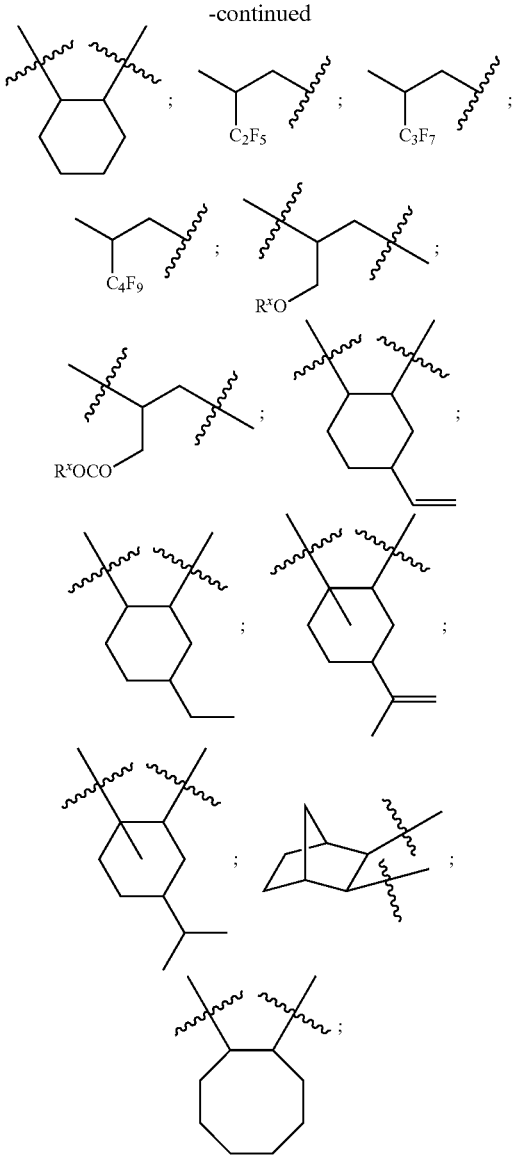

and mixtures of any two or more of these.

In certain embodiments, -E- includes units derived from naturally occurring materials such as epoxidized resins or oils. In certain embodiments, -E- includes units derived $C_{12-30}$ alpha olefins.

In some embodiments, -E- consists predominantly of —CH$_2$CH$_2$— units derived from ethylene oxide. In certain embodiments, -E- includes units derived from ethylene oxide in combination with amounts of more complex -E- groups derived from other epoxides.

In other embodiments, -E- consists predominantly of —CH$_2$CH(CH$_3$)— groups derived from propylene oxide. In certain embodiments, -E- includes units derived from propylene oxide in combination -E- groups derived ethylene oxide. In certain embodiments, -E- includes units derived from propylene oxide in combination with lesser amounts of more complex -E- groups derived from other epoxides.

In certain embodiments, the polycarbonate polyol compositions described above include mixtures of several chain types. In general, these chain types may be divided into two categories: namely, a first category including chains denoted $P^1$ having two or more —OH end groups and a second category of chains denoted $P^2$ having only one —OH end group per chain. As described above, in some embodiments compositions of the present invention have at least 90% of the polymer chain ends terminating with —OH groups. As such, chains of the first category generally make up a predominance of the chains present in the compositions.

Polymer chains in a given composition may arise from each of several different chain-initiating moieties present in a reaction mixture. In certain cases each of these chain types will have a distinct structure that differentiates it from other chain types present in the mixture that derive from other chain initiating moieties. The structures of each of several chain types are described below, and the ratios in which these components may be present are then described.

The aliphatic polycarbonate compositions of the present invention include polymer chains derived from the chain transfer agents described hereinabove. In certain embodiments, these polymer chains are denoted $P^1$. In some embodiments, where the chain transfer agent has a formula Y-A-(Y)$_n$, as described above, polymer chains of type $P^1$ have the formula T-Y-A-(Y-T)$_n$, wherein Y, A, and n are as defined above in the description of the chain transfer agents, and each -T is an aliphatic polycarbonate chain covalently bound to a Y group, where -T is as defined above.

Chains of type $P^1$ may also derive from the polyfunctional initiating ligands L described hereinabove. In certain embodiments, where the initiating ligand has a formula Q'-A'-(Z')$_n$, as described above, such chains have the formula T-Q'-A'(Z'-T)$_n$, wherein Q', A', Z', and n are as defined above in the description of the initiating ligands, and each -T is an aliphatic polycarbonate chain covalently bound to a Q' or Z' group, where -T is as defined above.

Additionally, chains of type $P^1$ may arise from an anion present on a co-catalyst. In certain embodiments, where the anion has a formula Q'-A'-(Z')$_n$ as described above, such chains have the formula T-Q'-A'(Z'-T)$_n$, wherein Q', A', Z', and n are as defined above in the description of the co-catalyst anions, and each -T is an aliphatic polycarbonate chain covalently bound to a Q' or Z' group, where -T is as defined above.

An additional category of $P^1$ chains may arise from water present in the reaction mixtures. In some circumstances, under polymerization conditions the water will ring-open an epoxide leading to formation of a glycol corresponding to one or more epoxides present in the reaction mixture. In certain embodiments, this glycol (or mixture of glycols if more than one type of epoxide is present) will lead to formation of chains of type $P^{1a}$ having the structure:

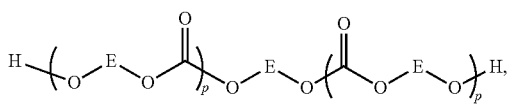

wherein -E- is an optionally substituted $C_2$ unit derived from an epoxide, where E may represent a monomer unit derived from a single type of epoxide or from a mixture of two or more types of epoxide, and p ranges from about 5 to about 10,000.

In some embodiments, each of these sources of chains $P^1$ may have a different structure and the compositions may include several types of $P^1$ chain (e.g. type $P^1$ derived from the chain transfer agent, type $P^{1'}$ derived from polyfunctional initiating ligands, and type $P^{1''}$ derived from polyfunctional anions present on a co-catalyst). In certain embodiments, the chain transfer agent, initiating ligand, and co-catalyst anions may have the same structure (or be ionic forms of the same structure). In these instances, the polymer compositions may comprise only one type of $P^1$ chain, or if water is present a mixture of a single type of $P^1$ chain along with some amount of $P^{1a}$. In certain embodiments, a glycol corresponding to an epoxide present in the reaction mixture may be used as a chain transfer agent in which case, polymer chains $P^1$ arising from the chain transfer agent and $P^{1a}$ arising from water will be indistinguishable. In certain other embodiments, water may be rigorously excluded from the polymerization mixture in which case chains of type $P^{1a}$ will be substantially absent.

Additionally, in certain embodiments polymer compositions of the present invention include polymer chains of type $P^2$. These chains have only one OH end group. Chains of type $P^2$ may arise from monofunctional initiating ligands present on the metal complexes or from monofunctional anions present on ionic co-catalysts. In certain cases, such chains may also arise from spurious sources such as alcohols or halide ions present as impurities in the reaction mixtures. In certain embodiments, chains of type $P^2$ have a formula selected from the group consisting of:

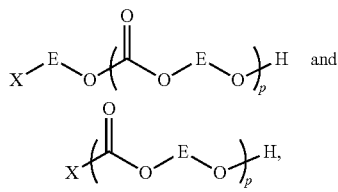

wherein:
X is a bound form of an anion capable of initiating one polymer chain;
E is an optionally substituted $C_2$ unit derived from an epoxide, where E may represent a monomer unit derived from one type of epoxide, or from a mixture of two or more types of epoxide, and
p ranges from about 5 to about 10,000.

In certain embodiments of polymer chains of type $P^2$, X comprises a halogen atom, an azide, an ester group, an ether group, or a sulfonic ester group.

In some embodiments, polymer compositions of the present invention are characterized in that at least 90% of the chains ends are —OH. In certain embodiments, at least 90% of the chains in a polymer composition are of type $P^1$. In certain embodiments, the chains of type $P^1$ are essentially all the same. In other embodiments, there are two or more distinct types of $P^1$ chain present. In certain embodiments, there are several types of $P^1$ chains present, but at least 80% of the $P^1$ chains have one structure with lesser amounts of one or more $P^1$ chain types making up the remaining 20%.

In certain embodiments, polymer compositions of the present invention include more than 95% chains of type $P^1$. In other embodiments, polymer compositions of the present invention include more than 97% chains of type $P^1$. In certain embodiments, polymer compositions of the present invention include more than 99% chains of type $P^1$.

It should be noted that in certain embodiments, polymer compositions of the present invention are characterized in that at least 90% of the chains ends are —OH groups may include mixtures having less than 90% chains of type $P^1$, as for example when a chain transfer agent capable of initiating three or more polymer chains is used. For example, where a triol is used as the chain transfer agent, if 80% of the chains result from initiation by the triol (3-OH end groups per chain) and the remaining 20% of chains have only one —OH end group, the composition as a whole will still contain greater than 90% OH end groups (92.3%).

In certain embodiments, polymer compositions of the present invention include chains of type $P^1$ derived from diol chain transfer agents. In certain embodiments, these chains have the formula:

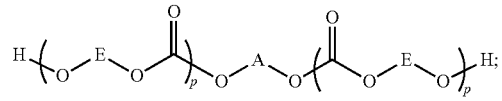

where E and p are as defined above and -A- is an optionally substituted radical selected from the group consisting of: $C_{2-30}$ aliphatic, $C_{2-30}$ heteroaliphatic, 6- to 12-membered aryl, 3- to 12-membered heterocyclic, 5- to 12-membered heteroaryl.

In other embodiments, -A- is a polymer selected from the group consisting of polyolefins, polyesters, polyethers, polycarbonates, polyoxymethylene and mixtures of two or more of these.

In certain embodiments, polymer compositions of the present invention include chains of type $P^1$ derived from hydroxy acid chain transfer agents. In certain embodiments, these chains have the formula:

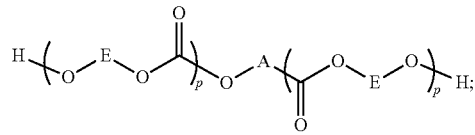

where E and p are as defined above and -A- is an optionally substituted radical selected from the group consisting of: $C_{2-30}$ aliphatic, $C_{2-30}$ heteroaliphatic, 6- to 12-membered aryl, 3- to 12-membered heterocyclic, 5- to 12-membered heteroaryl.

In certain embodiments, polymer compositions of the present invention include chains of type $P^1$ derived from diacid chain transfer agents. In certain embodiments, these chains have the formula:

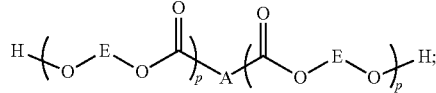

where E and p are as defined above and -A- is a covalent bond or an optionally substituted radical selected from the group consisting of: $C_{2-30}$ aliphatic, $C_{2-30}$ heteroaliphatic, 6- to 12-membered aryl, 3- to 12-membered heterocyclic, 5- to 12-membered heteroaryl.

In certain embodiments, polymer compositions of the present invention include chains of type $P^1$ derived from trifunctional chain transfer agents. In certain embodiments, these chains have the formula:

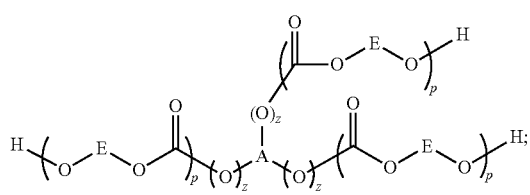

where E and p are as defined above each z is independently 0 or 1, and -A- is an optionally substituted radical selected from the group consisting of: $C_{3-30}$ aliphatic, $C_{2-30}$ heteroaliphatic, 6- to 12-membered aryl, 3- to 12-membered heterocyclic, 5- to 12-membered heteroaryl.

In another aspect, the present invention encompasses materials made by cross-linking any of the above polycarbonate polyol polymers. In certain embodiments, such cross-linked materials comprise polyurethanes. In certain embodiments such polyurethanes encompass thermoplastics, foams, coatings and adhesives.

III. Methods of Making Polycarbonate Polyols

In a third aspect, the present invention encompasses methods for producing polycarbonate polyols.

In some embodiments, the methods include the steps of: a) providing a reaction mixture including one or more epoxides and one or more chain transfer agents having a plurality of sites capable of supporting the chain growth of $CO_2$ epoxide copolymers; b) contacting the reaction mixture with a metal complex, the metal complex including a metal coordination compound having a permanent ligand set and at least one ligand that is a polymerization initiator in the presence of carbon dioxide; c) allowing the polymerization reaction to proceed until a desired molecular weight of polymer has been formed; and d) terminating the polymerization.

III.a. Epoxides

In some embodiments, the epoxide monomers provided at step (a) include any of the epoxides described hereinabove with regard to the polymer compositions of matter.

In some embodiments, the epoxide monomers provided at step (a) of the above-described method have a structure:

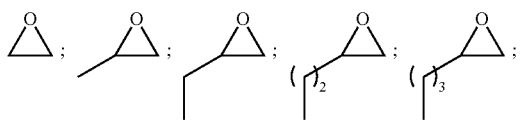

where, $R^{21}$, $R^{22}$, $R^{23}$, and $R^{24}$, are each independently selected from the group consisting of: —H; and an optionally substituted group selected from $C_{1-30}$ aliphatic; $C_{6-14}$ aryl; 3- to 12-membered heterocycle, and 5- to 12-membered heteroaryl, where any two or more of $R^{21}$, $R^{22}$, $R^{23}$, and $R^{24}$ can be taken together with intervening atoms to form one or more optionally substituted 3- to 12-membered rings, optionally containing one or more heteroatoms.

In certain embodiments, reaction mixtures include one or more epoxides selected from the group consisting of:

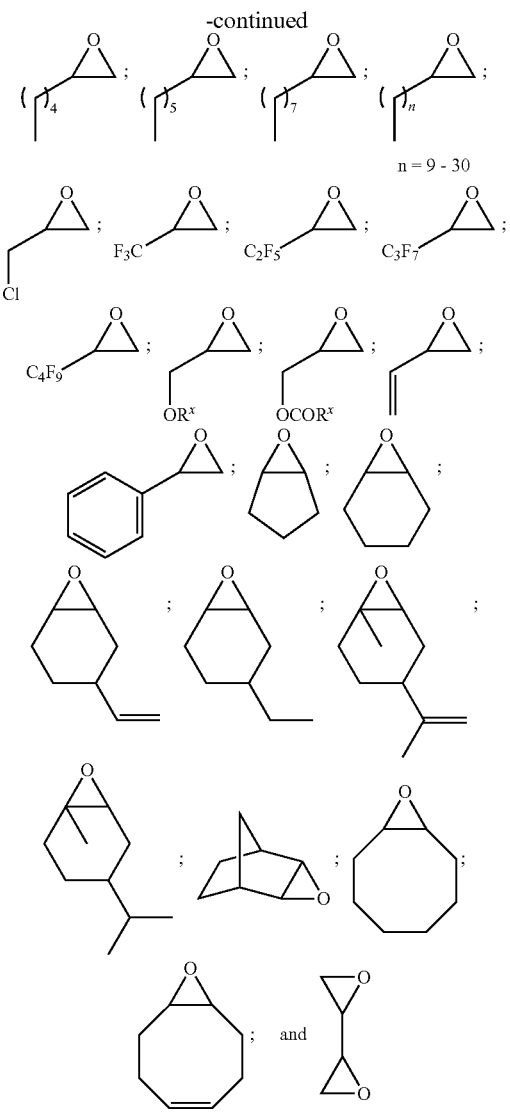

wherein each $R^x$ is, independently, selected from optionally substituted aliphatic, optionally substituted heteroaliphatic, optionally substituted aryl and optionally substituted heteroaryl.

In certain embodiments, reaction mixtures include ethylene oxide. In other embodiments, reaction mixtures include propylene oxide. In other embodiments, reaction mixtures include cyclohexene oxide. In other embodiments, reaction mixtures include epichlorohydrin. In certain embodiments, reaction mixtures include a glycidyl ether or glycidyl ester. In certain embodiments, reaction mixtures include phenyl glycidyl ether. In certain embodiments, reaction mixtures include t-butyl glycidyl ether.

In certain embodiments, reaction mixtures include ethylene oxide and propylene oxide. In certain embodiments, reaction mixtures include propylene oxide along with from about 0.1 to about 10% of a $C_4$-$C_{30}$ epoxide. In certain embodiments, reaction mixtures include propylene oxide along with from about 0.1 to about 10% of a glycidyl ether. In certain embodiments, reaction mixtures include propylene oxide along with from about 0.1 to about 10% of a glycidyl ester. In certain embodiments, reaction mixtures include ethylene oxide along with from about 0.1 to about 10% of a glycidyl ether. In certain embodiments, reaction mixtures include ethylene oxide along with from about 0.1 to about 10% of a glycidyl ester. In certain embodiments, reaction mixtures include ethylene oxide along with from about 0.1 to about 10% of a $C_4$-$C_{30}$ epoxide.

In certain embodiments, reaction mixtures include epoxides derived from naturally occurring materials such as epoxidized resins or oils. Examples of such epoxides include, but are not limited to: Epoxidized Soybean Oil; Epoxidized Linseed Oil; Epoxidized Octyl Soyate; Epoxidized PGDO; Methyl Epoxy Soyate; Butyl Epoxy Soyate; Epoxidized Octyl Soyate; Methyl Epoxy Linseedate; Butyl Epoxy Linseedate; and Octyl Epoxy Linseedate. These and similar materials are available commercially from Arkema Inc. under the trade name Vikoflex®. Examples of such commerically available Vikoflex® materials include Vikoflex 7170 Epoxidized Soybean Oil, Vikoflex 7190 Epoxidized Linseed, Vikoflex 4050 Epoxidized Octyl Soyate, Vikoflex 5075 Epoxidized PGDO, Vikoflex 7010 Methyl Epoxy Soyate, Vikoflex 7040 Butyl Epoxy Soyate, Vikoflex 7080 Epoxidized Octyl Soyate, Vikoflex 9010 Methyl Epoxy Linseedate, Vikoflex 9040 Butyl Epoxy Linseedate, and Vikoflex 9080 Octyl Epoxy Linseedate. In certain embodiments, the polycarbonate polyols of the present invention incorporate epoxidized fatty acids.

In certain embodiments of the present invention, reaction mixtures include epoxides derived from alpha olefins. Examples of such epoxides include, but are not limited to those derived from $C_{10}$ alpha olefin, $C_{12}$ alpha olefin, $C_{14}$ alpha olefin, $C_{16}$ alpha olefin, $C_{18}$ alpha olefin, $C_{20}$-$C_{24}$ alpha olefin, $C_{24}$-$C_{28}$ alpha olefin and $C_{30+}$ alpha olefins.

These and similar materials are commercially available from Arkema Inc. under the trade name Vikolox®. Commerically available Vikolox® materials include those depicted in Table 4, below. In certain embodiments, reaction mixtures including alpha olefins also include other simpler epoxide monomers including, but not limited to: ethylene oxide, propylene oxide, butylene oxide, hexene oxide, cyclopentene oxide and cyclohexene oxide.

III. b. Chain Transfer Agents

In certain embodiments, a chain transfer agent provided in step (a) of the above method is any of the chain transfer agents described hereinabove or mixtures of two or more of these.

In some embodiments, the chain transfer agents provided in step (a) of the above methods include one or more polyhydric alcohols. In certain embodiments, a polyhydric alcohol is a diol. In certain embodiments, diols include but are not limited to: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and 1,4-cyclohexanediethanol.

Other examples include the polyalkylene glycols such as: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly (propylene glycol) such as those having number average molecular weights of from 234 to about 2000 g/mol.

In certain embodiments, diol chain transfer agents include hydroxyl-terminated polyolefins. Such materials include polymers sold by Sartomer Inc. under the trade name Krasol®. In other embodiments, diol chain transfer agents can include hydroxyl-terminated polyisobutylenes (PIB-diols and -triols) such as Polytail® H or Polytail® HA from Mitsubish Chemical Co. Other examples include hydroxyl-terminated polybutadienelstyrene(HTBS).

Yet other examples of suitable diols that may be provided in step (a) include 4,4'-(1-methylethylidene) bis[cyclohexanol], 2,2'-methylenebis[phenol], 4,4'-methylenebis[phenol], 4,4'-(phenylmethylene)bis[phenol], 4,4'-(diphenylmethylene)bis[phenol], 4,4'-(1,2-ethanediyl)bis[phenol], 4,4'-(1,2-cyclohexanediyl)bis[phenol], 4,4'-(1,3-cyclohexanediyl)bis[phenol], 4,4'-(1,4-cyclohexanediyl)bis[phenol], 4,4'-ethylidenebis[phenol], 4,4'-(1-phenylethylidene)bis[phenol], 4,4'-propylidenebis[phenol], 4,4'-cyclohexylidenebis[phenol], 4,4'-(1-methylethylidene)bis[phenol], 4,4'-(1-methylpropylidene)bis[phenol], 4,4'-(1-ethylpropylidene)bis[phenol], 4,4'-cyclohexylidenebis[phenol], 4,4'-(2,4,8,10-tetraoxaspiro[5.5]undecane-3,9-diyldi-2, 1-ethanediyl)bis[phenol], 1,2-benzenedimethanol, 1,3-benzenedimethanol, 1,4-benzenedimethanol, 4,4'-[1,3-phenylenebis(1-methylethylidene)]bis[phenol], 4,4'-[1,4-phenylenebis(1-methylethylidene)]bis[phenol], phenolphthalein, 4,4'-(1-methylidene)bis[2-methylphenol], 4,4'-(1-methylethylidene)bis[2-(l-methylethyl)phenol], 2,2'-methylenebis[4-methyl-6-(1-methyl ethyl)phenol], In certain embodiments, a chain transfer agent provided at step (a) is a polyhydric phenol derivative. In certain embodiments, a polymerization initiator is selected from the group consisting of:

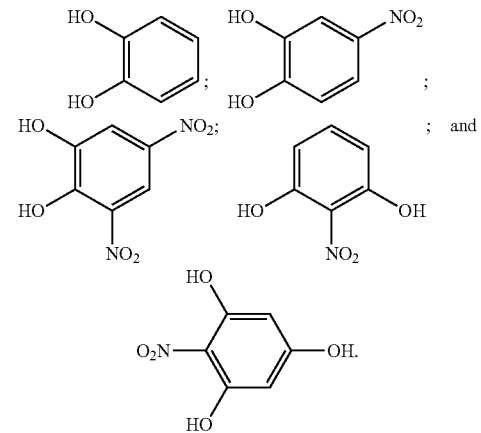

In some embodiments, a polyhydric alcohol provided as a chain transfer agent in step (a) of the above method is a triol, a tetraol or a higher polyol. Suitable triols may include, but are not limited to: aliphatic triols having a molecular weight less than 500 such as trimethylolcthanc; trimethylolpropanc; glyccrol; 1,2,4-butanctriol; 1,2,6-hexanetriol; tris (2-hydroxyethyl)isocyanurate; hexahydro-1,3,5-tris(hydroxyethyl)-s-triazine; 6-methylheptane-1,3,5-triol; polypropylene oxide triol; and polyester triols.

In certain other embodiments, a polyol is a tetraol. Examples of suitable tetraols include, but are not limited to: erythritol, pentaerythritol; 2,2'-dihydroxymethyl-1, 3-propanediol; and 2,2'-(oxydimethylene) bis-(2-ethyl-1,3-propanediol).

In still other embodiments, a polyol is a carbohydrate. Examples of suitable carbohydrates include sugar alcohols, monosaccharides, disaccharides, oligosaccharides and polysaccharides and higher oligomers such as starch and starch derivatives.

In some embodiments, one —OH group of a diol is phenolic and the other is aliphatic. In other embodiments each hydroxy group is phenolic. In certain embodiments, the chain transfer agent is an optionally substituted catechol, resorcinol or hydroquinone derivative.

In some embodiments where a Y-group is —OH, the —OH group is an enol tautomer of a carbonyl group. In some embodiments where a Y group is —OH, the —OH group is a carbonyl hydrate or a hemiacetal.

In certain embodiments, a chain transfer agent provided at step (a) includes a hydroxy acid. In certain embodiments, a chain transfer agent includes a diacid. In certain embodiments, a chain transfer agent includes a compound selected from the group consisting of:

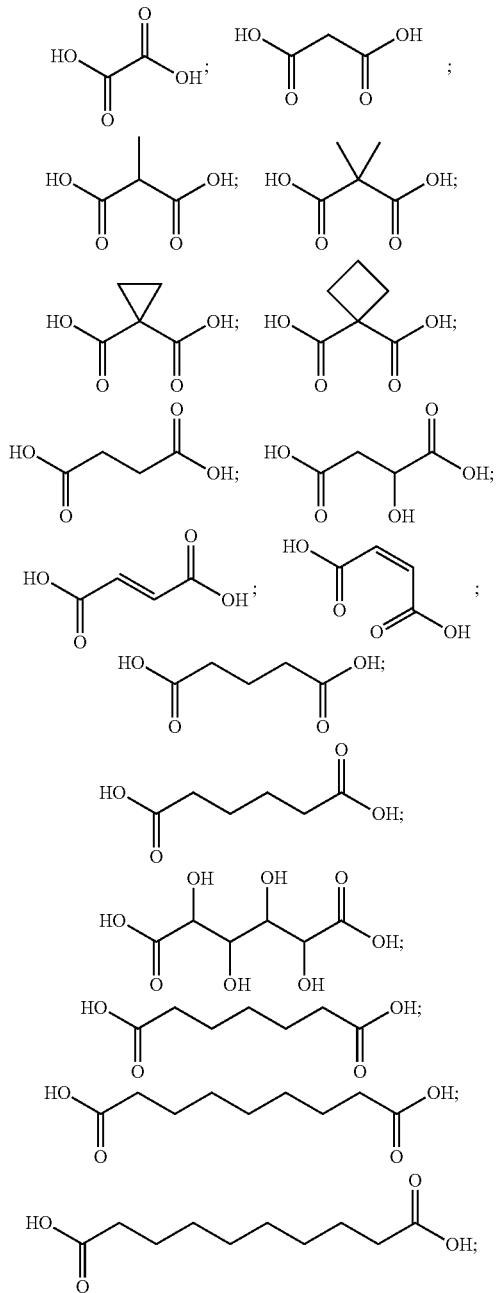

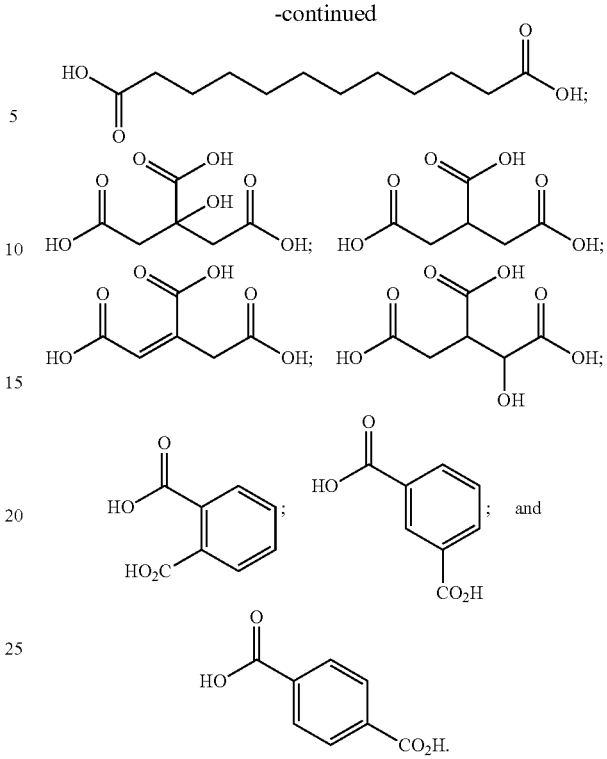

In certain embodiments, diacid chain transfer agents include carboxy terminated polyolefin polymers. In certain embodiments, carboxy terminated polyolefins include materials such as NISSO-PB C-series resins produced by Nippon Soda Co. Ltd.

In certain embodiments, a provided chain transfer agent is a hydroxy acid. In certain embodiments, a hydroxy acid is selected from the group consisting of:

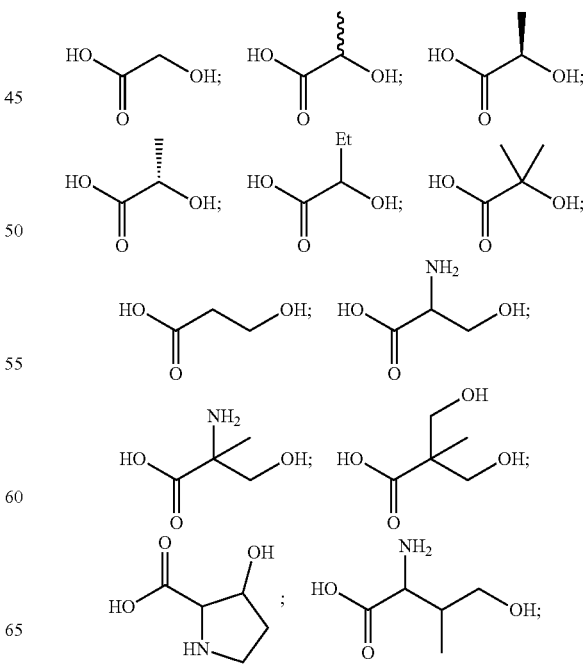

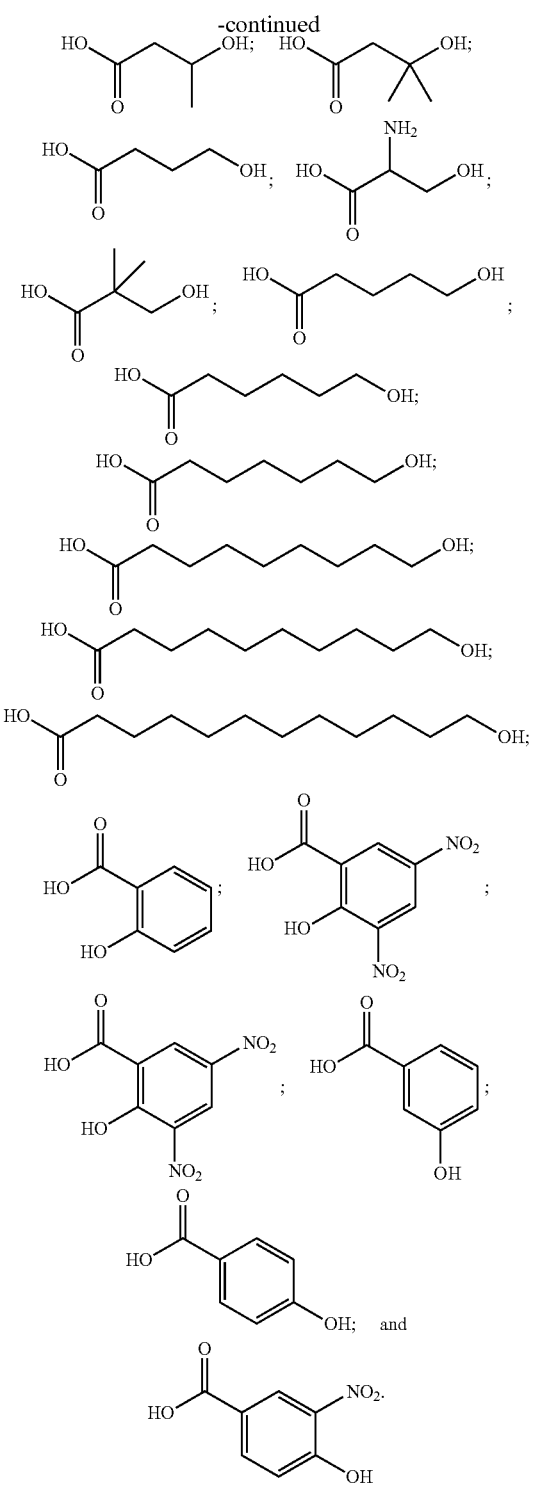

In certain embodiments where the provided chain transfer agent includes an acidic functional group, the compound is provided as a salt. In certain embodiments a carboxylic chain transfer agent is provided as an ammonium salt.

III. c. Polymerization Catalysts

In some embodiments, a provided metal complex is a polymerization catalyst. In certain embodiments, a polymerization catalyst with which the reaction mixture is contacted in step (b) of the above-described method include any one or more of the catalysts previously described herein.

In certain embodiments, the metal complexes of step (b) have the formula $L_p\text{-M-}(L_I)_m$, where $L_p$ is a permanent ligand set, M is a metal atom, and $L_I$ is a ligand that is a polymerization initiator, and m is an integer between 0 and 2, inclusive representing the number of initiating ligands present.

In certain embodiments, the metal complexes used in step (b) of the method have a structure selected from the group consisting of: is selected from the group consisting of:

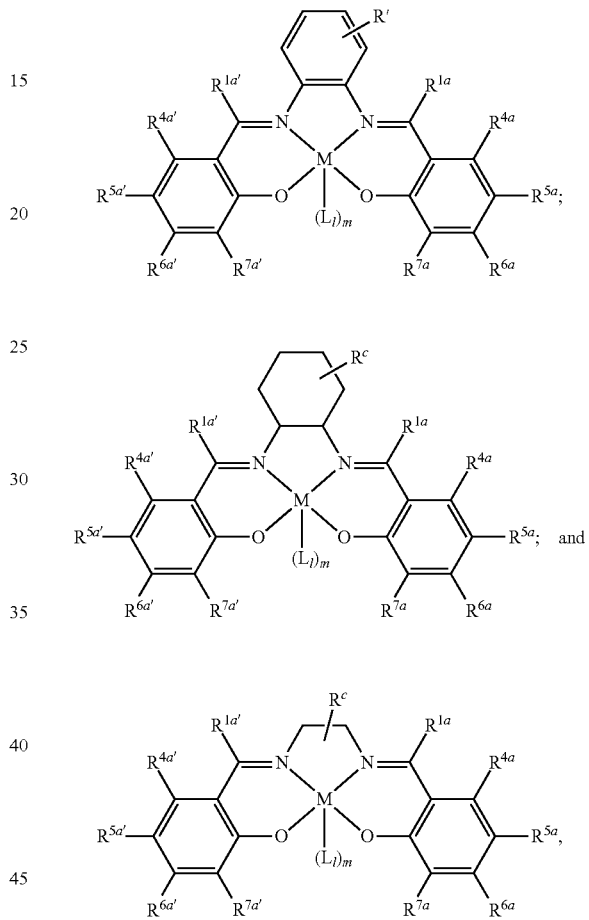

wherein:

M, $R^c$, R', $L_I$, m $R^{4a}$, $R^{4a'}$, $R^{5a}$, $R^{5a'}$, $R^{6a}$, $R^{6a'}$, $R^{7a}$, and $R^{7a'}$ are as defined above.

In certain embodiments of metal complexes used in step (b), have a structure selected from the group consisting of:

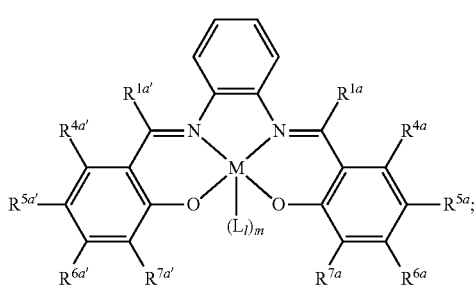

-continued

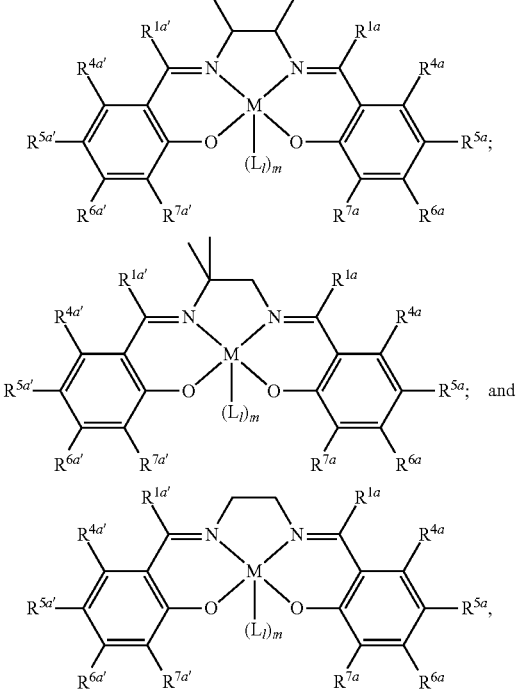

where $R^{1a}$ through $R^{7a'}$ are as defined above.

In certain embodiments of metal complexes used in step (b), have a structure selected from the group consisting of:

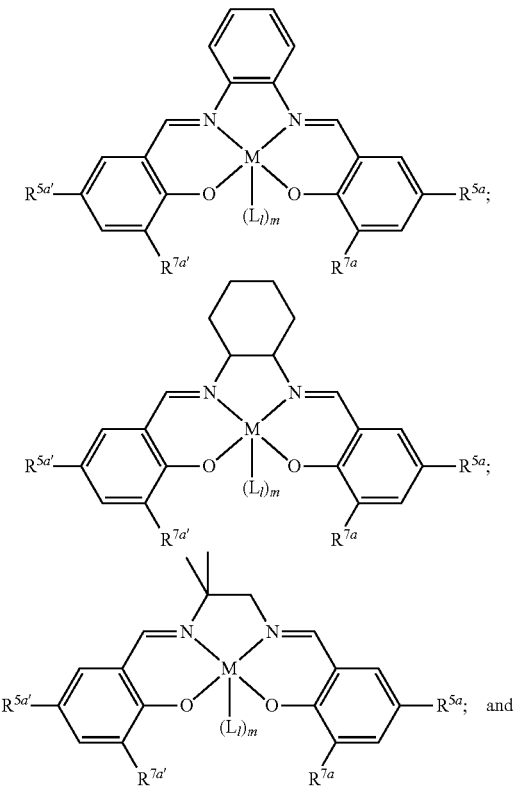

-continued

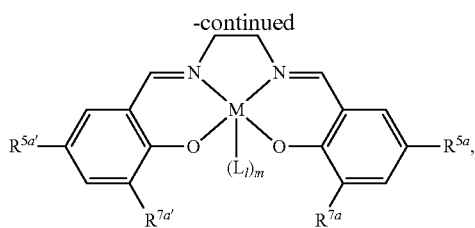

where $R^{5a}$, $R^{5a'}$, $R^{7a}$, and $R^{7a'}$ are as defined above. In certain embodiments, each pair of substituents on the salicaldehyde portions of the complexes above are the same (i.e. $R^{5a}$ & $R^{5a'}$ are the same and $R^{7a}$ & $R^{7a'}$ are the same). In other embodiments, at least one of $R^{5a}$ & $R^{5a'}$ or $R^{7a}$ & $R^{7a'}$ are different from one another.

In certain embodiments, a metal complex used in step (b) of the method has formula III:

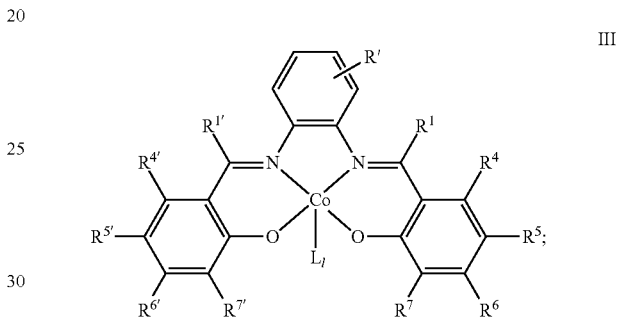

In certain embodiments, a metal complex used in step (b) of the method has formula IV:

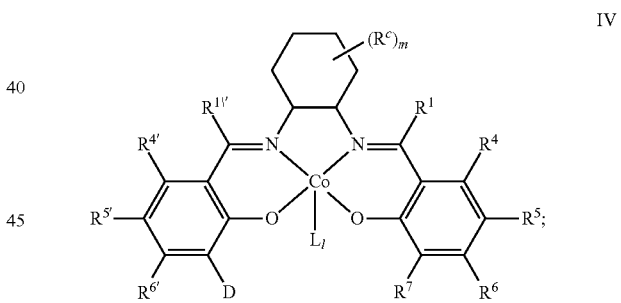

In certain embodiments, a metal complex used in step (b) of the method has formula V:

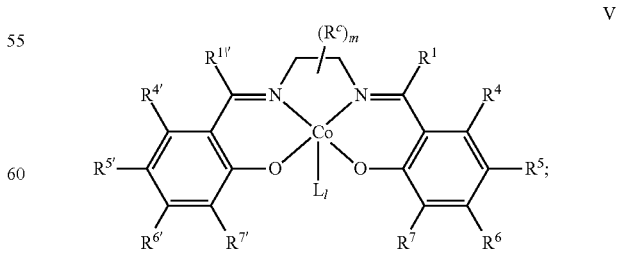

wherein:
$R^c$, $R^d$, $L_I$, m, q, $R^4$, $R^{4'}$, $R^5$, $R^{5'}$, $R^6$, $R^{6'}$, $R^7$, and $R^{7'}$ are as described above, and where [$R^1$ and $R^4$], [$R^{1'}$ and R[4'] and any two adjacent R[4], R[4'], R[5], R[5'], R[6], R[6'], R[7], and R[7'] groups can optionally be taken together with intervening atoms to form one or more rings optionally substituted with one or more R[20] groups.

In certain embodiments, wherein a provided metal complex has formula III, R[1], R[1'], R[4], R[4'], R[6], and R[6'] are each —H. In certain embodiments, wherein the metal complex has formula III, R[5], R[5'], R[7] and R[7'] are each optionally substituted $C_1$-$C_{12}$ aliphatic.

In certain methods wherein a provided metal complex has formula III, R[4], R[4'], R[5], R[5'], R[6], R[6'], R[7'], and R are each independently selected from the group consisting of: —H, —Si(R[13])$_3$; —Si[(CH$_2$)$_k$R[22]]$_z$(R[13])$_{(3-z)}$; methyl, ethyl, n-propyl, i-propyl, n-butyl, sec-butyl, t-butyl, isoamyl, t-amyl, thexyl, trityl, —C(CH$_3$)Ph$_2$, —(CH$_2$)$_p$C[(CH$_2$)$_p$R[22]]$_z$H$_{(3-z)}$, and —Si(R[13])$_{(3-z)}$[(CH$_2$)$_k$R[22]]$_z$, where p is an integer from 0 to 12 inclusive and R[22] is selected from the group consisting of: a heterocycle; an amine; a guanidine; —N+(R[11])$_3$ X−; —P+ (R[11])$_3$X−; —P(R[11])$_2$=N+=P(R[11])$_3$ X−; —As+(R[11])$_3$X−, and optionally substituted pyridinium.

In certain methods wherein a provided metal complex has formula III, R[7] is selected from the group consisting of —H; methyl; ethyl; n-propyl; i-propyl; n-butyl; sec-butyl; t-butyl; isoamyl; t-amyl; thexyl; and trityl; and R[5] is selected from the group consisting of —(CH$_2$)$_p$CH$_{(3-z)}$[(CH$_2$)$_p$R[22]]$_z$ and —Si(R[13])$_{(3-z)}$[(CH$_2$)$_k$R[22]]$_z$.

In certain methods, a provided metal complex has formula IV, R[1], R[1'], R[4], R[4'], R[6], and R[6'] are each —H. In certain embodiments, wherein a complex is a metallosalenate complex of formula IV, R[5], R[5'], R[7] and R[7'] are each optionally substituted $C_1$-$C_{12}$ aliphatic.

In certain methods wherein a metal complex has formula IV, R[4], R[4'], R[5], R[5'], R[6], R[6'], R[7], and R[7'] are each independently selected from the group consisting of: —H, —Si(R[13])$_3$; —Si(R[13])$_{(3-z)}$[(CH$_2$)$_k$R[22]]$_z$; methyl, ethyl, n-propyl, i-propyl, n-butyl, sec-butyl, t-butyl, isoamyl, t-amyl, thexyl, trityl, —(CH$_2$)$_p$C[(CH$_2$)$_p$R[22]]$_z$H$_{(3-z)}$, In certain methods wherein a metal complex has formula IV, R[7] is selected from the group consisting of —H; methyl; ethyl; n-propyl; i-propyl; n-butyl; sec-butyl; t-butyl; isoamyl; t-amyl; thexyl; and trityl; and R[5] is selected from the group consisting of —(CH$_2$)$_p$CH$_{(3-z)}$[(CH$_2$)$_p$R[22]]$_z$ and —Si(R[13])$_{(3-z)}$[(CH$_2$)$_k$R[22]]$_z$.

In methods wherein a metal complex has formula V, R[1], R[1'], R[4], R[4'], R[6], and R[6'] are each —H. In certain embodiments, wherein a complex is a metallosalenate complex of formula V, R[5], R[5'], R[7] and R[7'] are each optionally substituted $C_1$-$C_{12}$ aliphatic.

In certain methods wherein a metal complex has formula V, R[4], R[4'], R[5], R[5'], R[6], R[6'], R[7], and R[7'] are each independently selected from the group consisting of: —H, —Si(R[13])$_3$; —Si[(CH$_2$)$_k$R[21]]$_z$(R[13])$_{(3-z)}$; methyl, ethyl, n-propyl, i-propyl, n-butyl, sec-butyl, t-butyl, isoamyl, t-amyl, thexyl, trityl, —(CH$_2$)$_p$CH$_{(3-z)}$[(CH$_2$)$_p$R[22]]$_z$ and —Si(R[13])$_{(3-z)}$[(CH$_2$)$_k$R[22]]$_z$.

In certain methods wherein a metal complex has formula V, R[7] is selected from the group consisting of —H; methyl; ethyl; n-propyl; i-propyl; n-butyl; sec-butyl; t-butyl; isoamyl; t-amyl; thexyl; and trityl; and R[5] is selected from the group consisting of —(CH$_2$)$_p$CH$_{(3-z)}$[(CH$_2$)$_p$R[22]]$_z$ and —Si(R[13])$_{(3-z)}$[(CH$_2$)$_k$R[22]]$_z$.

In some embodiments, a metal complex has a structure $L_p$-M-($L_j$)$_m$, where $L_p$-M is selected from the group consisting of:

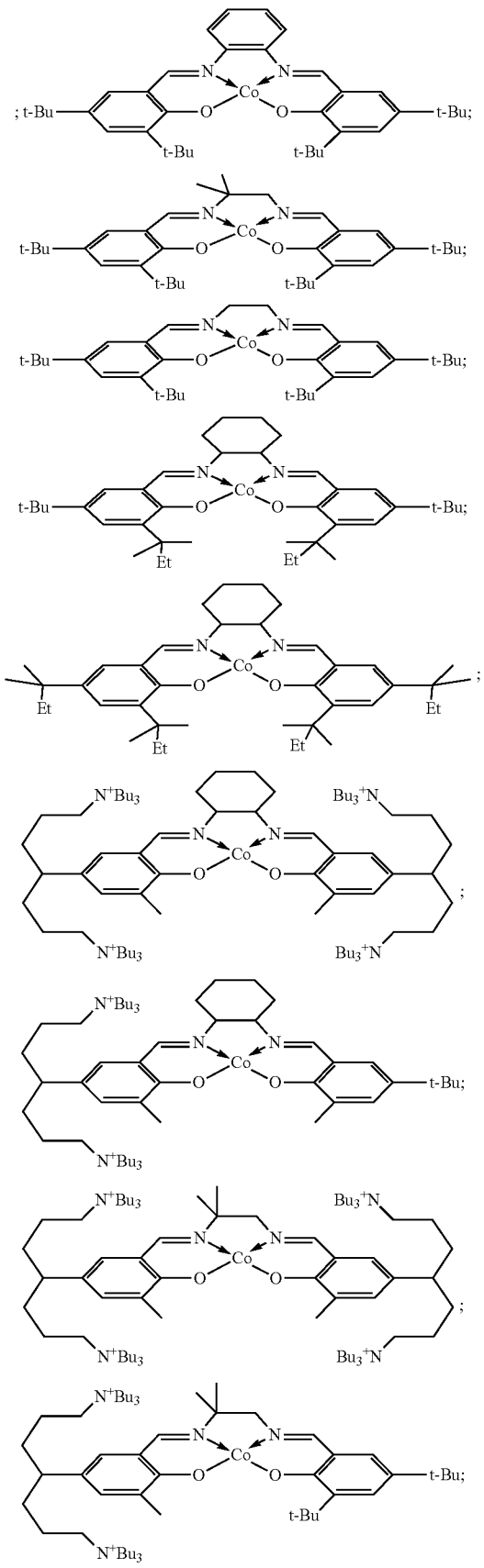

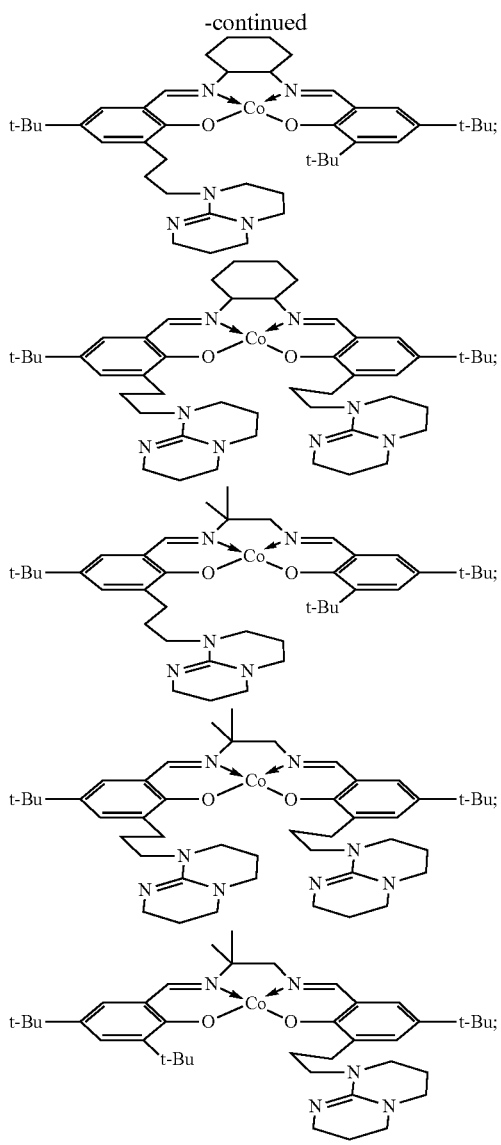

It is generally desirable to maintain the concentration of a metal complex in a polymerization at a low level relative to the epoxide. In certain embodiments, the molar ratio of metal complex to epoxide ranges from about 1:100 to about 1:1,000,000. In certain embodiments, the ratio ranges from about 1:5,000 to about 1:500,000. In some embodiments, the ratio ranges from about 1:10,000 to about 1:200,000. In other embodiments, the ratio ranges from about 1:20,000 to about 1:100,000.

III.d. Co-Catalysts

In some embodiments, methods of the present invention include the use of at least one co-catalyst. In some embodiments, a co-catalyst is present at step (b). In certain embodiments, a co-catalyst is any one or more of the co-catalytic species described above in the description of the polymerization systems of the present invention. In certain embodiments, a co-catalyst is selected from the group consisting of: amines, guanidines, amidines, phosphines, nitrogen-containing heterocycles, ammonium salts, phosphonium salts, arsonium salts, bisphosphine ammonium salts, and a combination of any two or more of the above. In certain embodiments, a co-catalyst is covalently linked to the permanent ligand set of the metal complex.

In embodiments where a method includes a co-catalyst that is an "onium" salt, there is necessarily an anion present to balance the charge of the salt. In certain embodiments, this is any anion. In certain embodiments, an anion is a nucleophile. In some embodiments, an anion is a nucleophile capable of ring-opening an epoxide. In some embodiments, an anion is selected from the group consisting of: azide, halides, alkyl sulfonates, carboxylates, alkoxides, and phenolates. In certain embodiments, methods include selected a catalyst and co-catalyst such that the initiating ligand on the metal complex and an anion present to balance the charge of a cationic co-catalyst are the same molecule.

III.e. Reaction Conditions

In certain embodiments, the steps of any of the above methods further comprise one or more solvents. In certain other embodiments, the polymerization steps are performed in neat epoxide without the addition of solvent.

In certain methods, where a polymerization solvent is present, the solvent is an organic solvent. In certain embodiments, the solvent is a hydrocarbon. In certain embodiments, the solvent is an aromatic hydrocarbon. In certain embodiments, the solvent is an aliphatic hydrocarbon. In certain embodiments, the solvent is a halogenated hydrocarbon.

In certain embodiments, the solvent is an ether. In certain embodiments, the solvent is an ester. In certain embodiments the solvent is a ketone.

In certain embodiments suitable solvents include, but are not limited to: Methylene Chloride, Chloroform, 1,2-Dichloroethane, Propylene Carbonate, Acetonitrile, Dimethylformamide, N-Methyl-2-pyrrolidone, Dimethyl Sulfoxide, Nitromethane, Caprolactone, 1,4-Dioxane, and 1,3-Dioxane.

In certain other embodiments, suitable solvents include, but are not limited to: Methyl Acetate, Ethyl Acetate, Acetone, Methyl Ethyl Ketone, Propylene Oxide, Tretrahydrofuran, Monoglyme Triglyme, Propionitrile, 1-Nitropropane, Cyclohexanone.

In certain embodiments, any of the above methods comprise aliphatic oxide present in amounts concentrations between about 0.5 M to about 20 M or the neat concentration of the aliphatic oxide. In certain embodiments, aliphatic oxide is present in amounts between about 0.5 M to about 2 M. In certain embodiments, aliphatic oxide is present in amounts between about 2 M to about 5 M. In certain embodiments, aliphatic oxide is present in amounts between about 5 M to about 20 M. In certain embodiments, aliphatic oxide is present in an amount of about 20 M. In certain embodiments, liquid aliphatic oxide comprises the reaction solvent.

In certain embodiments, $CO_2$ is present at a pressure of between about 30 psi to about 800 psi. In certain embodiments, $CO_2$ is present at a pressure of between about 30 psi to about 500 psi. In certain embodiments, $CO_2$ is present at a pressure of between about 30 psi to about 400 psi. In certain embodiments, $CO_2$ is present at a pressure of between about 30 psi to about 300 psi. In certain embodiments, $CO_2$ is present at a pressure of between about 30 psi to about 200 psi. In certain embodiments, $CO_2$ is present at a pressure of between about 30 psi to about 100 psi. In certain embodiments, $CO_2$ is present at a pressure of between about 30 psi to about 80 psi. In certain embodiments, $CO_2$ is present at a pressure of about 30 psi. In certain embodiments, $CO_2$ is present at a pressure of about 50 psi. In certain embodiments, $CO_2$ is present at a pressure of about 100 psi. In certain embodiments, the $CO_2$ is supercritical.

In certain embodiments of the above methods the reaction is conducted at a temperature of between about 0° C. to about 150° C. In certain embodiments, the reaction is conducted at a temperature of between about 23° C. to about 100° C. In certain embodiments, the reaction is conducted at a temperature of between about 23° C. and about 80° C. In certain embodiments, the reaction to be conducted at a temperature of between about 23° C. to about 50° C.

In certain embodiments, a polymerization step of any of the above methods produces cyclic carbonate as a by-product in amounts of less than about 20%. In certain embodiments, cyclic carbonate is produced as a by-product in amounts of less than about 15%. In certain embodiments, cyclic carbonate is produced as a by-product in amounts of less than about 10%. In certain embodiments, cyclic carbonate is produced as a by product in amounts of less than about 5%. In certain embodiments, cyclic carbonate is produced as a by-product in amounts of less than about 1%. In certain embodiments, the reaction does not produce any detectable by-products (e.g., as detectable by $^1$H-NMR and/or liquid chromatography (LC)).

In certain embodiments, a polymerization time is between about 30 minutes and about 48 hours. In some embodiments, the reaction is allowed to process for less than 24 hours. In some embodiments, the reaction is allowed to progress for less than 12 hours. In some embodiments, the reaction is allowed to process for between about 4 and about 12 hours.

In certain embodiments, a polymerization reaction is allowed to proceed until the number average molecular weight of the polymers formed is between about 500 and about 400,000 g/mol. In certain embodiments, the number average molecular weight is allowed to reach a value between 500 and 40,000 g/mol. In other embodiments, the number average molecular weight is allowed to reach a value between 500 and 20,000 g/mol. In certain embodiments, the number average molecular weight is allowed to reach a value between 500 and 10,000 g/mol. In other embodiments, the number average molecular weight is allowed to reach a value between 500 and 5,000 g/mol. In other embodiments, the number average molecular weight is allowed to reach a value between 500 and 2,500 g/mol. In other embodiments, the number average molecular weight is allowed to reach a value between 1,000 and 5,000 g/mol.

In certain embodiments, provided methods further include the step of sampling the reaction and determining the molecular weight of the polymer at a given time. In certain embodiments, this sampling and molecular weight determination are performed at two or more time intervals. In certain embodiments a plot of molecular weight gain over time is constructed and the method further includes the step of determining from this plot the time at which a desired molecular weight polymer will be present. In certain embodiments, the time at which the polymerization is ended is determined by this method.

In certain embodiments, a polymerization reaction proceeds until between about 20% and about 100% of the provided epoxide is consumed. In certain embodiments, the conversion is between about 40% and about 90%. In certain embodiments, the conversion is at least 50%. In other embodiments, the conversion is at least 60%, at least 80% or at least 85%. In certain embodiments, at least 80% of the provided epoxide is converted to polymer.

In certain embodiments, a method further includes the step of choosing the ratios at which the catalyst, the chain transfer agent and the epoxide substrate are provided. In certain embodiments, these ratios are selected to provide high epoxide conversion while providing polyol of the desired molecular weight in a selected length of time. In some embodiments, this selection of ratios includes the substeps of: i) selecting a desired length of time for which the reaction is to be run, ii) multiplying the selected length of time for which the polymerization reaction is to run by the turnover frequency of the catalyst under the reaction conditions iii) multiplying this result by the desired mol % conversion of epoxide, and iv) using the inverse of this result as the ratio of catalyst to epoxide used for the reaction. In some embodiments, the ratio of chain transfer agent to catalyst is determined by the additional following steps; v) taking the value from step (iii) above and multiplying this result by the molecular weight of the repeating unit of the polycarbonate; vi) selecting a desired molecular weight for the polyol and dividing the result from step (v) by this number; and vii) subtracting the number of chains produced per catalyst molecule from the result of step (vi) and taking the result as the ratio of chain transfer agent to catalyst used in step (1).

To make the steps of the above-described method clear, the following example is provided: in a copolymerization of propylene oxide and $CO_2$ using a catalyst that has a TOF of 1000 $h^{-1}$ and which produces two polymer chains per catalyst molecule, a polymer with Mn of 2,000 g/mol is to be produced and it is desired that 80% of the provided epoxide is converted during a reaction time of 10 hours, one would perform the following steps to obtain the required ratios:

First, performing taking 10 hours as the selected time interval and performing step (ii) of multiplying the selected interval of 10 hours, by the TOF of 1000 $hr^{-1}$ gives 10,000 turnovers per catalyst molecule; next multiplying this number by the desired 80% conversion(step (iii)) and then inverting (step (iv)) provides a value of $1.25 \times 10^{-4}$ corresponding to a catalyst to epoxide ratio of 1:8,000.

Moving next to determination of the chain transfer agent loading, at step (iv) one multiplies the result of step (iii) by the molecular weight of the repeating unit of the polycarbonate (in this case $C_4H_6O_3$=102 g/mol) and dividing by the desired Mn of 2,000 to give a value of 408. Subtracting the two chains per catalyst from this result in a chain transfer to catalyst ratio of 406:1. Therefore, for this example the molar ratio of catalyst to epoxide to chain transfer agent should be approximately 1:8,000:406.

It will be appreciated that the method described above is simplified in certain respects. For example, the calculation described assumes that the reaction rate is linear throughout the duration of the polymerization. The calculation described also dismisses the contribution that the mass of the chain initiator adds to the molecular weight of the polymer chains. In certain embodiments, particularly those where a polymeric chain transfer agent such as a polyether is used, or where a very low molecular weight oligomer is produced, the contribution of the mass of the initiator to the Mn of the polymer may be significant. It will be understood by those skilled in the art that additional chain transfer agent can be added to account for this effect, and more specifically, that the calculations described above can be modified to account for this effect. Similarly, more detailed kinetic data could be used to account for changes in the reaction rate over time as the reaction proceeds. For instances where a mixture of epoxides is present, the molecular weight of the repeating unit may be approximated by using a weighted average of the molecular weights of the epoxides present in the mixture. This could be further refined by analyzing copolymer made under similar conditions to determine the mole percent incorporation of the different monomers (for example by using NMR spectroscopy) since all epoxides may not be incorporated into polymer with equal efficiency. These and other modifications will be readily apprehended by the skilled artisan and are specifically encompassed by the methods provided herein.

In certain embodiments, it has been found that the turnover frequency of some catalysts decreases as the ratio of chain transfer agent to catalyst increases. This effect can be particularly noticeable at ratios higher than about 100:1. In these instances, the above-described methods may not produced the expected Mn and monomer conversion in a given time interval. In such cases it may be necessary to measure the TOF of the catalyst at various chain transfer agent ratios prior to performing the calculations described above.

In general, such cases require the reaction interval be lengthened by an amount proportional to the falloff in catalyst activity at the catalyst to chain transfer agent ratio used, or in some embodiments the catalyst loading be increased by a compensatory amount.

As noted above, water present in the reaction mixtures of the described methods can also act as a chain transfer agent. In certain embodiments, the calculations described above further include the method of measuring the water content of the reaction (preferably after the reaction vessel has been charged with epoxide, chain transfer agent and any solvent to be used, but prior to addition of the catalyst). The molar equivalents of water relative to catalyst are then calculated and the ratio of chain transfer agent to catalyst can be decreased accordingly. If this is not done and there is significant water present, the Mn will be lower than expected at a given % conversion.

IV. Higher Polymers

The present disclosure encompasses higher polymers derived from the polycarbonate polyols described hereinabove. In certain embodiments, such higher polymers are formed by reacting the polyols with suitable cross-linking agents. In certain embodiments, cross linkers including functional groups reactive toward hydroxyl groups are selected, for example, from epoxy and isocyanate groups. In certain embodiments, such cross linking agents are polyisocyanates.

In some embodiments, a difunctional or higher-functionality isocyanate is selected from di-isocyanates, the biurets and cyanurates of diisocyanates, and the adducts of diisocyanates to polyols. Suitable diisocyanates have generally from 4 to 22 carbon atoms.

The diisocyanates are typically selected from aliphatic, cycloaliphatic and aromatic diisocyanates, for example 1,4-diisocyanatobutane, 1,6-diisocyanatohexane, 1,6-diisocyanato-2,2,4-trimethylhexane, 1,6-diisocyanato-2,4,4-trimethylhexane, 1,2-, 1,3- and 1,4-diisocyanatocyclohexane, 2,4- and 2,6-diisocyanato-1-methylcyclohexane, 4,4'-bis(isocyanatocyclohexyl)methane, isophorone diisocyanate (=1-isocyanato-3,3,5-trimethyl-5-isocyanatomethylcyclohexane), 2,4- and 2,6-tolylene diisocyanate, tetramethylene-p-xylylene diisocyanate (=1,4-bis(2-isocyanatoprop-2-yl)benzene), 4,4'-diisocyanatodiphenylmethane, preferably 1,6-diisocyanatohexane diisocyanatohexane and isophorone diisocyanate, and mixtures thereof.

In certain embodiments, crosslinking compounds comprise the cyanurates and biurets of aliphatic diisocyanatcs. In certain embodiments, crosslinking compounds are the di-isocyanurate and the biuret of isophorone diisocyanate, and the isocyanate and the biuret of 1,6-diisocyanatohexane. Examples of adducts of diisocyanates to polyols are the adducts of the abovementioned diisocyanates to glycerol, trimethylolethane and trimethylolpropane, for example the adduct of tolylene diisocyanates to trimethylolpropane, or the adducts of 1,6-diisocyanatohexane or isophorone diisocyanate to trimethylpropane and/or glycerol.

In some embodiments, a polyisocyanate used, may, for example, be an aromatic polyisocyanate such as tolylene diisocyanate, diphenylmethane diisocyanate or polymethylene polyphenyl isocyanate, an aliphatic polyisocyanate such as hexamethylene diisocyanate, xylylene diisocyanate, dicyclohexylmethane diisocyanate, lysine diisocyanate or tetramethylxylylene diisocyanate, an alicyclic polyisocyanate such as isophorone diisocyanate, or a modified product thereof.

In some embodiments, a modified product of a polyisocyanate is a prepolymer modified product which is a reaction product of a low molecular weight diol with a low molecular weight triol, a buret product which is a reaction product with water, or a trimer having an isocyanurate skeleton.

The isocyanate group-terminated prepolymer can be produced by reacting a stoichiometrically excess amount of a polyisocyanate to the polyol composition. It can be produced by thermally reacting the polyol composition with the polyisocyanate at a temperature of from 60 to 100° C. for from 1 to 30 hours in a dry nitrogen stream in the presence or absence of a solvent and optionally in the presence of a urethane-forming catalyst. In some embodiments, a urethane-forming catalyst is an organometallic compound of tin, lead or titanium. In some embodiments a urethane-forming catalyst is an organic tin compound, such as dibutyltin dilaurate, dibutyltin dioctoate or stannous octoate.

An isocyanate group-terminated prepolymer of the present invention can be used for uses known in the art and familiar to the skilled artisan. In some embodiments, it can be used for a humidity curable composition which is cured by a reaction with moisture in air, a two-part curable composition to be reacted with a curing agent such as a polyamine, a polyol or a low molecular weight polyol, a casting polyurethane elastomer, or other applications.

The present invention also provides a polyurethane resin obtained by reacting the above polyol composition with a polyisocyanate. Such a polyurethane resin can be produced by a known method, and a curing agent such as a polyamine or a low molecular polyol, or the above mentioned urethane-forming catalyst may optionally be used.

In the production of polyurethanes, polyols of the invention may be reacted with the polyisocyanates using conventional techniques that have been fully described in the prior art. Depending upon whether the product is to be a homogeneous or microcellular elastomer, a flexible or rigid foam, an adhesive, coating or other form, the reaction mixture may contain other conventional additives, such as chain-extenders, for example 1,4-butanediol or hydrazine, catalysts, for example tertiary amines or tin compounds, surfactants, for example siloxane-oxyalkylene copolymers, blowing agents, for example water and trichlorofluoromethane, cross-linking agents, for example triethanolamine, fillers, pigments, fire-retardants and the like.

To accelerate the reaction between the isocyanate-reactive groups of the polyol resin and the isocyanate groups of the crosslinker, it is possible to use known catalysts, for example, dibutyltin dilaurate, tin(II) octoate, 1,4-diazabicyclo[2.2.2]-octane, or amines such as triethylamine. These are typically used in an amount of from $10^{-5}$ to $10^{-2}$ g, based on the weight of the crosslinker.

The crosslinking density can be controlled by varying the functionality of the polyisocyanate, the molar ratio of the polyisocyanate to the polyol resin, or by additional use of monofunctional compounds reactive toward isocyanate groups, such as monohydric alcohols, e.g. ethylhexanol or propylheptanol.

A crosslinker is generally used in an amount which corresponds to an NCO:OH equivalents ratio of from 0.5 to 2, preferably from 0.75 to 1.5 and most preferably from 0.8 to 1.2.

Suitable crosslinking agents are also epoxy compounds having at least two epoxide groups in the molecule, and their extension products formed by preliminary extension (pre-polymers for epoxy resins, as described, for example in Ullmann's Encyclopedia of Industrial Chemistry, 6th edition, 2000, Electronic Release, in the chapter "Epoxy Resins"). Epoxy compounds having at least two epoxide groups in the molecule include, in particular:

(i) Polyglycidyl and poly(β-methylglycidyl) esters which are obtainable by reacting a compound having at least two carboxyl groups, such as an aliphatic or aromatic polycarboxylic acid, with epichlorohydrin or beta-methylepichlorohydrin. The reaction is effected, preferably, in the presence of a base. Suitable aliphatic polycarboxylic acids are oxalic acid, succinic acid, glutaric acid, adipic acid, pimelic acid, azelaic acid, dimerized or trimerized linolenic acid, tetrahydrophthalic acid, hexahydrophthalic acid or 4-methylhexahydrophthalic acid. Suitable aromatic polycarboxylic acids are, for example, phthalic acid, isophthalic acid or terephthalic acid.

(ii) Polyglycidyl or poly((3-methylglycidyl) ethers which derive, for example, from acyclic alcohols, such as ethylene glycol, diethylene glycol, poly(oxyethylene) glycols, propane-1,2-diol, poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol; or cyclic alcohols such as 1,4-cyclohexanedimethanol, bis(4-hydroxycyclohexyl)methane or 2,2-bis(4-hydroxycyclohexyl) propane; or comprise aromatic rings, such as N,N-bis(2-hydroxyethyl)aniline or p,p-bis(2-hydroxyethylamino) diphenylmethane. The glycidyl ethers may also derive from monocyclic phenols such as resorcinol or hydroquinone, or polycyclic phenols, such as bis(4-hydroxyphenyl)methane, 4,4'-dihydroxybiphenyl, bis(4-hydroxyphenyl) sulfone, 1,1, 2,2-tetrakis(4-hydroxyphenyl)ethane, 2,2-bis(4-hydroxyphenyl)propane, 2,2-bis(3,5-dibromo-4-hydroxyphenyl)propane, or from novolaks which are obtainable by condensing aldehydes, such as formaldehyde, acetaldehyde, chloral or furfural, with phenols, such as phenol, 4-chlorophenol, 2-methylphenol, 4-tert-butylphenol or bisphenols.

(iii) Poly(N-glycidyl) compounds which are obtainable by dehydrochlorinating the reaction products of epichlorohydrin with amines which have at least two amine hydrogen atoms, such as aniline, n-butylamine, bis(4-aminophenyl) methane, m-xylylenediamine or bis(4-methylaminophenyl) methane. The poly(N-glycidyl) compounds also include triglycidyl isocyanurates, N,N'-diglycidyl derivatives of alkyleneureas such as ethyleneurea or 1,3-propyleneurea, and the diglycidyl derivatives or hydantoins such as 5,5-dimethylhydantoin.

(iv) Poly(S-glycidyl) compounds such as di-S-glycidyl derivatives which derive from dithiols, such as ethane-1,2-dithiol or bis(4-mercaptomethylphenyl) ether.

(v) Cycloaliphatic epoxy compounds such as bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl 3',4'-epoxycyclohexanecarboxylate; or mixed cycloaliphatic-aliphatic epoxy compounds such as limonene diepoxide.

In some embodiments, the present disclosure encompasses higher polymers formed with polyol resins of the present invention that additionally comprise a stiffening polymer which comprises (meth)acryloyl and/or vinylaromatic units. The stiffening is obtainable by free-radically polymerizing (meth)acrylic monomers or vinylaromatic monomers. Examples of suitable monomers are styrene, ring-alkylated styrenes with preferably $C_{1-4}$ alkyl radicals such as a-methylstyrene, p-methylstyrene, acrylonitrile, methacrylonitrile, acrylamide or methacrylamide, alkyl acrylates and methacrylates having from 1 to 4 carbon atoms in the alkyl radical, in particular methyl methacrylate. Preference is given to using monomers and monomer mixtures which give rise to a polymer or copolymer having a glass transition temperature of more than +20° C. and preferably more than +50° C.

The stiffening polymer may, aside from (meth)acrylic monomers or vinylaromatic monomers, comprise various monomers. The (meth)acrylic monomers or vinylaromatic monomers make up generally at least 20% by weight, preferably at least 50% by weight, in particular at least 70% by weight, of the constituent monomers.

The encompassed higher polymer compositions may additionally comprise customary assistants such as fillers, diluents or stabilizers.

Suitable fillers are, for example, silica, colloidal silica, calcium carbonate, carbon black, titanium dioxide, mica and the like.

Suitable diluents are, for example, polybutene, liquid polybutadiene, hydrogenated polybutadiene, paraffin oil, naphthenenates, atactic polypropylene, dialkyl phthalates, reactive diluents, for example, alcohols and oligoisobutenes.

Suitable stabilizers are, for example, 2-benzothiazolyl sulfide, benzothiazole, thiazole, dimethyl acetylenedicarboxylate, diethyl acetylenedicarboxylate, BHT, butylhydroxyanisole, vitamin E.

Further higher polymeric materials which may be obtained from the polyols of the invention include vinyl type polymers made by polymerising ethylenically unsaturated derivatives of the polyols. Such derivatives may be obtained, for example, by reacting the polyols with ethylenically unsaturated carboxylic acids, for example acrylic, methacrylic and itaconic acids or ester-forming derivatives thereof.

Another useful method of forming ethylenically unsaturated derivatives of the polyols is to react said polyols with organic polyisocyanates, for example those mentioned above, and then to react the isocyanate group terminated products obtained with hydroxyalkyl acrylates or methacrylates, for example the 2-hydroxyethyl or 2-hydroxypropyl compounds. Alternatively, the polyols may be reacted with isocyanato-acrylates obtained by reacting a diisocyanate with a hydroxalkyl acrylate or methacrylate.

The ethylenically unsaturated derivatives of the fluorinated polyols may be polymerized, preferably in the presence of co-monomers such as acrylonitrile, styrene, ethyl acrylate, butyl acrylate or methyl methacrylate, using conditions that have been fully described in the prior art for vinyl polymerisations. Useful molded plastics articles may be made in this way.

Further higher polymeric materials which may be obtained from the polyols of the invention include epoxy resins prepared in conventional manner from epoxy derivatives of the polyols. Such derivatives may be obtained, for example, by reacting the polyols with epichlorohydrin in the presence of bases.

Articles of manufacture comprising provided polycarbonate polyol and/or polyurethane compositions can be made using known methods and procedures described in the art. The skilled artisan, after reading the present disclosure, will be able to manufacture such articles using well known protocols and techniques.

EXAMPLES

Example 1

This example demonstrates the use of the polymerization system of the present invention with a chain transfer agent Y-A-(Y)$_n$ and a catalyst L$_p$-M-(L$_I$)$_m$ utilizing a co-catalyst PPN+Cl—, where
 n is 1,
 each —Y is —OH,
 -A- is;

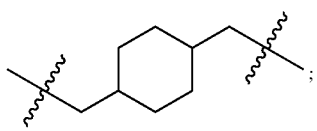 [SMILES: *CC1CCC(C*)CC1]

-L is a salcy ligand

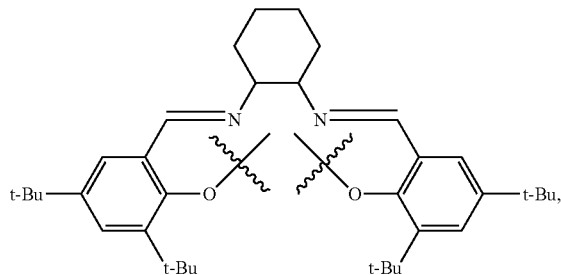 [SMILES: *Oc1c(/C=N/C2CCCCC2/N=C/c2cc(C(C)(C)C)cc(C(C)(C)C)c2O*)cc(C(C)(C)C)cc1C(C)(C)C]

-M- is Co(III),
-L$_I$ is a chain transfer agent -Q'-A'(Z')$_n$, where Q' is COO$^-$, -A- is —CH$_2$—, and Z' is —OH, and
n is 1.

E-1

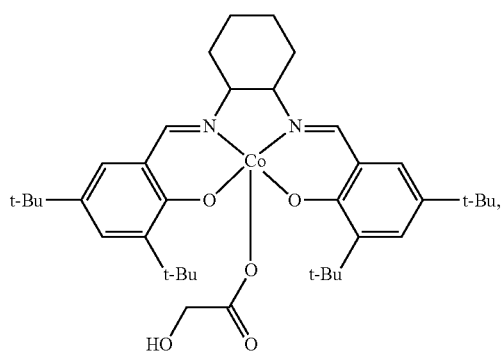

24 mg of catalyst E1 (0.04 mmol), 0.45 g (3.1 mmol) 1,4-cyclohexanedimethanol and 20 mg (0.04 mmol) PPN$^+$ Cl$^-$ were held under vacuum in a Fisher-Potter bottle. The bottle was filled with nitrogen and 20 ml propylene oxide was added. The bottle was pressurized with 100 psi CO$_2$.

After 41 h at 30° C. the bottle was opened and the polymer was isolated by pouring into methanol. GPC analysis showed formation of a polymer of M$_n$=4460, M$_w$=4610, PDI=1.035. The polymer has a carbonate content of >97%.

The polycarbonate polyol composition thus obtained consists predominantly of three types of polymer chains: chains P$^1$ arising from initiation by the cyclohexanedimethanol, chains P$^{1'}$ arising from initiation by the glycolic acid (L$_I$) and chains P$^2$ arising from the chloride counterion on the PPN co-catalyst:

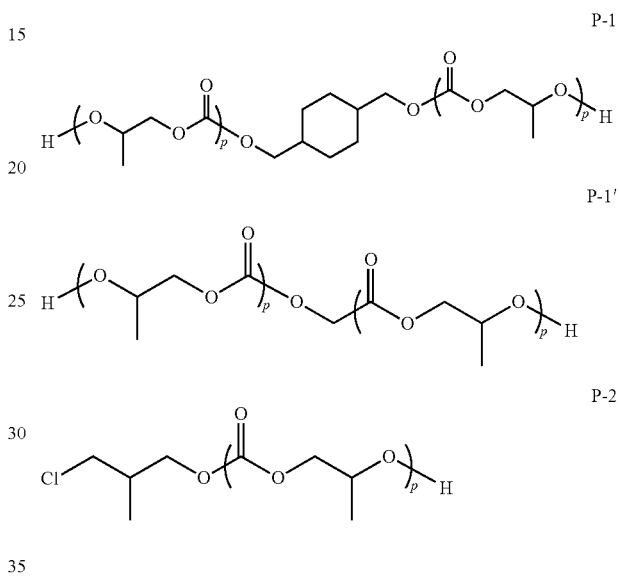

where each p is on average approximately 20-21. In this particular composition, the ratio of P$^1$ to P$^{1'}$ to P$^2$ is approximately 89:1:1. The polycarbonate polyol composition contains approximately 99% OH end groups.

Example 2

This demonstrates the use of the polymerization system of the present invention with a chain transfer agent Y-A-(Y)$_n$ and a catalyst L$_p$-M-(L$_I$)$_m$ utilizing a co-catalyst PPN+ Cl–, where
 n is 3
 each —Y is —OH,
 -A- is

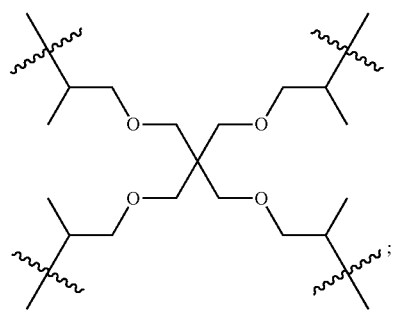 [SMILES: *C(C)COCC(COCC(*)C)(COCC(*)C)COCC(*)C]

-$L_p$ is a salcy ligand

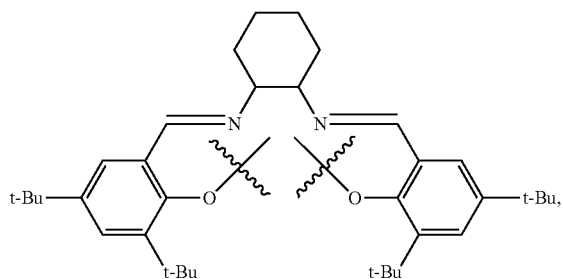 [SMILES: *Oc1c(/C=N/C2CCCCC2/N=C/c2cc(C(C)(C)C)cc(C(C)(C)C)c2O*)cc(C(C)(C)C)cc1C(C)(C)C]

-M- is Co(III), and
-$L_I$ is trifluoroacetate.

E-2

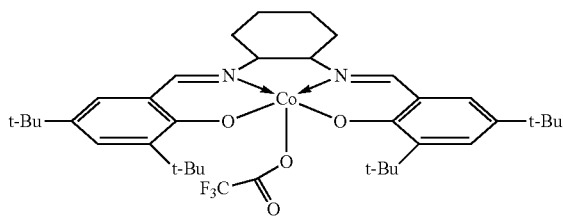

51 mg of catalyst E2 (0.07 mmol), 0.5 g (1.4 mmol) of propoxylated pentaerythritol and 41 mg (0.08 mmol) PPN⁺ Cl⁻ were held under vacuum in a Fisher-Potter bottle. The bottle was filled with nitrogen and 20 ml propylene oxide was added. The bottle was pressurized with 100 psi $CO_2$. After 22 h at 30° C. the bottle was opened and the polymer was isolated by pouring into methanol. GPC analysis showed formation of a polymer formation of a polymer of $M_n$=13660, $M_w$=15420, PDI=1.129. The polymer has a carbonate content of >97%.

The polycarbonate polyol composition thus obtained consists predominantly of three types of polymer chains: chains $P^{1a}$ arising from initiation by the propoxylated pentaerythritol, chains $P^{2a}$ arising from initiation by the trifluoroacetate ($L_I$) and chains $P^2$ arising from the chloride counterion on the PPN co-catalyst:

where each p is on average approximately 30-32. In this particular composition, the ratio of $p^{1a}$ to $p^{2a}$ to $P^2$ is approximately 20:1:1. The polycarbonate polyol composition contains approximately 97% OH end groups.

Example 3

Example 3 was conducted using conditions similar to Example 2, except Poly(caprolactone) diol having an Mn of 530 g/mol was used as the chain transfer agent.

Example 4

Example 4 was conducted using conditions similar to Example 3, except Poly(ethylene glycol) having an Mn of 400 g/mol was used as the chain transfer agent.

Example 5

Example 5 was conducted using conditions similar to Example 3, except Poly(propylene glycol) having an Mn of 760 g/mol was used as the chain transfer agent.

Example 6

Example 6 was conducted using conditions similar to Example 3, except 1,2-cyclohexane diol was used as the chain transfer agent.

Example 7

This example demonstrates the use of the polymerization system of the present invention with a chain transfer agent Y-A-(Y)$_n$ and a catalyst $L_p$-M-($L_I$)$_m$ utilizing a co-catalyst PPN+Cl−, where
n is 1,
each —Y is —OH,
-A- is;

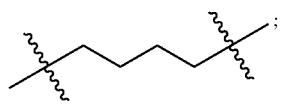 [SMILES: *CCCC*]

P-1a

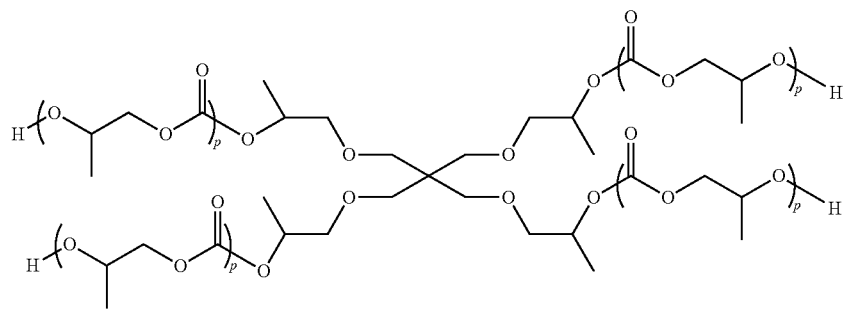

P-2a

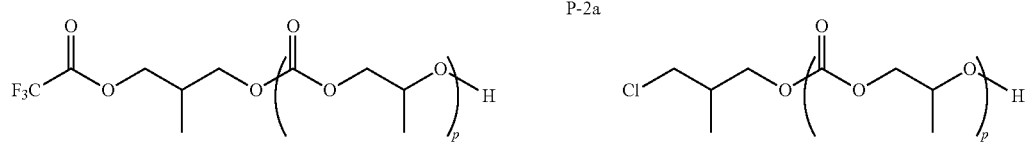

P-2

-$L_p$ is a salcy ligand

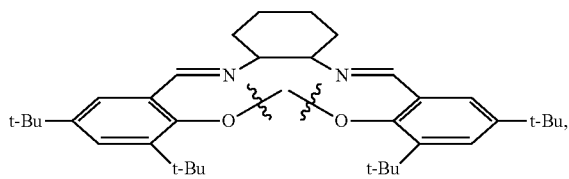 [SMILES: *Oc1c(/C=N/C2CCCCC2/N=C/c2cc(C(C)(C)C)cc(C(C)(C)C)c2O*)cc(C(C)(C)C)cc1C(C)(C)C]

-M- is Co(III), and

-$L_I$ is trifluoroacetate.

An oven dried glass vessel was charged with 11.5 mg of catalyst E2 (0.016 mmol) and 9.2 mg of PPN⁺Cl⁻ (0.016 mmol). The vessel was purged with nitrogen and 1,4 butane diol (0.073 g, 0.8 mmol) was added as a solution in dry THF (0.5 mL). Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 2.6 g of crude polymer. The polymer had an Mn of 4072 g/mol, and a PDI of 1.04. The polymer contained no detectable ether linkages and had greater than 98% —OH end groups.

The polycarbonate polyol composition thus obtained consists predominantly of three types of polymer chains: chains $P^{1a}$ arising from initiation by the 1,4 butanediol, chains $P^{2a}$ arising from initiation by the trifluoroacetate ($L_1$) and chains $P^2$ arising from the chloride counterion on the PPN co-catalyst:

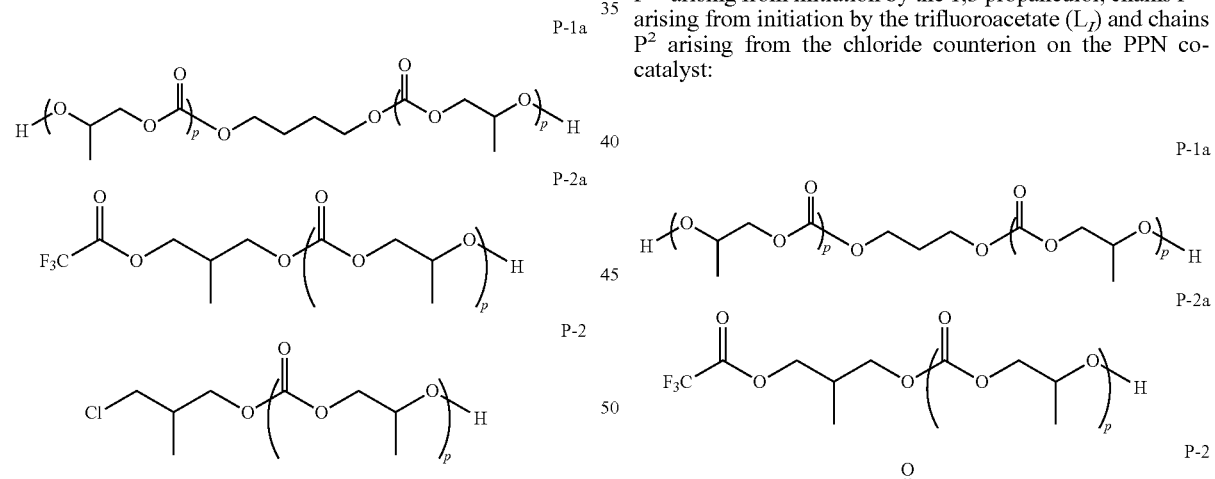

where each p is on average approximately 20. In this particular composition, the ratio of $p^{1a}$ to $P^{2a}$ to $p^2$ is approximately 50:1:1.

Example 8

This example demonstrates the use of the polymerization system of the present invention with a chain transfer agent Y-A-(Y)$_n$ and a catalyst $L_p$-M-($L_I$)$_m$ utilizing a co-catalyst PPN+Cl–, where n is 1, each —Y is —OH, -A- is

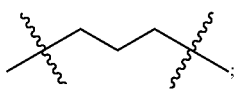 [SMILES: *CCC*]

-$L_p$ is a salcy ligand

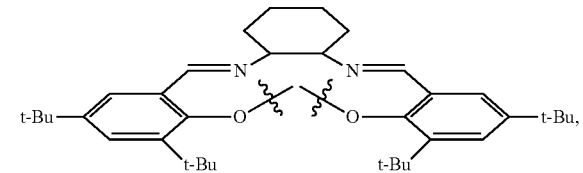

-M- is Co(III), and

-$L_I$ is trifluoroacetate.

An oven dried glass vessel was charged with 11.5 mg of catalyst E2 (0.016 mmol) and 9.2 mg of PPN⁺Cl⁻ (0.016 mmol). The vessel was purged with nitrogen and 1,4 propane diol (0.061 g, 0.8 mmol) was added as a solution in dry THF (0.5 mL). Propylene oxide (4.5 mL, 64 mmol) was then added. The reaction vessel was pressurized with 300 psig dry carbon dioxide gas and stirred at 30° C. for 3× hours. The reaction was quenched with acid, diluted with 25 mL acetone and concentrated to yield 2.7 g of crude polymer.

The polymer had an Mn of 4336 g/mol, and a PDI of 1.04. The polymer contained no detectable ether linkages and had greater than 98% —OH end groups.

The polycarbonate polyol composition thus obtained consists predominantly of three types of polymer chains: chains $P^{1a}$ arising from initiation by the 1,3 propanediol, chains $P^{2a}$ arising from initiation by the trifluoroacetate ($L_I$) and chains $P^2$ arising from the chloride counterion on the PPN co-catalyst:

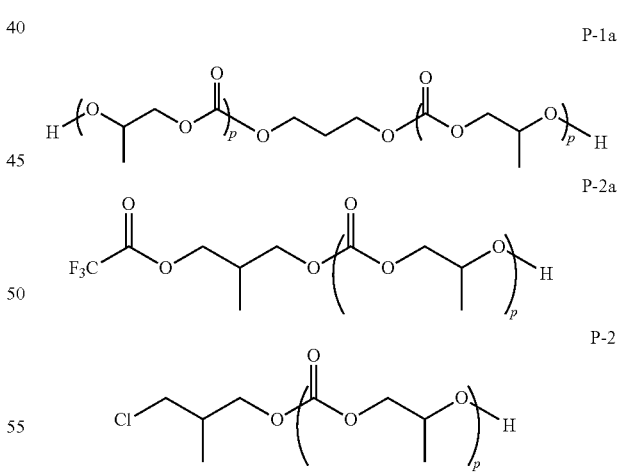

where each p is on average approximately 21. In this particular composition, the ratio of $P^{1a}$ to $P^{2a}$ to $P^2$ is approximately 50:1:1.

Example 9

This example demonstrates the use of the polymerization system of the present invention with a chain transfer agent Y-A-(Y)$_n$ and a catalyst $L_p$-M-($L_I$)$_m$ utilizing a co-catalyst PPN+Cl–, where n is 1,
each —Y is —OH,
-A- is

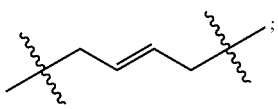 [SMILES: *C/C=C/C*]

-L$_p$ is a salcy ligand

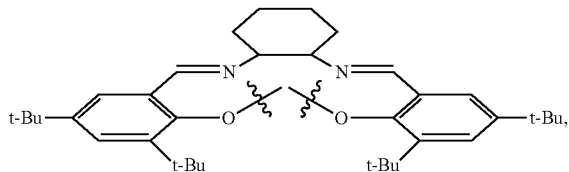 [SMILES: *Oc1c(/C=N/C2CCCCC2/N=C/c2cc(C(C)(C)C)cc(C(C)(C)C)c2O*)cc(C(C)(C)C)cc1C(C)(C)C]

-M- is Co(III), and
-L$_I$ is trifluoroacetate.

An oven dried glass vessel was charged with 11.5 mg of catalyst E2 (0.016 mmol) and 9.2 mg of PPN$^+$Cl$^-$ (0.016 mmol). The vessel was purged with nitrogen and 1,4 butene diol (0.079 g, 0.8 mmol) was added as a solution in dry THF (0.5 mL). Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 1.5 g of crude polymer. The polymer had an Mn of 2431 g/mol, and a PDI of 1.06. The polymer contained no detectable ether linkages and had greater than 98% —OH end groups.

The polycarbonate polyol composition thus obtained consists predominantly of three types of polymer chains: chains P$^{1a}$ arising from initiation by the 1,4 butenediol, chains P$^{2a}$ arising from initiation by the trifluoroacetate (L$_I$) and chains P$^2$ arising from the chloride counterion on the PPN co-catalyst:

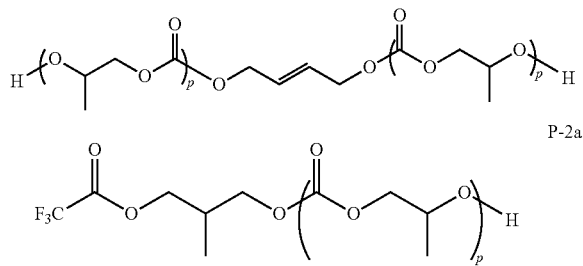

P-1a

P-2a

P-2

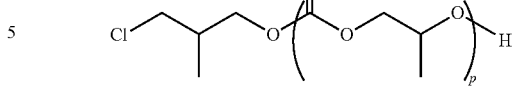

where each p is on average approximately 12. In this particular composition, the ratio of P$^{1a}$ to P$^{2a}$ to p$^2$ is approximately 50:1:1.

Example 10

This example demonstrates the use of the polymerization system of the present invention with a chain transfer agent Y-A-(Y)$_n$ and a catalyst L$_p$-M-(L$_I$)$_m$ utilizing a co-catalyst PPN+Cl−, where n is 1,
each —Y is —CO$_2$H,
-A- is:

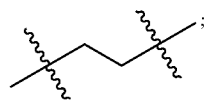 [SMILES: *CC*]

-L$_p$ is a salcy ligand

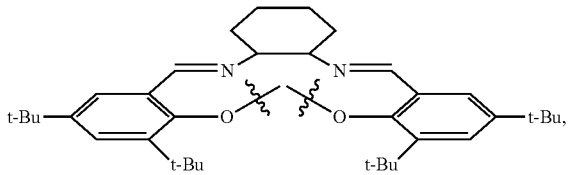

-M- is Co(III), and
-L$_I$ is trifluoroacetate.

An oven dried glass vessel was charged with 11.5 mg of catalyst E2 (0.016 mmol); 9.2 mg of PPN$^+$ Cl$^-$ (0.016 mmol); succinic acid (0.095 g, 0.8 mmol) and 0.5 mL THF. Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 3.0 g of crude polymer. The polymer had an Mn of 13,933 g/mol, and a PDI of 1.04. The polymer contained no detectable ether linkages and had greater than 98% —OH end groups.

The polycarbonate polyol composition thus obtained consists predominantly of three types of polymer chains: chains P$^{1a}$ arising from initiation by the succinic acid, chains P$^{2a}$ arising from initiation by the trifluoroacetate (L$_I$) and chains P$^2$ arising from the chloride counterion on the PPN co-catalyst:

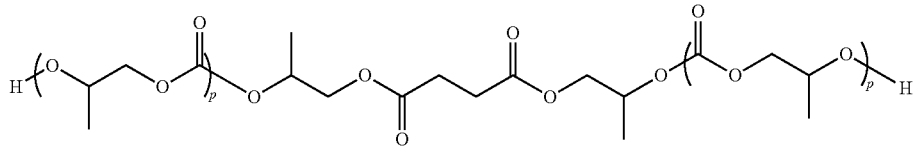

P-1a

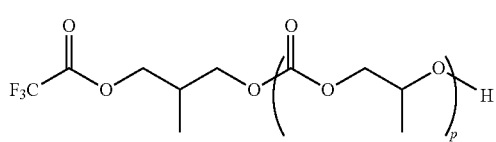

P-2a

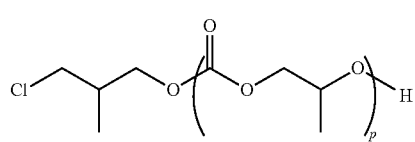

P-2 where each p is on average approximately 68. In this particular composition, the ratio of $P^{1a}$ to $P^{2a}$ to $P^2$ is approximately 50:1:1.

Example 11

This example demonstrates the use of the polymerization system of the present invention with a chain transfer agent Y-A-(Y)$_n$ and a catalyst L$_p$-M-(L$_I$)$_m$ utilizing a co-catalyst PPN+Cl−, where
n is 1,
each —Y is —CO$_2$H,
-A- is;

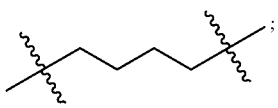 [SMILES: *CCCC*]

-L$_p$ is a salcy ligand

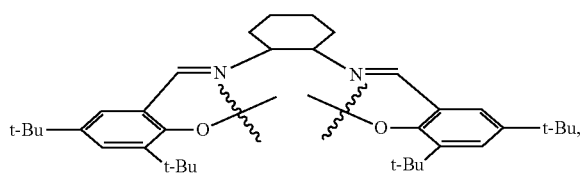 [SMILES: *Oc1c(/C=N/C2CCCC[C@H]2/N=C/c2cc(C(C)(C)C)cc(C(C)(C)C)c2O*)cc(C(C)(C)C)cc1C(C)(C)C]

-M- is Co(III), and
-L$_1$ is trifluoroacetate.

An oven dried glass vessel was charged with 11.5 mg of catalyst E2 (0.016 mmol); 9.2 mg of PPN$^+$Cl$^-$ (0.016 mmol); adipic acid (0.12 g, 0.8 mmol) and 0.5 mL THF. Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 3.0 g of crude polymer. The polymer had an Mn of 13,933 g/mol, and a PDI of 1.04. The polymer contained no detectable ether linkages and had greater than 98% —OH end groups.

The polycarbonate polyol composition thus obtained consists predominantly of three types of polymer chains: chains $P^{1a}$ arising from initiation by the adipic acid, chains $P^{2a}$ arising from initiation by the trifluoroacetate (L$_I$) and chains $P^2$ arising from the chloride counterion on the PPN co-catalyst:

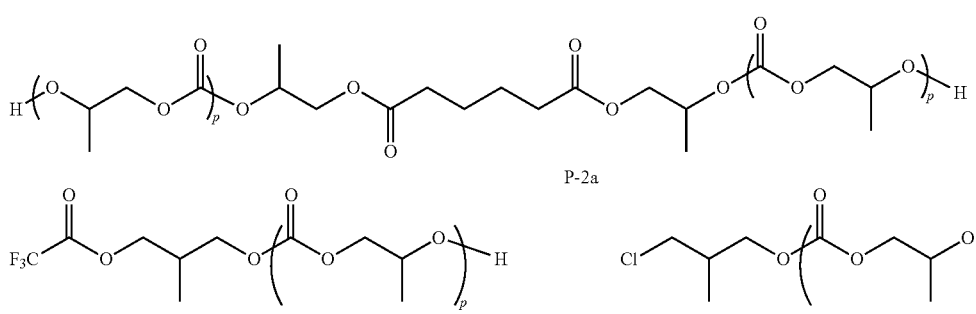

P-1a

P-2a

P-2

Where each p is on average approximately 68. In this particular composition, the ratio of $P^{1a}$ to $P^{2a}$ to $P^2$ is approximately 50:1:1.

Example 12

This example demonstrates the use of the polymerization system of the present invention with a chain transfer agent Y-A-(Y)$_n$ and a catalyst L$_p$-M-(L$_I$)$_m$ utilizing a co-catalyst PPN+Cl−, where
n is 1,
each —Y is —CO$_2$H, -A- is

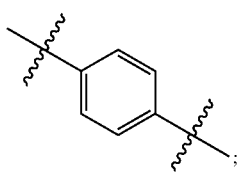 [SMILES: *c1ccc(*)cc1]

-$L_p$ is a salcy ligand

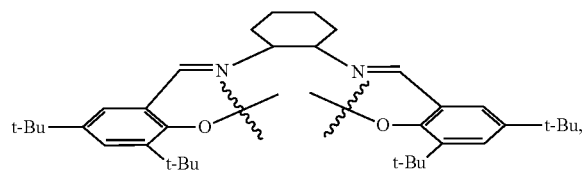 [SMILES: *Oc1c(/C=N/C2CCCC[C@H]2/N=C/c2cc(C(C)(C)C)cc(C(C)(C)C)c2O*)cc(C(C)(C)C)cc1C(C)(C)C]

-M- is Co(III), and
-$L_I$ is trifluoroacetate.

An oven dried glass vessel was charged with 11.5 mg of catalyst E2 (0.016 mmol); 9.2 mg of PPN⁺Cl⁻ (0.016 mmol); terephthalic acid (0.13 g, 0.8 mmol) and 0.5 mL THF. Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 1.52 g of crude polymer. The polymer had an Mn of 13,621 g/mol, and a PDI of 1.35. The polymer contained no detectable ether linkages and had greater than 98% —OH end groups.

The polycarbonate polyol composition thus obtained consists predominantly of three types of polymer chains: chains $P^{1a}$ arising from initiation by the terephthalic acid, chains $P^{2a}$ arising from initiation by the trifluoroacetate ($L_I$) and chains $P^2$ arising from the chloride counterion on the PPN co-catalyst:

Example 13

This example demonstrates the use of the polymerization system of the present invention with a chain transfer agent Y-A-(Y)$_n$ and a catalyst $L_p$-M-($L_I$)$_m$ utilizing a co-catalyst PPN+ Cl−, where n is 1,
each —Y is —CO$_2$H,
-A- is

-$L_p$ is a salcy ligand

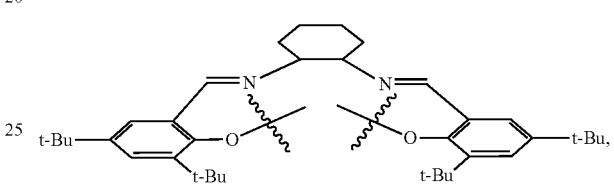

-M- is Co(III), and
-$L_I$ is trifluoroacetate.

An oven dried glass vessel was charged with 11.5 mg of catalyst E2 (0.016 mmol); 9.2 mg of PPN⁺ Cl⁻ (0.016 mmol); maleic acid (0.095 g, 0.8 mmol) and 0.5 mL THF. Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 3.3 g of crude polymer. The polymer had an Mn of 5919 g/mol, and a PDI of 1.03. The polymer contained no detectable ether linkages and had greater than 98% —OH end groups.

The polycarbonate polyol composition thus obtained consists predominantly of three types of polymer chains: chains $P^{1a}$ arising from initiation by the succinic acid, chains $P^{2a}$ arising from initiation by the trifluoroacetate ($L_I$) and chains $P^2$ arising from the chloride counterion on the PPN co-catalyst:

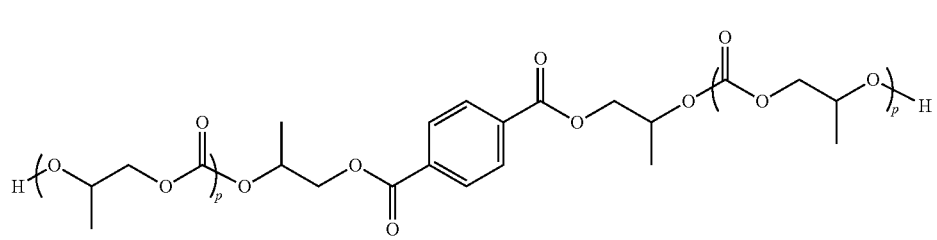

P-1a

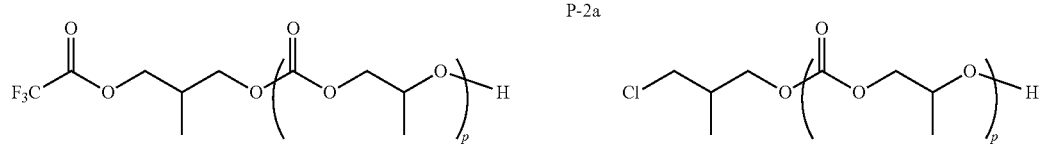

P-2a          P-2 where each p is on average approximately 68. In this particular composition, the ratio of $P^{1a}$ to $p^{2a}$ to $P^2$ is approximately 50:1:1.

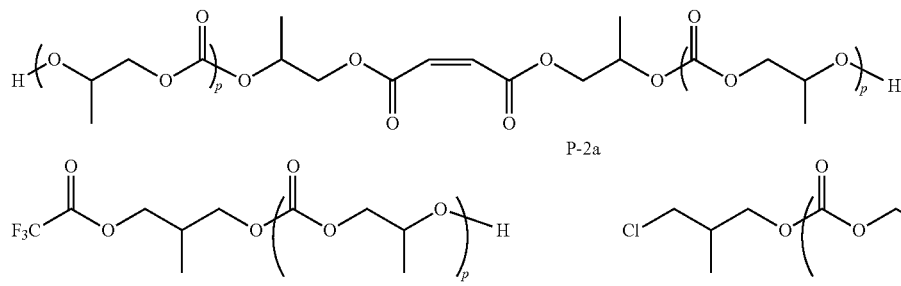

P-1a

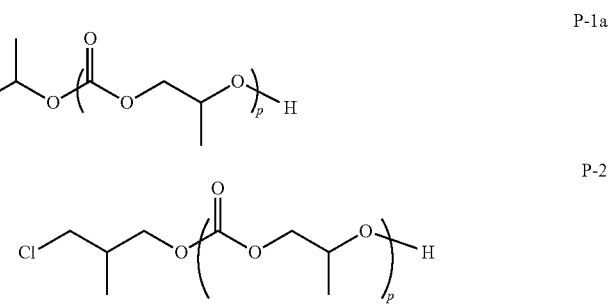

P-2

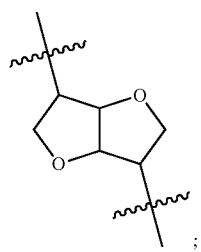 [SMILES: *C1COC2C(*)COC12]

P-2a where each p is on average approximately 29. In this particular composition, the ratio of $P^{1a}$ to $p^{2a}$ to $P^2$ is approximately 50:1:1.

Example 14

This example demonstrates the use of the polymerization system of the present invention with a chain transfer agent Y-A-(Y)$_n$ and a catalyst $L_p$-M-(L$_I$)$_m$ utilizing a co-catalyst PPN+ Cl−, where n is 1,
each —Y is —OH,
-A- is

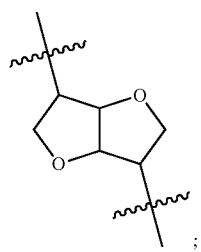 [SMILES: *C1COC2C(*)COC12]
;

-L$_p$ is a salcy ligand

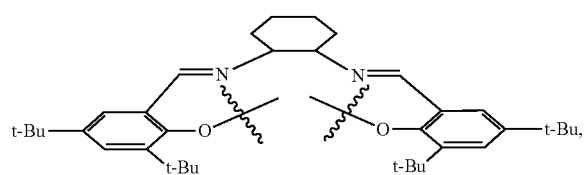 [SMILES: *Oc1c(/C=N/C2CCCC[C@H]2/N=C/c2cc(C(C)(C)C)cc(C(C)(C)C)c2O*)cc(C(C)(C)C)cc1C(C)(C)C]

-M- is Co(III), and
-L$_I$ is trifluoroacetate.

An oven dried glass vessel was charged with 11.5 mg of catalyst E2 (0.016 mmol) and 9.2 mg of PPN$^+$Cl$^-$ (0.016 mmol). The vessel was purged with nitrogen and isosorbide (0.12 g, 0.8 mmol) was added as a solution in dry THF (0.5 mL). Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 1.53 g of crude polymer. The polymer had an Mn of 2342 g/mol, and a PDI of 1.05. The polymer contained no detectable ether linkages and had greater than 98% —OH end groups.

The polycarbonate polyol composition thus obtained consists predominantly of three types of polymer chains: chains $P^{1a}$ arising from initiation by the isosorbide, chains $P^{2a}$ arising from initiation by the trifluoroacetate (L$_I$) and chains $P^2$ arising from the chloride counterion on the PPN co-catalyst:

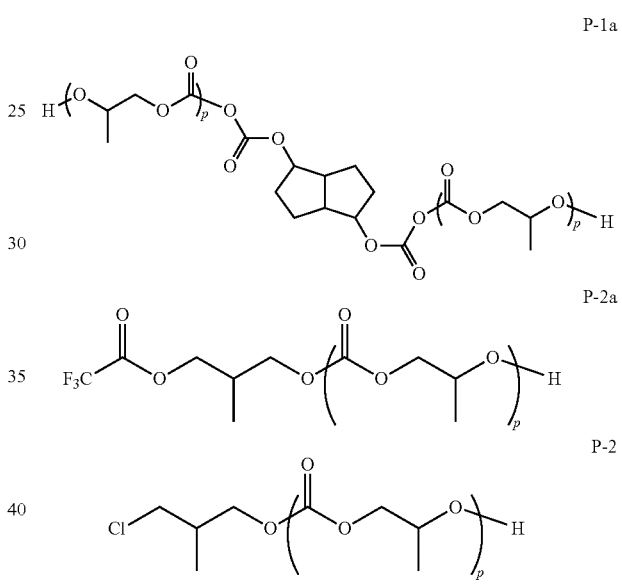

where each p is on average approximately 11.

In this particular composition, the ratio of $P^{1a}$ to $P^{2a}$ to $P^2$ is approximately 50:1:1.

Example 14

This example demonstrates the use of the polymerization system of the present invention with a chain transfer agent Y-A-(Y)$_n$ and a catalyst $L_p$-M-(L$_I$)$_m$ utilizing a co-catalyst PPN+ Cl−, where n is 1,
each —Y is —OH,
-A- is

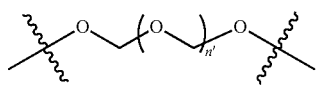

where n' is 10-30 and the avg. MW is 600 g/mol;

-$L_p$ is a salcy ligand

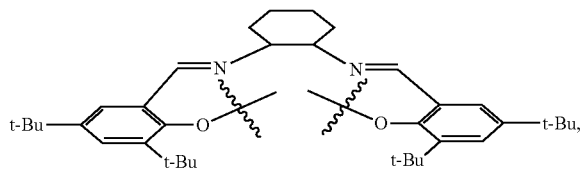 [SMILES: *Oc1c(/C=N/C2CCCC[C@H]2/N=C/c2cc(C(C)(C)C)cc(C(C)(C)C)c2O*)cc(C(C)(C)C)cc1C(C)(C)C]

-M- is Co(III), and
-$L_I$ is trifluoroacetate.

An oven dried glass vessel was charged with 11.5 mg of catalyst E2 (0.016 mmol); 9.2 mg of PPN$^+$Cl$^-$ (0.016 mmol); paraformaldehyde (24 mg, 0.04 mmol); and dry THF (0.5 mL). Propylene oxide (4.5 mL, 64 mmol) was then added. The reaction vessel was pressurized with 300 psig dry carbon dioxide gas and stirred at 30° C. for 3 hours. The reaction was quenched with acid, diluted with 25 mL acetone and concentrated to yield 1.0 g of crude polymer. The polymer had an Mn of 13,262 g/mol, and a PDI of 1.18.

The polycarbonate polyol composition thus obtained consists predominantly of three types of polymer chains: chains $P^{1a}$ arising from initiation by the isosorbide, chains $P^{2a}$ arising from initiation by the trifluoroacetate ($L_I$) and chains $P^2$ arising from the chloride counterion on the PPN co-catalyst:

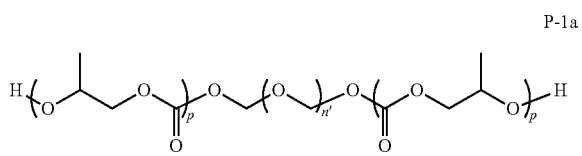
P-1a

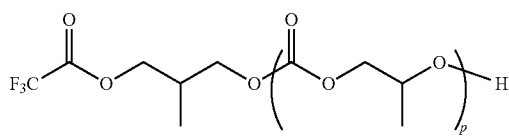
P-2a

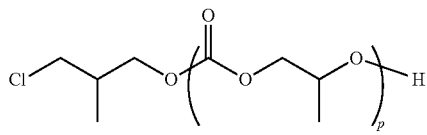
P-2 where n' is 10-30 and each p is on average approximately 60.

In this particular composition, the ratio of $P^{1a}$ to $P^{2a}$ to $P^2$ is approximately 2:1:1.

Example 15

This example demonstrates the use of the polymerization system of the present invention with a chain transfer agent Y-A-(Y)$_n$ and a catalyst $L_p$-M-($L_I$)$_m$, where,
n is 1,
each —Y is —OH,
-A- is

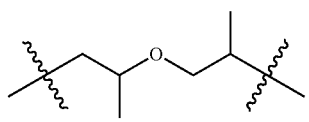 [SMILES: *CC(C)OCC(*)C]

(mixture of isomers);

-$L_p$ is

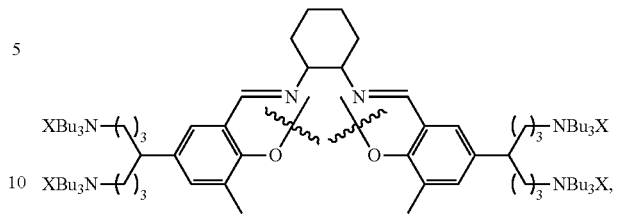

where each X is trifluoroacetate.
-M- is Co(III), and
-$L_I$ is trifluoroacetate.

In a glovebox, catalyst (5.4 mg, 1.0 equiv) was charged to an oven-dried 20 mL glass liner. The liner was inserted into a stainless steel high pressure reactor. The system was purged with N$_2$ five times and purged with CO$_2$ twice. While under the positive flow of CO$_2$, a solution of dipropylene glycol (75 µL) in propylene oxide (5 mL, 25,000 equiv) was charged to the reaction vessel. The reaction was heated to 50° C., then pressurized with carbon dioxide (300 psi) and stirred.

After 6 h the reaction was vented and quenched with acidic methanol (0.2 mL). The reaction was cooled to room temperature, and the resulting polymer was diluted with acetone (5 mL) and transferred to a foil pan. The unreacted propylene oxide and acetone were removed by evaporation to produce 2.19 g of an off-white polymer ($M_w$=5,600, $M_w/M_n$=1.03).

The polycarbonate polyol composition thus obtained consists predominantly of two types of polymer chains: chains $P^1$ arising from initiation by the dipropylene glycol, and chains $P^2$ arising from initiation by the trifluoroacetate (from $L_I$ and X).

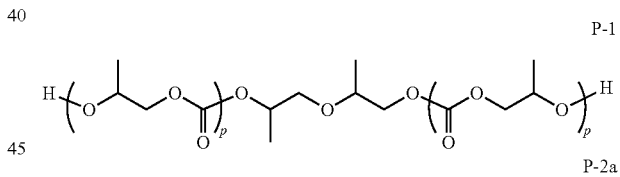
P-1

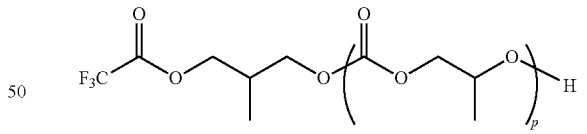
P-2a where each p is on average approximately 27.

In this particular composition, the ratio of $P^1$ to $P^2$ is approximately 4:1.

Other Embodiments

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A polycarbonate polyol composition comprising an epoxide $CO_2$ copolymer characterized in that the copolymer has:
   an Mn between 400 and 20,000 g/mol,
   greater than 90% carbonate linkages, and
   wherein the composition comprises:
   polymer chains denoted $P^1$ having the formula T-Y-A-(Y-T)$_n$, derived from a chain transfer agent having a formula Y-A-(Y)$_n$, wherein:
      each -T is a polycarbonate chain having a formula independently selected from the group consisting of:

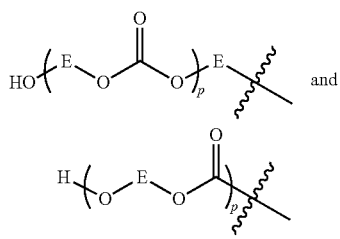

wherein:
      each E is independently an optionally substituted $C_2$ unit derived from an epoxide or a mixture of two or more epoxides;
      p ranges from 5 to 10,000; and
      each chain transfer agent of formula Y-A-(Y)$_n$ comprises two or more sites capable of initiating chain growth in the co-polymerization of an epoxide and carbon dioxide;
         —Y group is independently a functional group capable of initiating chain growth of epoxide $CO_2$ copolymers and each Y group is the same or different,
         -A- is a covalent bond or a multivalent moiety; and
         n is an integer between 1 and 10 inclusive;
   wherein the composition is characterized in that more than 97% of the epoxide $CO_2$ copolymer chains are of type $P^1$.

2. The polycarbonate polyol composition of claim 1, comprising greater than 95% carbonate linkages.

3. The polycarbonate polyol composition of claim 1, comprising greater than 99% carbonate linkages.

4. The polycarbonate polyol composition of claim 1, having an Mn between about 500 and about 5,000 g/mol.

5. The polycarbonate polyol composition of claim 1, having an Mn between about 1,000 and about 3,000 g/mol.

6. The polycarbonate polyol composition of claim 1, further comprising polymer chains denoted $P^2$ having a formula selected from the group consisting of:

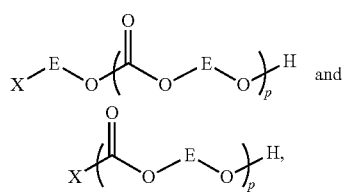

wherein
   X is a bound form of an anion capable of initiating only one polymer chain;

wherein the ratio of $P^1$ polymer chains to $P^2$ polymer chains is greater than 40:1.

7. The polycarbonate polyol composition of claim 6, wherein the ratio of $P^1$ polymer chains to $P^2$ polymer chains is greater than 100:1.

8. The polycarbonate polyol composition of claim 1, further comprising polymer chains denoted $P^{1a}$ having a formula:

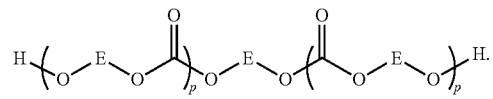

9. The polycarbonate polyol composition of claim 1, wherein each E is

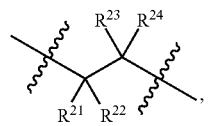

where, $R^{21}$, $R^{22}$, $R^{23}$, and $R^{24}$, are each independently selected from the group consisting of: —H; and an optionally substituted group selected from $C_{1-30}$ aliphatic; $C_{6-14}$ aryl; 3- to 12-membered heterocycle, and 5- to 12-membered heteroaryl, where any two or more of $R^{21}$, $R^{22}$, $R^{23}$, and $R^{24}$ can be taken together with intervening atoms to form one or more optionally substituted 3- to 12-membered rings, optionally containing one or more heteroatoms.

10. The polycarbonate polyol composition of claim 9, wherein -E- is selected from the group consisting of:

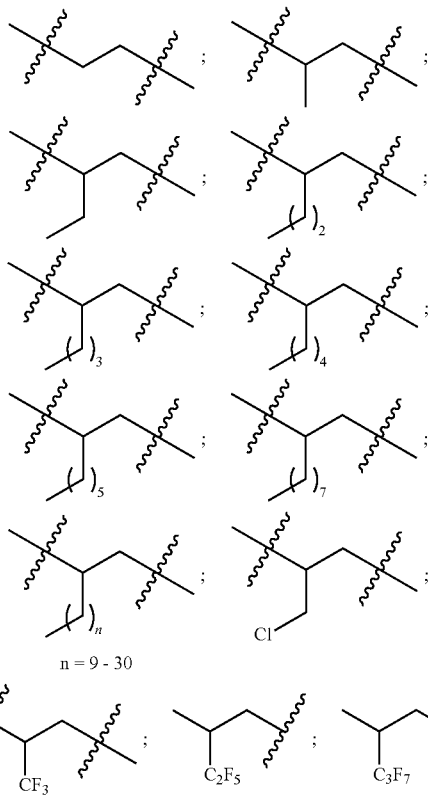

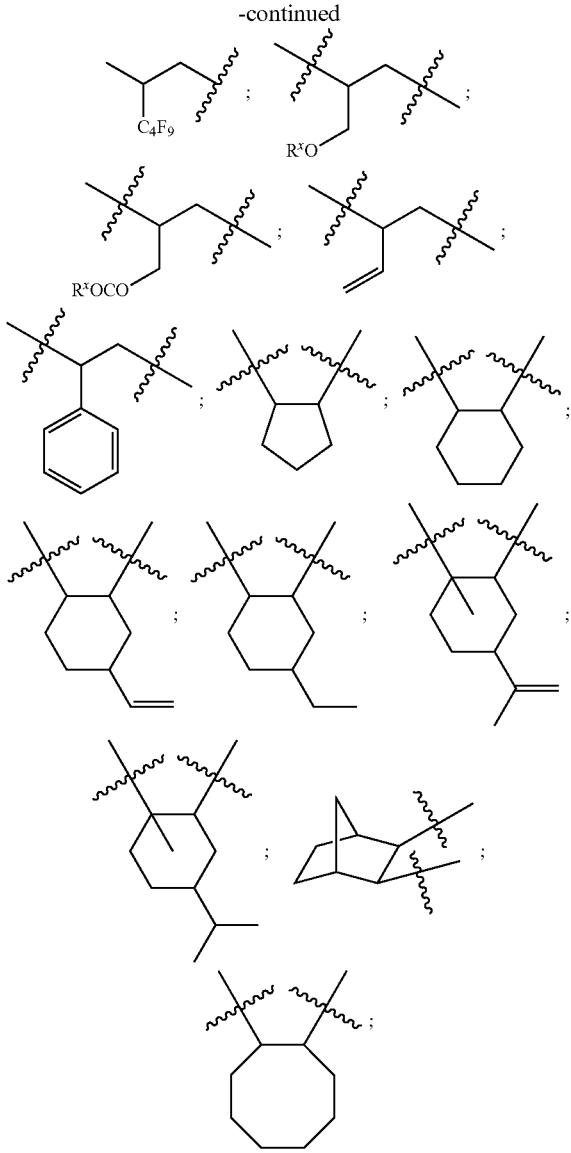

and mixtures of any two or more of these,
wherein $R^x$ is selected from optionally substituted aliphatic, fluorinated aliphatic, optionally substituted heteroaliphatic, optionally substituted aryl, fluorinated aryl, or optionally substituted heteroaryl.

11. The polycarbonate polyol composition of claim 9, wherein -E- comprises predominantly —CH$_2$CH$_2$— units derived from ethylene oxide.

12. The polycarbonate polyol composition of claim 9, wherein -E- comprises predominantly —CH$_2$CH(CH$_3$)— units derived from propylene oxide.

13. The polycarbonate polyol composition of claim 1, where chains of type $P^1$ have the formula:

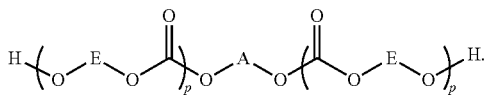

14. The polycarbonate polyol composition of claim 1, where chains of type $P^1$ have the formula:

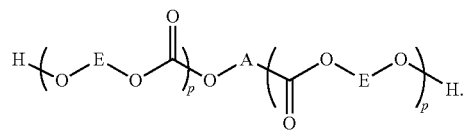

15. The polycarbonate polyol composition of claim 1, where chains of type $P^1$ have the formula:

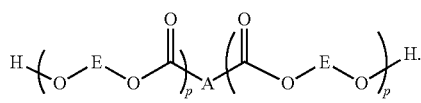

16. The polycarbonate polyol composition of claim 1, wherein chains of type $P^1$ have the formula:

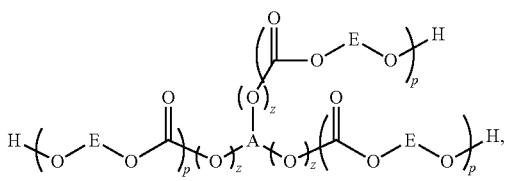

where each z is independently 0 or 1.

17. A polyurethane composition formed by reaction of one or more isocyanates with one or more aliphatic polycarbonate polyols of claim 1.

18. An article of manufacture comprising the polycarbonate polyol composition of claim 1.

19. An article of manufacture comprising the polycarbonate polyol composition of claim 1.

20. The polycarbonate polyol composition of claim 1, wherein the composition is characterized in that more than 99% of the epoxide CO$_2$ copolymer chains are of type $P^1$.

* * * * *